United States Patent
Kojima et al.

(10) Patent No.: US 12,156,852 B2
(45) Date of Patent: Dec. 3, 2024

(54) ITEM STORAGE APPARATUS AND MEDICINE-TAKING SUPPORT APPARATUS

(71) Applicants: Akira Kojima, Kanagawa (JP); Hirotaka Hayashi, Kanagawa (JP); Hiroshi Fujie, Kanagawa (JP); Takuya Morinaga, Tokyo (JP); Wataru Nozaki, Kanagawa (JP)

(72) Inventors: Akira Kojima, Kanagawa (JP); Hirotaka Hayashi, Kanagawa (JP); Hiroshi Fujie, Kanagawa (JP); Takuya Morinaga, Tokyo (JP); Wataru Nozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 381 days.

(21) Appl. No.: 17/576,056

(22) Filed: Jan. 14, 2022

(65) Prior Publication Data
US 2022/0233406 A1   Jul. 28, 2022

(30) Foreign Application Priority Data
Jan. 28, 2021   (JP) ................ 2021-012031

(51) Int. Cl.
*G07F 17/00* (2006.01)
*A61J 7/00* (2006.01)
(Continued)

(52) U.S. Cl.
CPC .......... *A61J 7/0084* (2013.01); *A61J 7/0069* (2013.01); *B65G 1/0485* (2013.01); *B65G 1/137* (2013.01)

(58) Field of Classification Search
CPC ..... A61J 7/0084; A61J 7/0069; B65G 1/0485; B65G 1/137; G07F 17/0092
See application file for complete search history.

(56) References Cited

U.S. PATENT DOCUMENTS

| 10,766,697 B2* | 9/2020 | Abe ................. H01L 21/67775 |
| 2008/0137522 A1* | 6/2008 | Ichimura ............. G11B 17/225 |

(Continued)

FOREIGN PATENT DOCUMENTS

| JP | 2016-083133 | 5/2016 |
| JP | 2017-000177 | 1/2017 |

(Continued)

*Primary Examiner* — Lynn E Schwenning
*Assistant Examiner* — Lucia Elba Rodriguez
(74) *Attorney, Agent, or Firm* — Harness, Dickey & Pierce, P.L.C.

(57) ABSTRACT

An item storage apparatus includes a first storage to store items, a carrier to take an item from the first storage and convey the item, a first support supporting the carrier to be movable back and forth in a first horizontal direction, a second support supporting the first support to be movable back and forth in a second horizontal direction perpendicular to the first horizontal direction, a vertical moving mechanism supporting the second support to be movable back and forth in a vertical direction perpendicular to the first horizontal direction and the second horizontal direction, and a second storage to store the item. At least one of the first or second storage has a multi-tier structure in which a space for movement of the carrier is between tiers. The first support has a cantilever structure in which one end is secured to the second support and another end is free.

20 Claims, 38 Drawing Sheets

(51) Int. Cl.
*B65G 1/04* (2006.01)
*B65G 1/137* (2006.01)

(56) References Cited

U.S. PATENT DOCUMENTS

| | | | |
|---|---|---|---|
| 2012/0004770 A1* | 1/2012 | Ooyen | G16H 20/13 |
| | | | 700/235 |
| 2012/0029692 A1* | 2/2012 | Owen | G07F 11/44 |
| | | | 356/402 |
| 2021/0361532 A1 | 11/2021 | Hayashi et al. | |

FOREIGN PATENT DOCUMENTS

| | | |
|---|---|---|
| JP | 2019-106051 | 6/2019 |
| JP | 2020-058613 | 4/2020 |

* cited by examiner

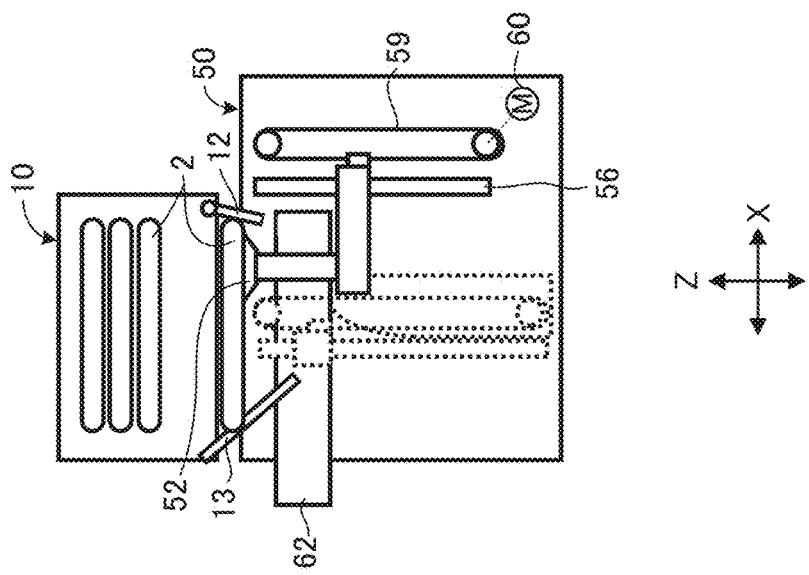
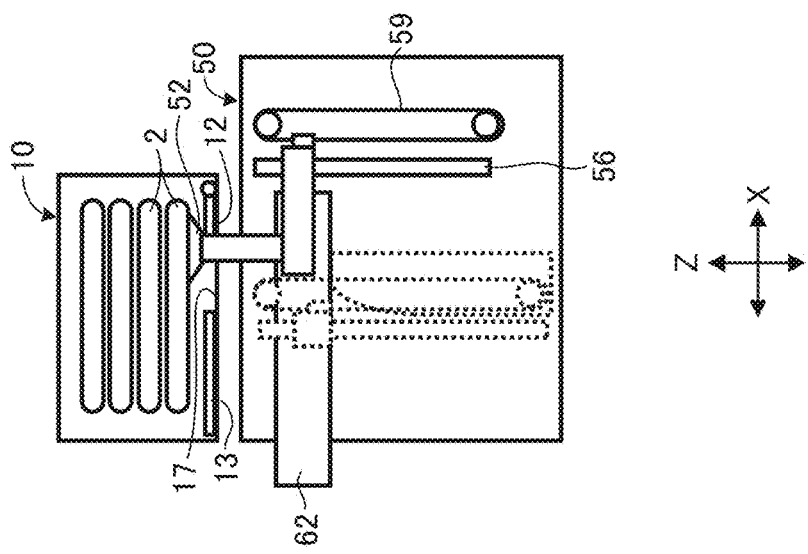
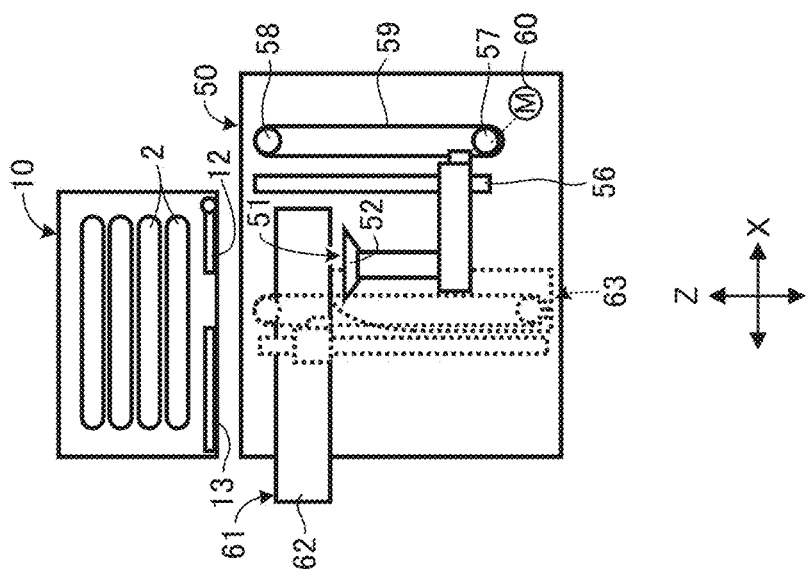

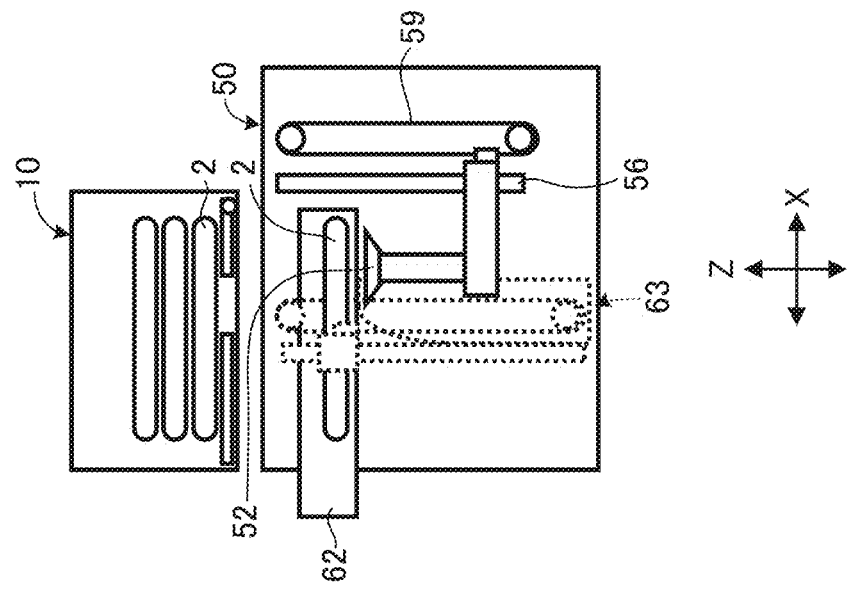
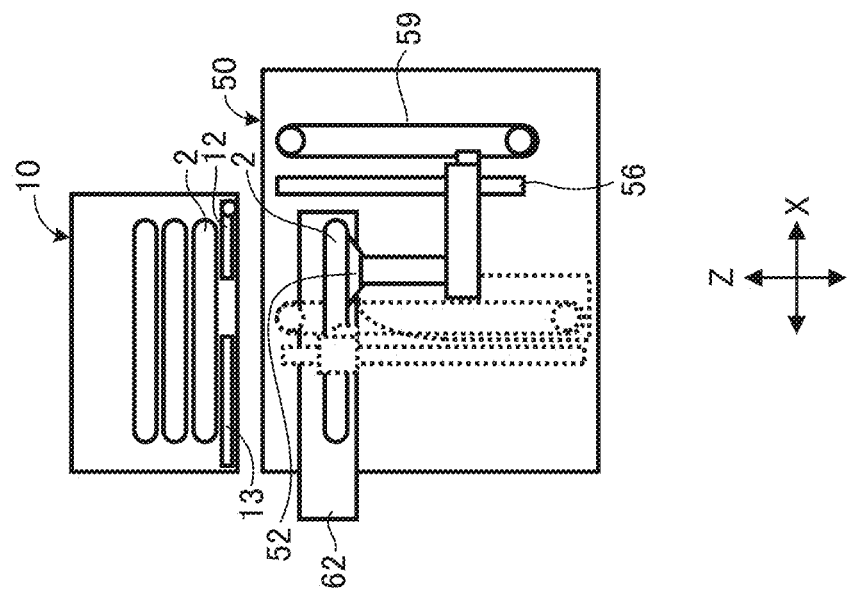

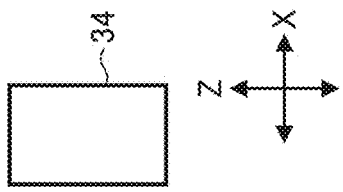
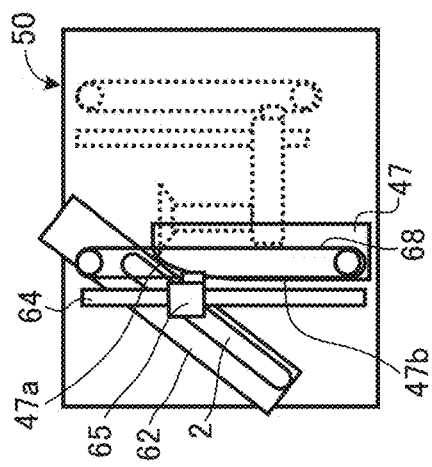
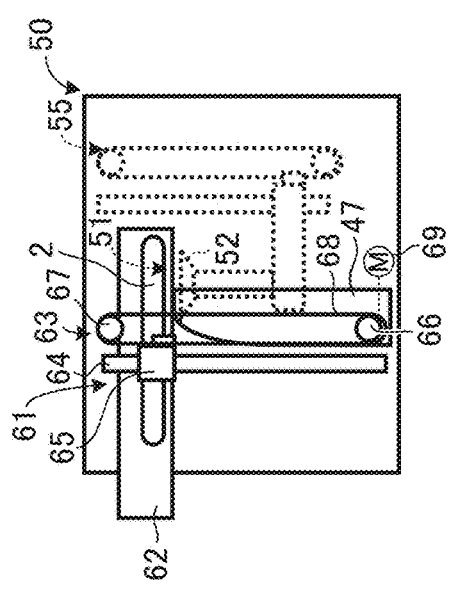

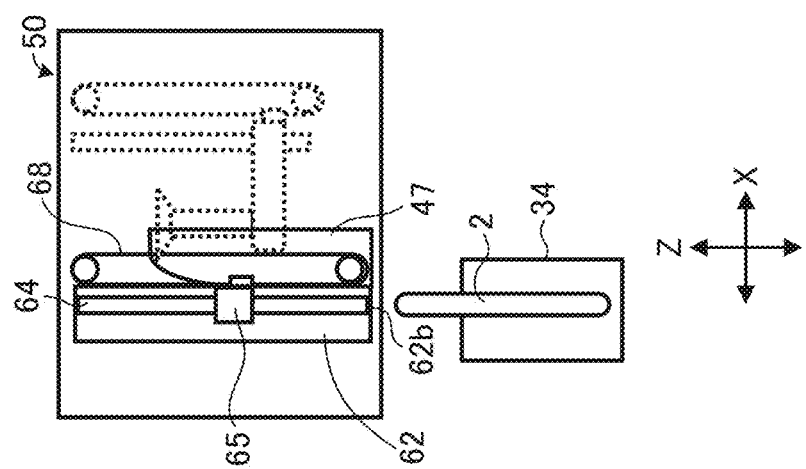
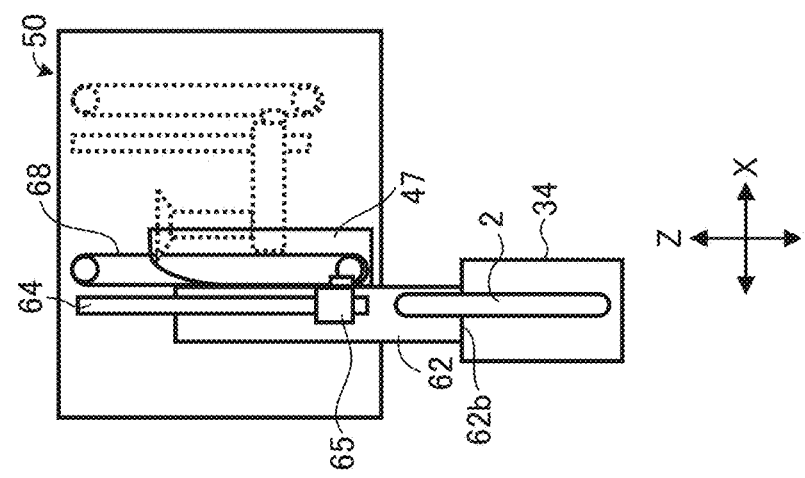
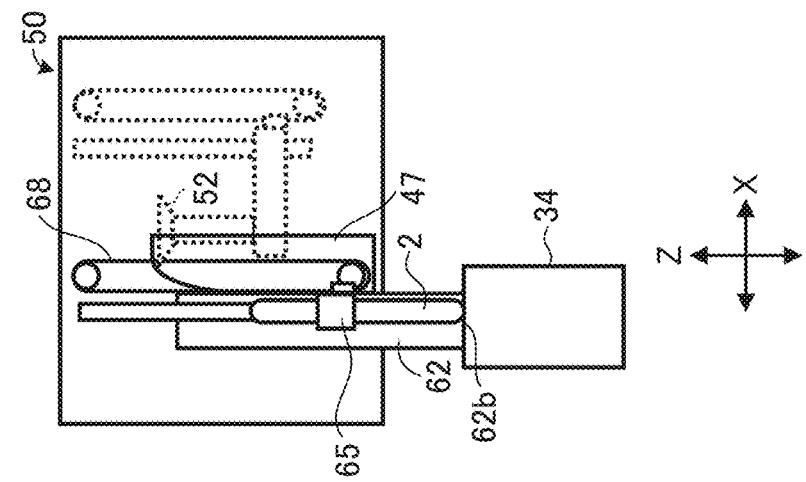

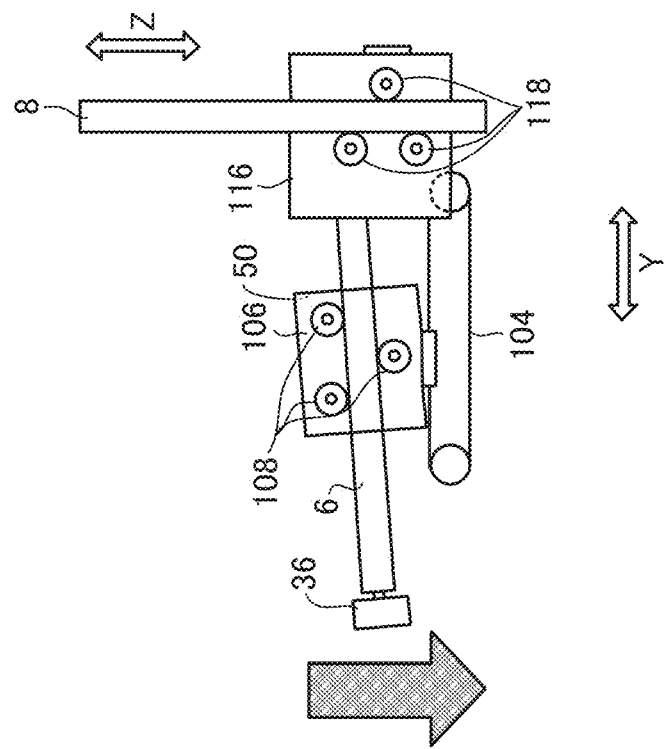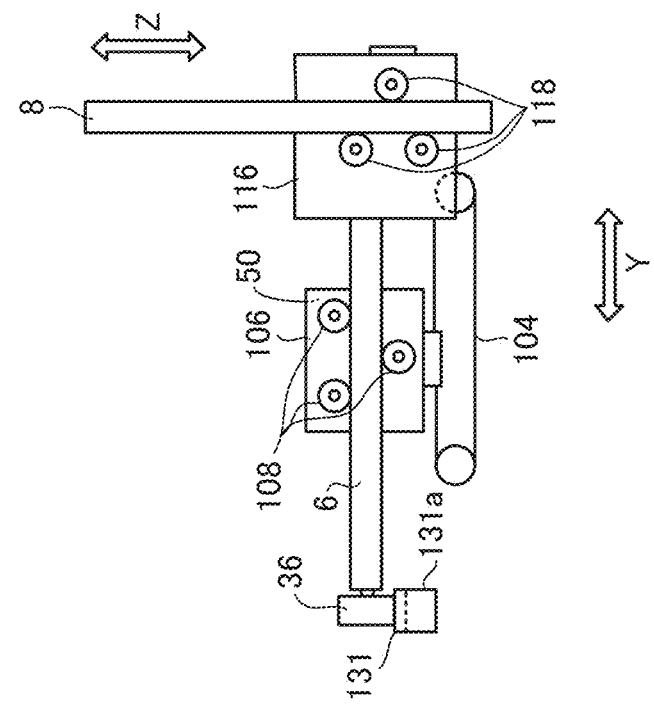

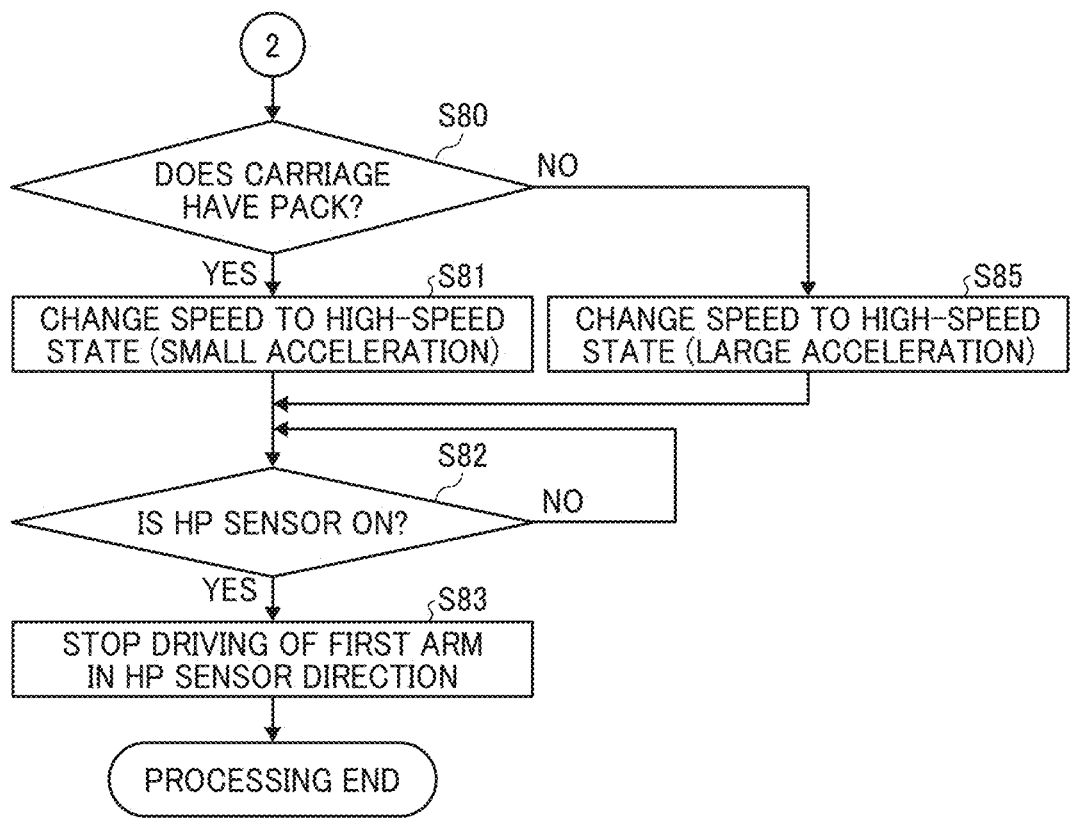

ITEM STORAGE APPARATUS AND MEDICINE-TAKING SUPPORT APPARATUS

CROSS-REFERENCE TO RELATED APPLICATION

This patent application is based on and claims priority pursuant to 35 U.S.C. § 119(a) to Japanese Patent Application No. 2021-012031, filed on Jan. 28, 2021, in the Japan Patent Office, the entire disclosure of which is hereby incorporated by reference herein.

BACKGROUND

Technical Field

The present disclosure relates to an item storage apparatus and a medicine-taking support apparatus.

Discussion of the Background Art

A technique (medicine-taking support apparatus) is known that uses a suction device to take a one-dose-package medicine pack (hereinafter also simply referred to as a "one-dose-package pack" or a "pack") that includes one dose of medicine out of a storing device that accommodates one-dose-package medicine packs, and then transfers the one-dose-package medicine pack onto a receiving saucer, and feeds the receiving saucer to a main-body outlet to provide the medicine for a medicine-taking person or a medicine-taking helper.

SUMMARY

According to an embodiment of the present disclosure, an item storage apparatus includes a first storage, a carrier, a first support, a second support, a vertical moving mechanism, and a second storage. The first storage stores a pile of a plurality of items. The carrier takes an item out of the first storage and holds and conveys the item. The first support supports the carrier such that the carrier is movable back and forth in a first horizontal direction. The second support supports the first support such that the first support is movable back and forth in a second horizontal direction perpendicular to the first horizontal direction. The vertical moving mechanism supports the second support such that the second support is movable back and forth in a vertical direction perpendicular to the first horizontal direction and the second horizontal direction. The second storage stores the item conveyed by the carrier. At least one of the first storage or the second storage has a multi-tier structure in which a space for movement of the carrier is interposed between tiers. The first support has a cantilever structure in which one end of the first support is secured to the second support and another end of the first support is a free end.

According to another embodiment of the present disclosure, a medicine-taking support apparatus includes the item storage apparatus. The items are one-dose-package medicine packs.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 8A, 8B, 8C, 8D, and 8E are front views illustrating a transition of picking operation of the carriage;

FIGS. 9A, 9A', 9B, 9C, 9D, and 9E are front views illustrating a transition of medicine distribution operation of the carriage;

FIG. 14B is an illustration in which FIG. 14A is seen from the right side;

FIGS. 18A and 18B are drawings illustrating a case where the first arm leaves the front-end guide rail at a high speed;

Figure 1:
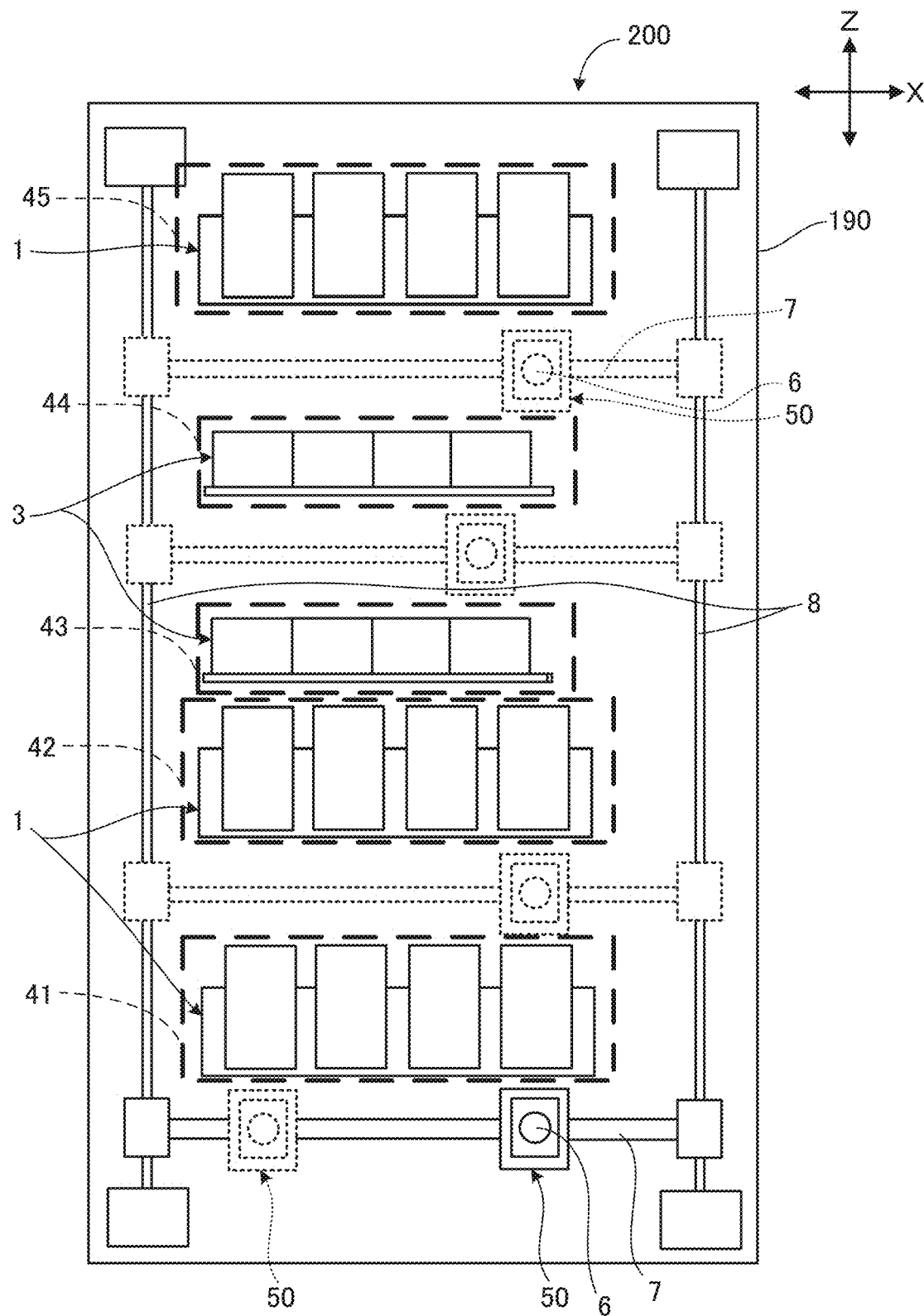
FIG. 1 is a front view illustrating a general arrangement of an item storage apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure including examples will be described in detail with reference to the drawings. After a constituent (member or component) or the like is explained, constituents (members or components) or the like having the same function, shape, and the like as the explained constituent (member or component) or the like will not be explained in each of the examples by assigning the same reference numeral unless there is a possibility of confusion.

Figure 2:
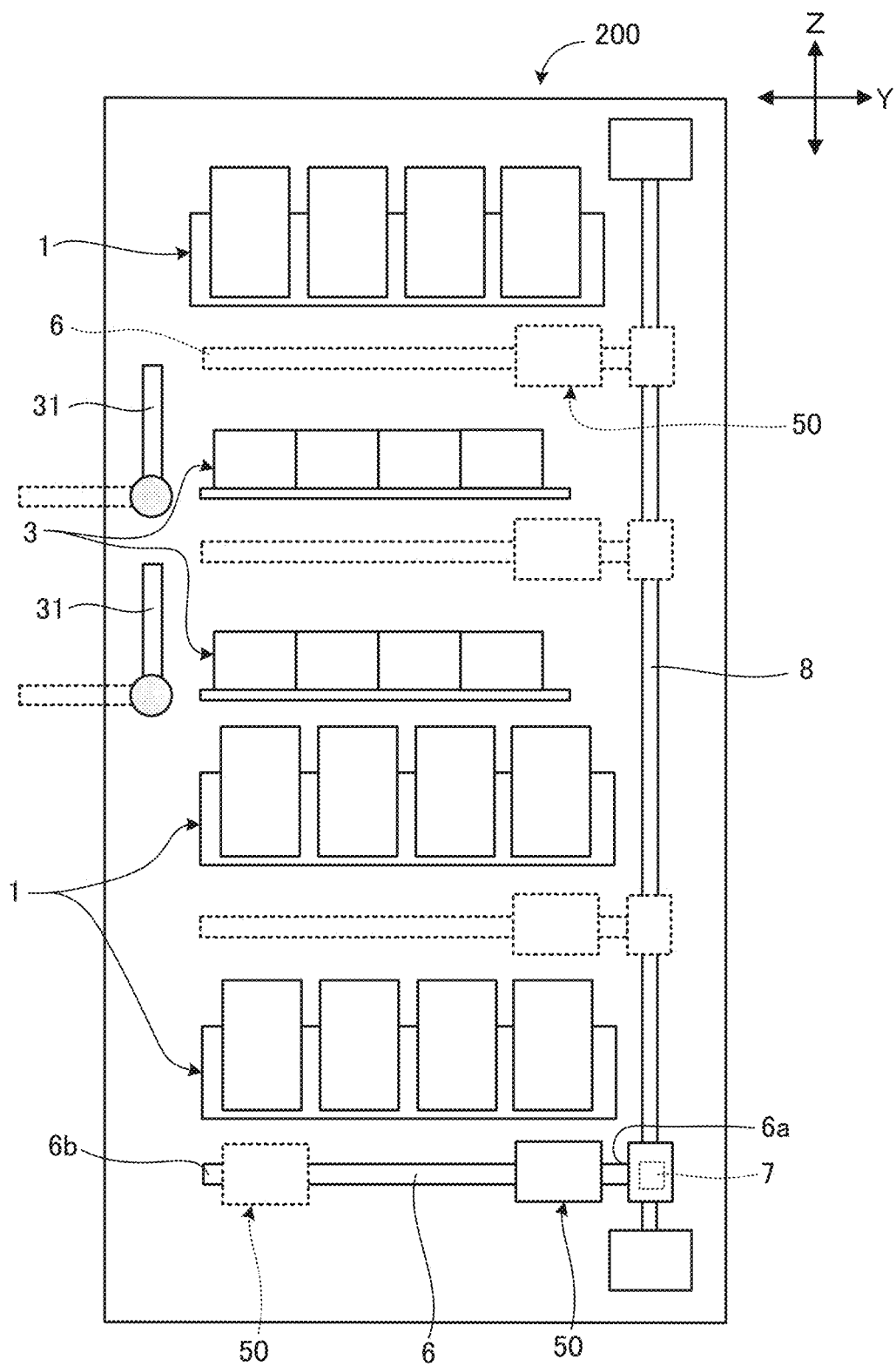
FIG. 2 is a right side view of FIG. 1.

A general arrangement of an item storage apparatus 200 according to a first embodiment of the present disclosure will be described with reference to FIGS. 1 and 2. FIG. 1 is a front view illustrating the general arrangement of the item storage apparatus 200 according to the first embodiment of the present disclosure. FIG. 2 is a right side view of FIG. 1. In FIGS. 1 and 2, a left or right direction or a lateral direction (that is also a width direction) of the item storage apparatus 200 is an X direction, a forward or backward direction or a depth direction is a Y direction, and an upward or downward direction or a vertical direction is a Z direction. The X, Y, and Z directions are also applied to a medicine-taking support apparatus 300 described below and illustrated in FIGS. 3 and 4 and other drawings.

As illustrated in FIGS. 1 and 2, the item storage apparatus 200 includes three tiers of a first storage 1 including one higher tier and two lower tiers, and two central tiers of a second storage 3 in a main-body frame 190 as a main body of the item storage apparatus 200.

The first storage 1 functions as a first storage that stores a pile of a plurality of items.

The second storage 3 functions as a second storage that stores the items that have been conveyed out by a carriage 50 described below.

The first storage 1 and the second storage 3 can be taken out of the inside of the main-body frame 190 to the outside of the main-body frame 190 and taken into the main-body frame 190 from the outside of the main-body frame 190 through corresponding entrance ports 41 to 45 illustrated with thick broken lines in FIG. 1.

As illustrated in FIG. 2, the entrance ports 43 and 44 are each provided with an opening-and-closing door 31 that controls taking into and out the second storage 3.

The carriage 50 transfers the item from under the first storage 1 to over the second storage 3. The carriage 50 is guided and supported by an arm as a support described below such that the carriage 50 is movable back and forth between the first storage 1 side and the second storage 3 side in three directions of the forward or backward direction (Y direction), the left or right direction (X direction), and the vertical direction (Z direction). That is to say, the item storage apparatus 200 is a multi-tier structure. The multi-tier structure includes the plurality of tiers of the first storage 1. Between the plurality of tiers of the first storage 1, a space where the carriage 50 goes and comes is under each of the tiers of the first storage 1. Further, the multi-tier structure includes a space over each of the tiers of the second storage 3, and the carriage 50 goes and comes through the space.

As an internal mechanism, provided are a first arm 6 of a cantilever type that supports the carriage 50 such that the carriage 50 is movable back and forth in the forward or backward direction (Y direction), a second arm 7 of a simply supported beam type that supports the first arm 6 such that the first arm 6 is movable back and forth in the left or right direction (X direction), and a pair of left and right vertical-movement mechanisms 8 that supports both ends of the second arm 7 such that the second arm 7 is movable back and forth in the vertical direction (Z direction). Since the first arm 6 is a cantilever type, a space where the second arm 7 moves up and down, and the vertical-movement mechanisms 8 are collectively configured at the back side of the item storage apparatus 200 that is the right side in FIG. 2.

Consequently, the compact item storage apparatus 200 is implemented and provided in which the carriage 50 is movable in the three directions between the plurality of storing devices to move and place the items.

The carriage 50 functions as a carrier that takes the item out of the first storage 1 and holds and conveys out the item.

The first arm 6 functions as a first support that supports the carriage 50 such that the carriage 50 is movable back and forth in a first horizontal direction.

The second arm 7 functions as a second support that supports the first arm 6 such that the first arm 6 is movable back and forth in a second horizontal direction perpendicular to the first horizontal direction that is.

The vertical-movement mechanisms 8 function as an vertical mover that supports the second arm 7 such that the second arm 7 is movable back and forth in the vertical direction that perpendicular to both the first horizontal direction and the second horizontal direction.

The entrance ports 41 to 45 function as storage movement means that allows the first storage 1 or the second storage 3 to be taken in and out through the front side of the multi-tier structure. Since the entrance ports 41 to 45 are included, the items are more easily taken in and out than, for example, a scheme where an arm is withdrawn to store items through the ceiling.

In addition to one-dose-package medicine packs that include one dose of medicine, the items include packs whose form of packing things is three-side packing (more specifically, a soup of a cup noodle, a confection, or the like), or packs of four-side packing or pillow bag packing. That is to say, items as objects of the present disclosure also include articles, such as food and parts, moved and placed by air suction as a workpiece as an item, such as taking out an article from a pallet or a container, an intermediate step, and a step of packing into a box, in a food factory, and part machining.

A medicine-taking support apparatus 300 according to a second embodiment of the present disclosure is the item storage apparatus 200 according to the first embodiment of the present disclosure in which items are specified as one-dose-package medicine packs that include one dose of medicine. Therefore, if possible, the same reference numerals as the reference numerals used for the description of the item storage apparatus 200 are assigned to describe the medicine-taking support apparatus 300 unless there is a possibility of confusion.

The medicine-taking support apparatus 300 according to the second embodiment of the present disclosure is wanted to be as compact as possible, and the installation area is also wanted to be as small as possible, for installation instead of a medicine keeping shelf or a work space where medicine-taking preparation work is done, in a health care facility or an inpatients' ward. For such a demand, the configuration of the item storage apparatus 200 described above is followed to implement and provide the medicine-taking support apparatus 300 that does not include a robot arm or a large moving and placing device and occupies a small space even if the medicine-taking support apparatus 300 is for a plurality of people and includes a plurality of the first storages 1, a plurality of the second storages 3, or both a plurality of the first storages 1 and a plurality of the second storages 3.

Figure 3:
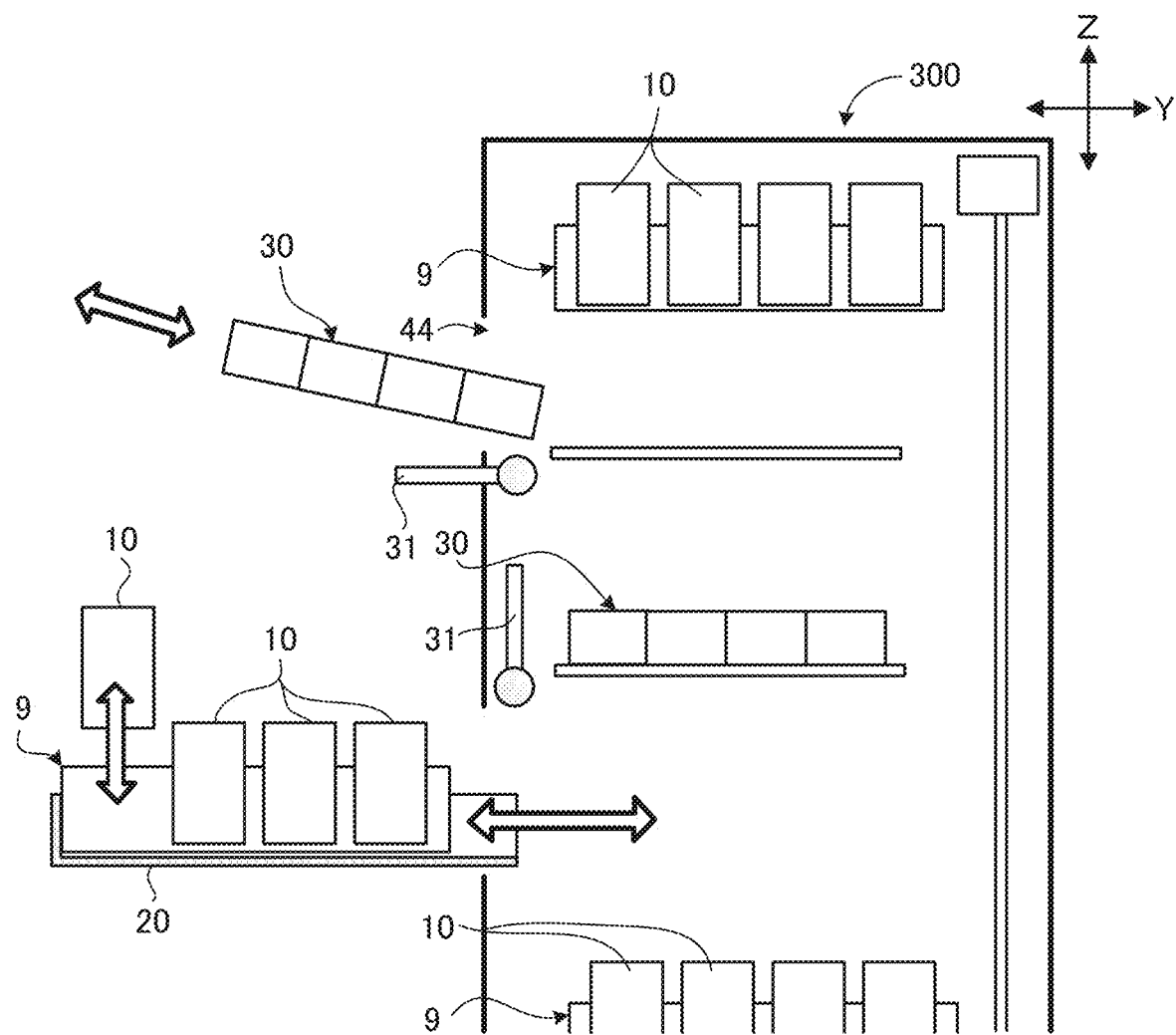
FIG. 3 is a right side view illustrating loading and unloading cartridges into and from a cartridge storing device of a medicine-taking support apparatus according to a second embodiment of the present disclosure, and illustrating taking a medicine distribution tray into and out of the medicine-taking support apparatus.
Figure 4:
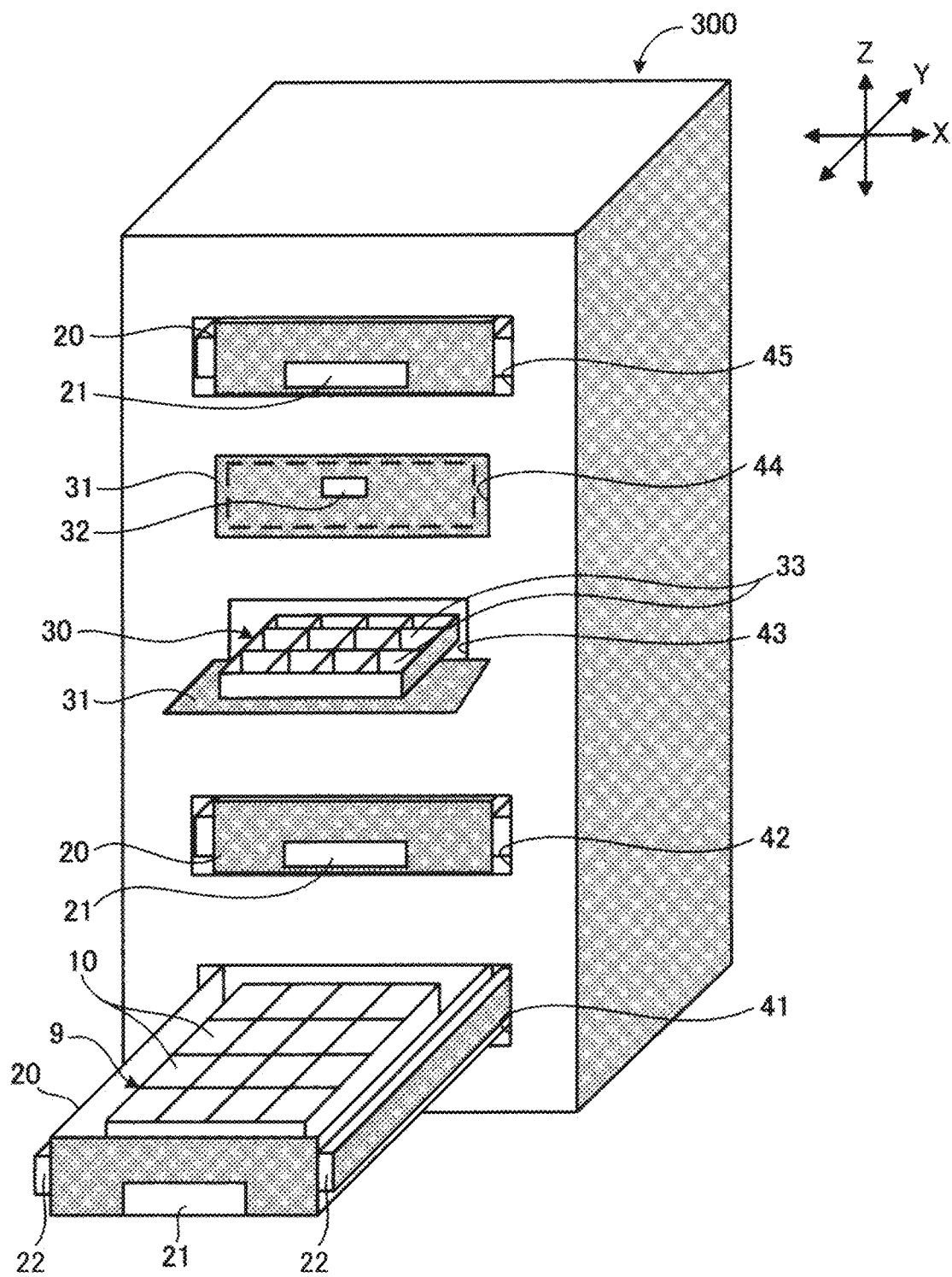
FIG. 4 is a perspective view illustrating drawers for the cartridge storing device, and entrances for the medicine distribution trays in FIG. 3.

A cartridge storing device 9 and medicine distribution trays 30 of the medicine-taking support apparatus 300 according to the second embodiment of the present disclosure will be described with reference to FIGS. 3 and 4. FIG. 3 is a right side view illustrating loading and unloading cartridges 10 into and from the cartridge storing device 9 of the medicine-taking support apparatus 300 according to the second embodiment of the present disclosure, and illustrating taking the medicine distribution tray 30 into and out of the medicine-taking support apparatus 300. FIG. 4 is a perspective view illustrating drawers 20 for the cartridge storing device 9, and entrances for the medicine distribution trays 30 of the medicine-taking support apparatus 300 in FIG. 3.

FIGS. 3 and 4 illustrate the medicine-taking support apparatus 300 according to the second embodiment of the present disclosure. In the medicine-taking support apparatus 300 according to the second embodiment of the present disclosure, a plurality of cartridges 10 that stores one-dose-package medicine packs can be loaded in a configuration corresponding to the first storage 1 of the item storage apparatus 200 according to the first embodiment of the present disclosure described with reference to FIGS. 1 and 2. In the configuration, the plurality of cartridges 10 can be arranged in a grid pattern, or in rows and columns Hereinafter, the first storage 1 of the item storage apparatus 200 according to the first embodiment of the present disclosure will be referred to as the "cartridge storing device 9" in the medicine-taking support apparatus 300 according to the second embodiment of the present disclosure. Therefore, the cartridge storing device 9 of the medicine-taking support apparatus 300 according to the second embodiment of the present disclosure functions as a first storage of the present disclosure.

Although hereinafter, the detailed description will be focused on the medicine-taking support apparatus 300 with reference to the drawings including and after FIG. 3, the detailed description naturally and indirectly describes the item storage apparatus 200 corresponding to a generic concept of the medicine-taking support apparatus 300. In this case, the "cartridge storing device 9" of the medicine-taking support apparatus 300 is interpreted as the "first storage 1" in the item storage apparatus 200, and the "medicine distribution trays 30" of the medicine-taking support apparatus 300 described below are interpreted as the "second storage 3" in the item storage apparatus 200.

Each of the cartridges 10 included by the cartridge storing device 9 stores a pile of one-dose-package medicine packs (hereinafter also simply referred to as "packs") of one type (see FIGS. 6A and 6B described below). Such a volume is secured that the number of the packs accommodated in each of the cartridges 10 is, for example, fourteen packs for two weeks. The maximum number of types of medicine accommodated in the medicine-taking support apparatus 300 is the number of the cartridges 10. For example, if sixteen cartridges 10 in an array in four rows and four columns are loaded in one tier, total forty-eight cartridges 10 can be stored in a configuration of three tiers. That is to say, forty-eight types of medicine can be accommodated. In this case, if one tenant takes medicine four times, or before breakfast, lunch, supper, and going to bed, in a health care facility or the like, medicine to be taken by twelve people for two weeks can be provided.

As illustrated in FIGS. 3 and 4, each of the cartridges 10 can be loaded into and unloaded from the cartridge storing device 9. More specifically, in the cartridge storing device 9, a structure of the drawers 20 of the medicine-taking support apparatus 300 allows the plurality of cartridges 10 to be taken out and into from the outside at one time.

As illustrated in FIG. 4, the drawers 20 in which the cartridge storing device 9 is disposed are taken in and out through entrance ports 41, 42, and 45 by means of slide rails 22 attached on the left and the right. A user holds a handle 21 in the front of the drawer 20 to take in or out the drawer 20.

Here, the "user" means a person who actually takes medicine in a one-dose-package medicine pack, a helper or a supporter who helps or supports the medicine taking, and staff and the like in various health care facilities, medical facilities, and the like (conceptionally including a pharmacist, a nurse, a caregiver, or a medicine-taking supporter, the same applies hereinafter).

To take a pack out of each of the cartridges 10 of the cartridge storing device 9, picking operation of a carriage 50 described below pulls out the packs one by one from a lower portion of the cartridge 10. Picking from the lower portion of the cartridge 10 lowers a pile of remaining packs in the cartridge 10, and a pack to be picked is always at the same position. Therefore, the picking is performed by the same picking operation irrespective of the amount of remaining packs. Since the bottom of the cartridge storing device 9 has holes corresponding to each of the disposed cartridges 10 (corresponding to openings 17 of the cartridges 10 described below for taking out a pack), a picked pack is conveyed out through the hole from a downward direction of the cartridge storing device 9.

The second storage 3 disposed in the center of the medicine-taking support apparatus 300 can be loaded and unloaded. Therefore, the second storage 3 can be taken out of the medicine-taking support apparatus 300, and can provide a plurality of tenants with medicine taking for one opportunity. Hereinafter, the second storage 3 of the item storage apparatus 200 will be referred to as the "medicine distribution trays 30" as medicine distribution stands in the medicine-taking support apparatus 300. Therefore, the medicine distribution trays 30 of the medicine-taking support apparatus 300 function as a second storage of the present disclosure.

The medicine distribution trays 30 are loaded in two positions in the medicine-taking support apparatus 300 illustrated in FIG. 3. Therefore, medicine taking for two opportunities can be prepared in advance. The medicine-taking support apparatus 300 also has entrance ports 43 and 44 in a side of the medicine-taking support apparatus 300 in FIG. 3 (the front side in a front view). The entrance ports 43 and 44 are for taking in and out the medicine distribution trays 30.

As illustrated in FIGS. 3 and 4, the entrance ports 43 and 44 for the medicine distribution trays 30 include opening-and-closing doors 31 that are openable and closable. The opening-and-closing doors 31 each also include a handle 32 at the front of the opening-and-closing door 31. FIG. 3 illustrates a state where the opening-and-closing door 31 of the entrance port 44 is opened to take in or out the medicine distribution tray 30. Taking in and out the medicine distribution trays 30 may be performed with a drawing configuration.

As illustrated in FIG. 4, the medicine distribution tray 30 includes sections 33 for a number of people for whom packs are provided. The carriage 50 that has moved to over the sections 33 moves forward, backward, left, and right, and drops a pack into each of the sections 33 to distribute the pack to each of the sections 33. For example, partitions in three rows and four columns are provided to classify twelve packs necessary at breakfast for twelve people, and a specific pack to be taken is provided for the section 33 corresponding to each medicine-taking person, on the basis of medicine-taking information and addresses that have been stored in advance. To increase convenience, separate boxes for a number of people for whom medicine is separately distributed may be removably loaded in the medicine distribution trays 30.

Figure 5B:
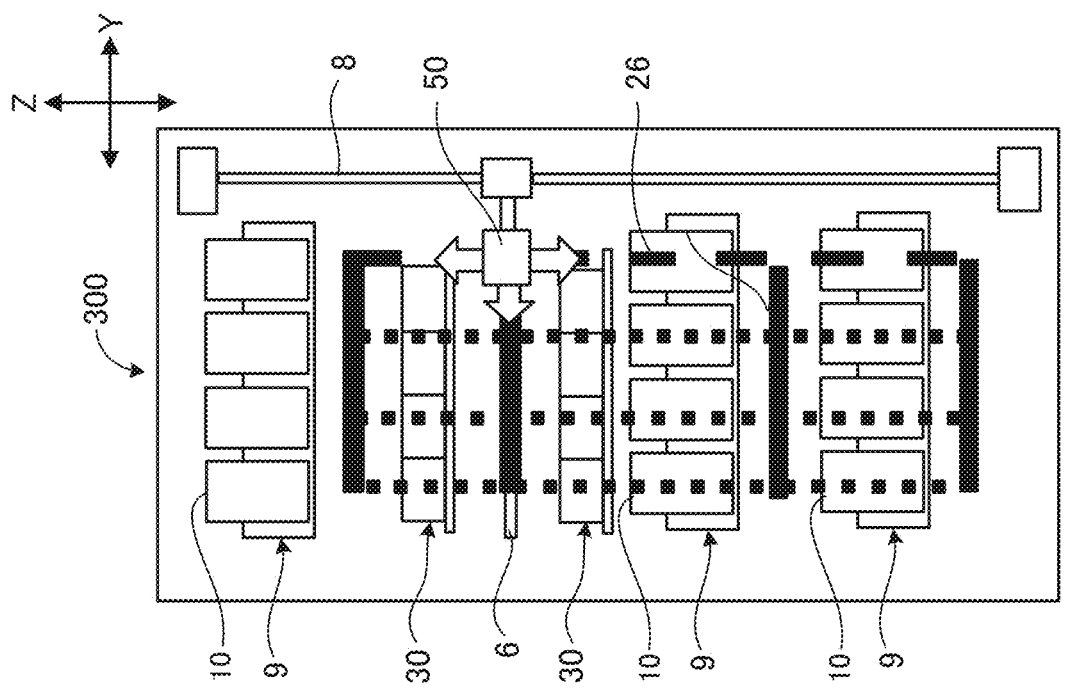
FIG. 5B is a right side view of FIG. 5A.
Figure 5A:
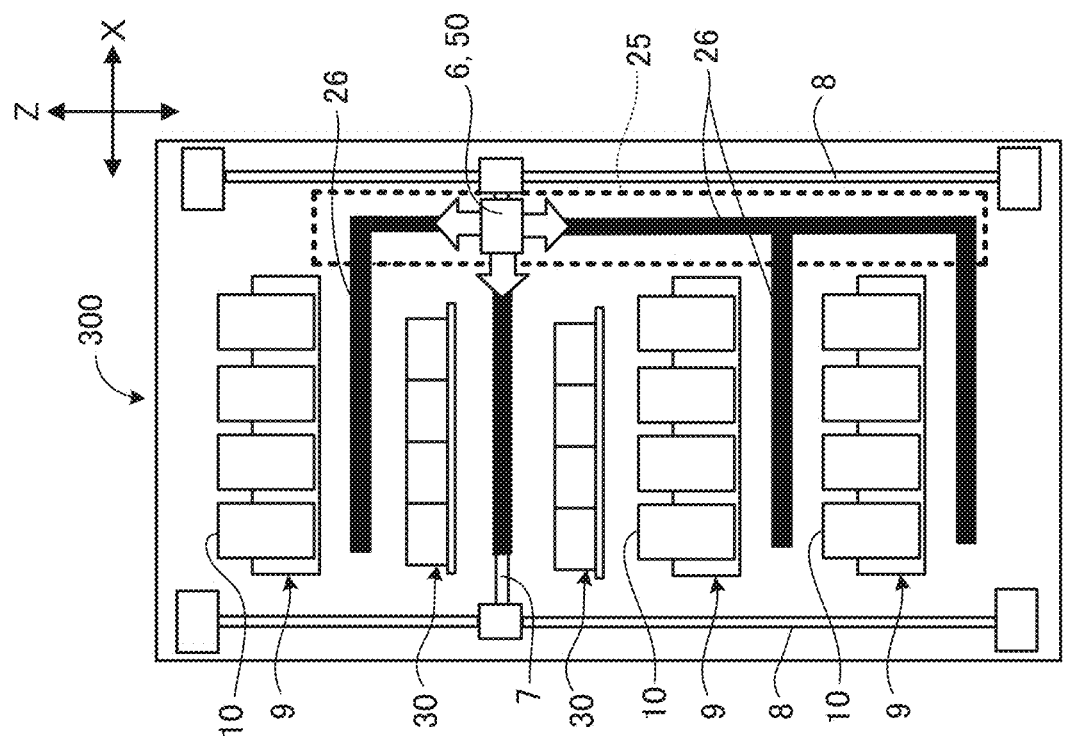
FIG. 5A is a front view illustrating a movement path of a carriage of the medicine-taking support apparatus.

A movement path 26 of the carriage 50 of the medicine-taking support apparatus 300 will be described with reference to FIGS. 5A and 5B. FIG. 5A is a front view illustrating the movement path 26 of the carriage 50 of the medicine-taking support apparatus 300. FIG. 5B is a right side view of FIG. 5A.

In FIGS. 5A and 5B, the movement path 26 of the carriage 50 is illustrated with thick solid lines. In FIG. 5A seen from the front of the medicine-taking support apparatus 300, the carriage 50 and the first arm 6 are illustrated at the same position. However, the carriage 50 moves in a shape like U to move up and down and go to and come from each of the tiers, and the whole movement path 26 is like comb teeth. When the carriage 50 and the first arm 6 transfer a pack taken out of a specified cartridge 10 in the cartridge storing device 9, to the medicine distribution tray 30, the carriage 50 and the first arm 6 are withdrawn to an upward-or-downward-movement range 25 (in a broken-line square frame in FIG. 5A) to move up or down.

Due to the movement path 26 of the carriage 50 described above, a drawer structure is compatible, as illustrated in FIG. 3, in the medicine-taking support apparatus 300 in which the carriage 50 that is movable in the three directions goes and comes in the multi-tier structure. Since the cartridges 10 are taken into and out of the cartridge storing device 9 through the front side of the medicine-taking support apparatus 300, and the medicine distribution trays 30 are taken in and out through the front side of the medicine-taking support apparatus 300, a user can easily perform the work.

Although in FIG. 5A, the cartridge storing device 9 and the medicine distribution trays 30 include total five tiers, the movement path 26 has four branches that are smaller by one. The reason is that at the highest branch of the movement path 26, the cartridge storing device 9 at the highest tier, a movement space under the cartridge storing device 9 at the highest tier, a movement space over the medicine distribution tray 30 at the next tier, and the medicine distribution tray 30 at the next tier sequentially and continuously align. That is to say, a path through which the carriage 50 takes a pack out of a cartridge 10 of the cartridge storing device 9, and holds and conveys out the pack, and a path through which the pack conveyed out by the carriage 50 is stored in the medicine distribution tray 30 are a common path.

The configuration decreases one branch from the movement path 26, and the configuration occupies a smaller space. Further, since vertical movement of the carriage 50 is omitted at the portion, improvement in productivity is expected. In other words, one of spaces where the carriage 50 horizontally moves is decreased, and the height of the medicine-taking support apparatus 300 is decreased.

When seen in the right side view of the medicine-taking support apparatus 300 illustrated in FIG. 5B, the movement path 26 of the carriage 50 at each of the tiers is illustrated with thick solid lines under the cartridge storing device 9 or over the medicine distribution trays 30. The thick solid lines are ranges where the carriage 50 horizontally moves forward or backward in the medicine-taking support apparatus 300. Further, three thick dotted lines and one thick broken line illustrated in the vertical direction Z indicate main movement paths of the carriage 50 corresponding vertical movement of the carriage 50 in the upward-or-downward-movement range 25 illustrated with the broken-line square frame in FIG. 5A. Among the lines, the broken line on the right is a movement path of the carriage 50 that is closest to the base end (root) side of the first arm 6. Further, the broken line on the right is a position where an effect of a load acting on the first arm 6 is relatively small since the first arm 6 has a support structure of a cantilever type. The effect will be described in detail with reference to FIG. 13 described below.

The cartridge 10 will be described with reference to FIGS. 6A and 6B. FIG. 6A is a bottom view of the cartridge 10. FIG. 6B is a perpendicular cross-sectional view of the cartridge 10 in FIG. 6A. To simplify and clarify the perpendicular cross-sectional view of FIG. 6B, pressure-fixed portions 2b of packs 2 stored in the cartridge 10 are intentionally not illustrated, and the packs 2 are schematically and exaggeratedly illustrated in FIG. 6B. Further, cross-sectional hatching of supports (a left support 12, a right support 13, and the like) is not illustrated for the same purpose.

As contents of packs 2 in one cartridge 10, medicine to be taken at one opportunity for a plurality of days, for example, medicine that a medicine-taking person A takes in the morning for fourteen days, is stored. Therefore, if the person A takes medicine in the noon, evening, and before going to bed, in addition to the morning, the cartridges 10 total four. The example is not limiting but each medicine-taking person can be dealt with, for example. A first day's morning→noon→evening→before going to bed→a second day's morning→noon→evening . . . in the order from the direction in which packs 2 are taken out of the cartridge 10 may be possible.

The cartridge 10 mainly includes a case 11, a lid 14, an opening 17 for taking out a pack 2, a movable sheet 16, a device 15 for holding postures of packs 2, and a left support 12 and a right support 13 as supports.

The case 11 has a function of storing a plurality of packs 2. The case 11 is integrally made of resin, or includes separate components made of resin, for example. The lid 14 has a function of allowing packs 2 to be taken in and out.

The opening 17 for taking out a pack 2 is formed through a lower portion or the bottom of the case 11, and is an opening for taking a pack 2 out of the inside of the cartridge 10. The opening 17 for taking out a pack 2 has a function of allowing a pack 2 that the carriage 50 (see FIG. 3 and other drawings, and the detailed configuration and operation will be described below) takes out of the cartridge 10 to be passed through.

The movable sheet 16 has a function of preventing packs 2 from falling down, and a function of moving, after a first pack 2 of a maximum number of packs 2 that can be stored in the case 11 is taken out, a pack 2 at the bottom, to the vicinity of the opening 17 for taking out a pack 2.

The device 15 for holding postures of packs 2 has a function of holding postures of packs 2.

The left support 12 and the right support 13 have a function of supporting or holding packs 2 in the case 11.

In the present example, the left support 12 has a movable flap mechanism. Therefore, the carriage 50 can smoothly take out a pack 2. The left support 12 is openably and closably provided at an end of a left bottom wall of the opening 17 for taking out a pack 2 formed through a bottom wall of the case 11. The left support 12 can swing on a rotation shaft 12a to open and close. The rotation shaft 12a is at the end of the left bottom wall of the opening 17 for taking out a pack 2.

That is to say, when the carriage 50 takes a pack 2 out of the cartridge 10, the left support 12 allows the passage of the pack 2. On the other hand, when a pack 2 is not taken out of the cartridge 10, the left support 12 restricts passage of a plurality of packs 2 in the case 11 to store and hold the packs 2.

More specifically, a twisted coil spring is fitted between the rotation shaft 12a of the left support 12 and the end of the left bottom wall, and the twisted coil spring has an energizing force within a predetermined range. The energizing force is set in such a manner that when the carriage 50 takes a pack 2 out of the cartridge 10, the left support 12 allows passage of the pack 2, and when the carriage 50 does not take a pack 2 out of the cartridge 10, a maximum number of packs 2 that can be stored in the case 11 and the movable sheet 16 are stored and held.

The right support 13 is provided at an end of a right bottom wall of the opening 17 for taking out a pack 2. The right support 13 includes an elastic member that can elastically deform. The right support 13 and the left support 12 operate together to allow the carriage 50 to smoothly take out a pack 2.

As described above, provided at a lower portion of the cartridge 10 are the opening 17 for taking out a pack 2, and the left support 12 and the right support 13. The left support 12 and the right support 13 support packs 2 in the cartridge 10, and can be opened and closed by taking-out operation of the carriage 50 that takes a pack 2 out of the cartridge 10, as described in detail in the configuration and operation of the carriage 50 described below.

The device 15 for holding postures of packs 2 includes sponge rubber having an appropriate elasticity. The movable sheet 16 includes, for example, resin or metal. The device 15 for holding postures of packs 2, and the movable sheet 16 are for holding normal postures of a plurality of packs 2 stored in the case 11 (as clearly illustrated in FIG. 6B, holding postures of packs 2 neatly in substantially horizontal states along the vertical direction Z).

To demonstrate the functions described above, the movable sheet 16 is set in such a manner that the movable sheet 16 is lowered downward in the Z direction in the case 11 by the weight of the movable sheet 16 to surely move at least one pack 2 remaining in the case 11 to the vicinity of the opening 17 for taking out a pack 2.

Figure 6B:
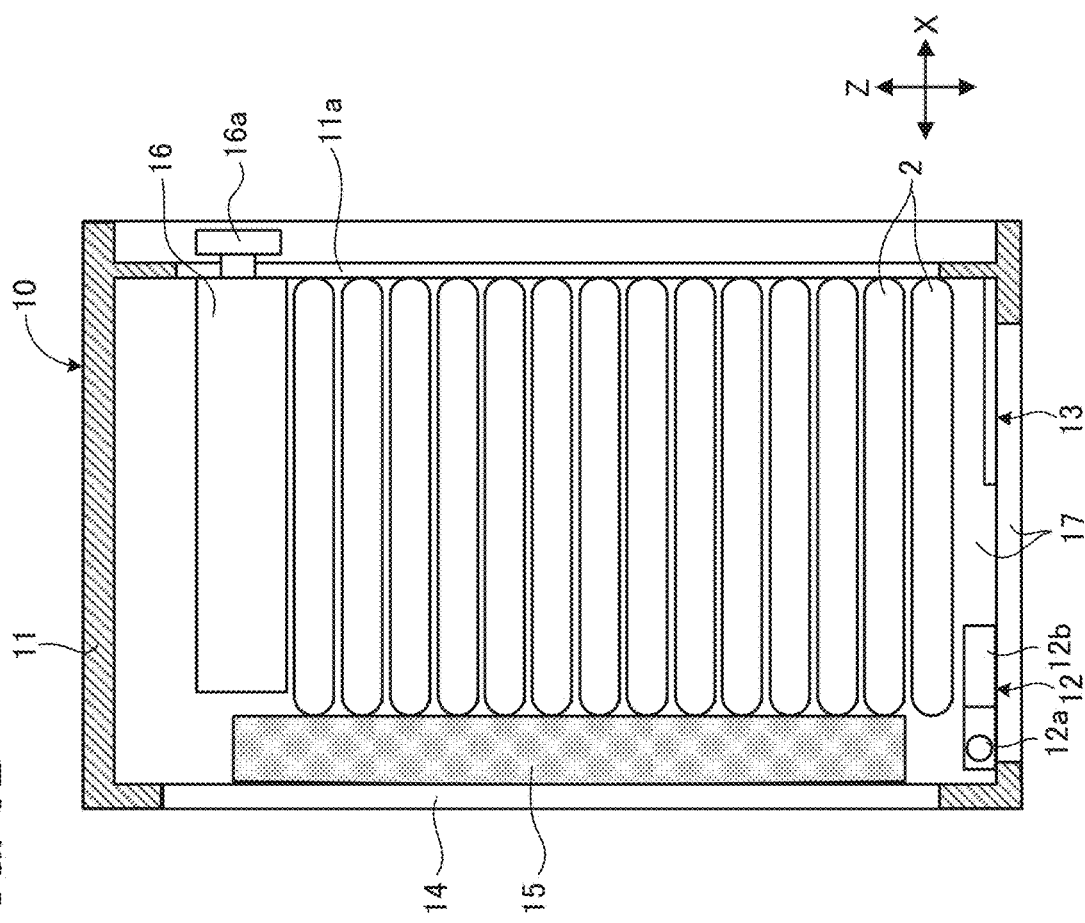
FIG. 6B is a perpendicular cross-sectional view of the cartridge in FIG. 6A.

As illustrated in FIG. 6B, a side wall of the case 11 has a long groove 11a. The long groove 11a has a predetermined width in the left or right direction (X direction) and extends in the Z direction. An end of the movable sheet 16 on one side includes a shaft 16a. The shaft 16a is flanged and protrudes from the long groove 11a. Since the shaft 16a is guided along the long groove 11a in the Z direction, the movable sheet 16 can hold postures of packs 2 neatly in substantially horizontal states along the Z direction. Packs 2 in the cartridge 10 are piled and stored in postures in substantially horizontal states.

The lid 14 allows staff or the like in a health care facility or the like to take in or out packs 2 stored in the cartridge 10. The lid 14 is long in the Z direction of the case 11, and has a predetermined opening width, as illustrated in FIG. 6B.

Here, a summary of a single one-dose-package medicine pack used in the medicine-taking support apparatus 300 will be described. As illustrated in FIG. 6A, one pack 2 includes, for example, resin film. Medicines (not illustrated), such as capsules or tablets, are separated and put in a pack 2. A pack 2 has a bag portion 2a that covers the medicine, and a pressure-fixed portion 2b at which three sides are fixed by pressure or welded. A side on the bag portion 2a side is usually folded in two. The medicine is sandwiched between the folded side. The pressure-fixed portion 2b forms a leakage prevention portion that prevents the medicine from leaking from the bag portion 2a. One one-dose-package medicine pack 2 is usually a unit of medicine to be taken by a medicine-taking person at each time.

Figure 6A:
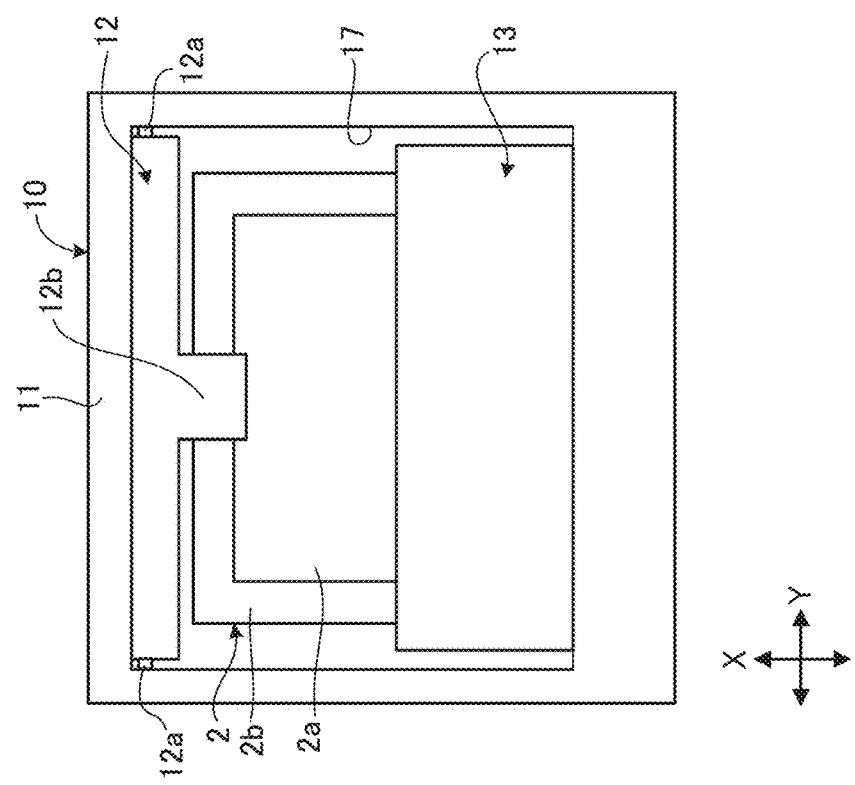
FIG. 6A is a bottom view of the cartridge.

In an example illustrated in FIG. 6A, a pack 2 has a rectangular shape in a plan view. Such a packing method for sealing three sides by pressure fixing as in the example is generally referred to as three-side packing. Most sold medicine-dividing-and-packing machines use the method for packing.

A pressure-fixed portion 2b has a belt-like width of approximately 10 to 15 mm, and has a higher rigidity than the rigidity of a bag portion 2a that is like a film and transparent or translucent to allow the medicine to be seen.

Packs 2 are stored upward in order in the case 11 through the opening 17 for taking out a pack 2 on the left support 12 and right support 13 side.

A timing at which the inside of the cartridge 10 is replenished with packs 2 may be, for example, a timing of medical examination of a medicine-taking person (tenant) in a health care facility or the like (normally, two weeks), or a timing at which packs 2 in the cartridge 10 run out. If packs 2 remain in the cartridge 10 at a time of replenishment, the cartridge 10 is replenished with packs 2, after the remaining last pack 2 in the first-in-first-out method.

Figure 7B:
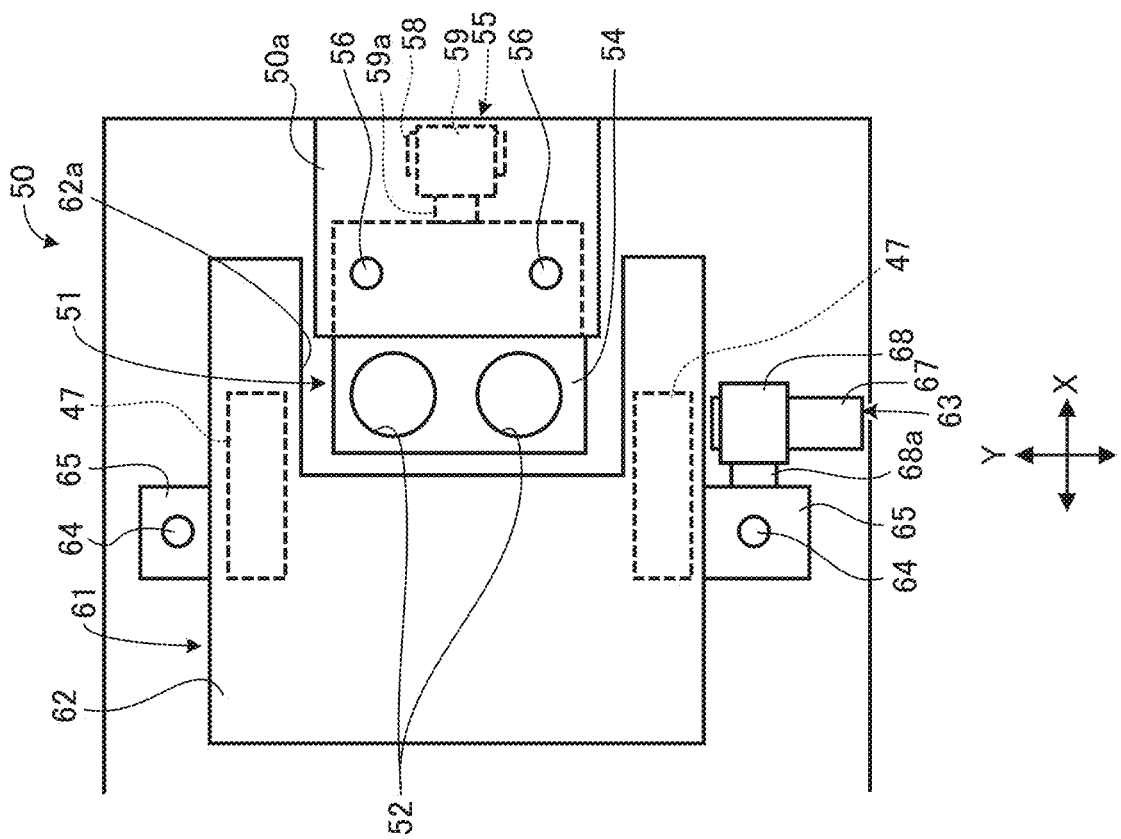
FIG. 7B is an enlarged plan view of FIG. 7A.
Figure 7A:
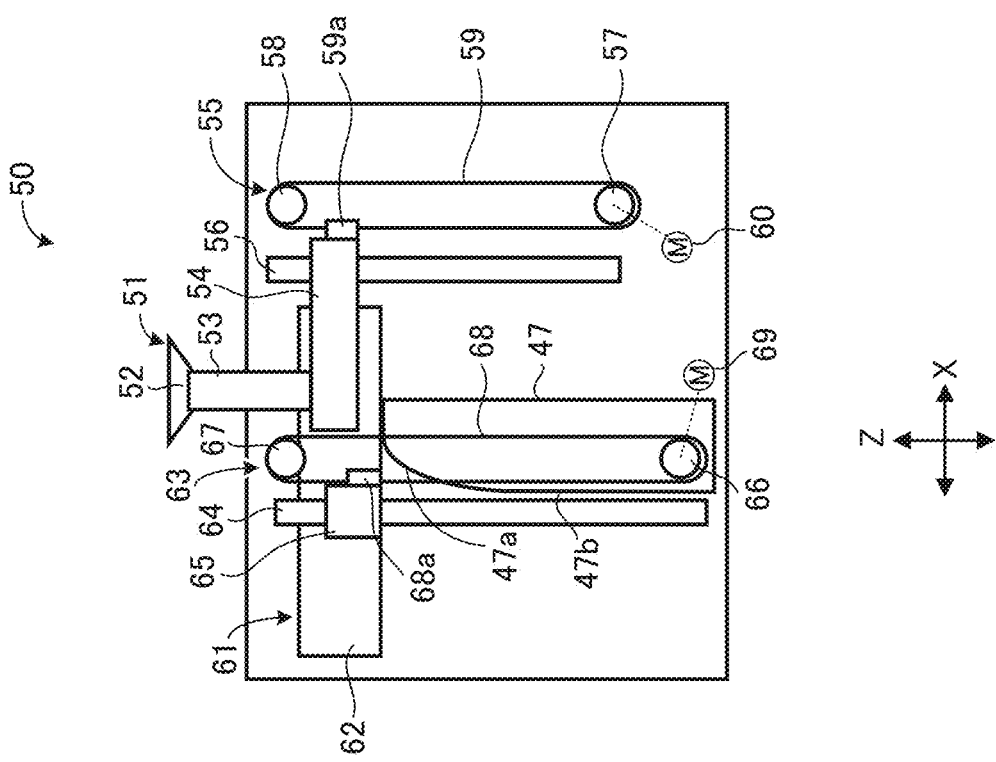
FIG. 7A is a front view illustrating a configuration of the carriage.

A configuration and operation of the carriage 50 will be described with reference to FIGS. 7A to 9E. FIG. 7A is a front view illustrating a configuration of the carriage 50. FIG. 7B is an enlarged plan view of FIG. 7A. FIGS. 8A, 8B, 8C, 8D, and 8E are front views illustrating a transition of picking operation of the carriage 50. FIGS. 9A, 9A', 9B, 9C, 9D, and 9E are front views illustrating a transition of medicine distribution operation of the carriage 50.

As illustrated in FIGS. 7A and 7B, the carriage 50 includes a suction device 51 that takes a pack 2 out of a cartridge 10 fitted to the cartridge storing device 9, and a holding device 61 that includes a holding tray 62 that holds the taken-out pack 2.

The suction device 51 includes a suction pump 48 that is an air type (illustrated only in FIG. 21 described below). The suction device 51 is made to be in a negative-pressure state by the suction pump 48 to suck a pack 2. The suction pump 48 may be disposed in the carriage 50, or may be disposed in another portion in the medicine-taking support apparatus 300. When the suction pump 48 is disposed in the medicine-taking support apparatus 300, the suction device 51 is coupled to the suction pump 48 via a communication member such as an air tube.

The suction device 51 includes a pair of suction pads 52 provided in the Y direction and communicating with the suction pump 48 to suck a pack 2, suction ducts 53 coupled to the suction pads 52, a duct-coupling member 54 coupled to the suction ducts 53, and a mechanism 55 for moving up or down the suction device 51 that moves a combination of the suction pads 52, the suction ducts 53, and the duct-coupling member 54 in the Z direction.

The mechanism 55 for moving up or down the suction device 51 includes a pair of guide rods 56 provided in the Y direction and guiding the duct-coupling member 54 in the Z direction, a belt 59 that is endless and is wound around a driving pulley 57 and a driven pulley 58, and a movement motor 60 for moving up or down the suction device 51. The movement motor 60 for moving up or down the suction device 51 is coupled to the driving pulley 57 through driving-transmitting members, such as a gear and a belt.

The duct-coupling member 54 is coupled and secured to the belt 59 with a belt-gripping device 59a. The guide rods 56 include linear-movement guides, and are securely disposed on a guide-rod-holding member 50a adhered to the carriage main-body frame side of the carriage 50. The movement motor 60 for moving up or down the suction device 51 is securely disposed on the carriage main-body frame side of the carriage 50.

The movement motor 60 for moving up or down the suction device 51 is a control-object-driving member of the mechanism 55 for moving up or down the suction device 51 (see FIG. 21 described below). The mechanism 55 for moving up or down the suction device 51 also includes a suction device home position (hereinafter simply referred to as "HP") sensor 70 (illustrated only in FIG. 21 described below) that detects a HP of the suction pads 52 in the Z direction. The suction device HP sensor 70 is a thru-beam photosensor provided on the carriage main-body frame side near a vertical movement path of the duct-coupling member 54. The duct-coupling member 54 includes a light-blocking member or a light-blocking piece (filler). The light-blocking member or the light-blocking piece (filler) engages with the suction device HP sensor 70 at a selected position, and protrudes from the duct-coupling member 54.

The holding device 61 includes the holding tray 62 as a receiving stand for temporarily holding a taken-out pack 2. The holding device 61 also includes a mechanism 63 for rotating or moving up or down the holding device 61. The mechanism 63 for rotating or moving up or down the holding device 61 moves the holding tray 62 in the Z direction and rotates the holding tray 62 by 90 degrees to change a posture of a held pack 2.

The holding tray 62 has a substantially housing (box) shape to temporarily hold a taken-out pack 2. The holding tray 62 has a depression shape 62a for avoiding interference with the above-described combination (the suction pads 52, the suction ducts 53, and the duct-coupling member 54) of the suction device 51.

A holding member (receiving stand) that holds a pack 2 taken out by the suction device 51 may have a simple box shape, such as the holding tray 62, or may include a clip that moves together with movement of the holding member, and may grip a taken-out pack 2.

The mechanism 63 for rotating or moving up or down the holding device 61 includes a pair of guide rods 64 provided in the Y direction and guiding the holding tray 62 in the Z direction, a pair of posture-change-assisting members 47 provided in the Y direction to change a posture of the holding tray 62, and guide-rod-holding members 65 coupled to both sides, in the Y direction, of the holding tray 62 in such a manner that a posture of the holding tray 62 can be changed. The mechanism 63 for rotating or moving up or down the holding device 61 also includes a belt 68 that is endless and is wound around a driving pulley 66 and a driven pulley 67, and a movement motor 69 for rotating or moving up or down the holding device 61. The movement motor 69 for rotating or moving up or down the holding device 61 is coupled to the driving pulley 66 through driving-transmitting members, such as a gear and a belt.

Figure 10A:
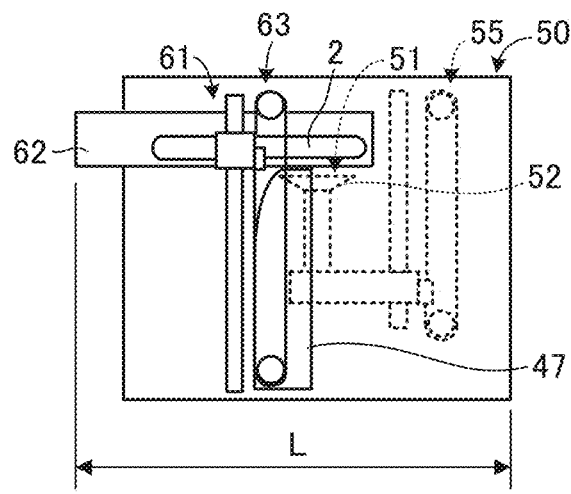
FIGS. 10A and 10B are drawings illustrating a timing at which a holding tray of the carriage is rotated, and an effect of the timing.

In FIG. 10A, the posture-change-assisting members 47 have inclined portions 47a in upper left portions of the posture-change-assisting members 47. The guide rods 64 include linear-movement guides, and are adhered to the carriage main-body frame side of the carriage 50. One of the guide-rod-holding members 65 is coupled and secured to the belt 68 with a belt-gripping device 68a. The movement motor 69 for rotating or moving up or down the holding device 61 is securely disposed on the carriage main-body frame side of the carriage 50.

The movement motor 69 for rotating or moving up or down the holding device 61 is a control-object-driving member of the mechanism 63 for rotating or moving up or down the holding device 61 (see FIG. 21 described below). The mechanism 63 for rotating or moving up or down the holding device 61 includes a holding-device HP sensor 72 (illustrated only in FIG. 21 described below) that detects a home position (HP) of the holding tray 62 in the Z direction. The holding-device HP sensor 72 is a thru-beam photosensor provided on the carriage main-body frame side near a vertical movement path of one of the guide-rod-holding members 65. The guide-rod-holding member 65 includes a light-blocking member or a light-blocking piece (filler). The light-blocking member or the light-blocking piece (filler) engages with the holding-device HP sensor 72 at a selected position, and protrudes from the guide-rod-holding member 65.

Note that the mechanism 55 for moving up or down the suction device 51, and the mechanism 63 for rotating or moving up or down the holding device 61 that have been described above may include a linear reciprocation mechanism including a rack and pinion, instead of the vertical reciprocation mechanism using belt driving.

A transition of picking operation of the carriage 50 will be described with reference to FIGS. 8A to 8E. To simplify and clarify the description, it is supposed that operation of a three-direction movement mechanism 90 illustrated in FIGS. 11A and 11B described below has positioned the carriage 50 between the cartridge storing device 9 disposed at the highest portion in FIGS. 5A and 5B and the medicine distribution tray 30 disposed directly under the cartridge storing device 9.

As illustrated in FIG. 8A, operation of the three-direction movement mechanism 90 described below has moved the carriage 50 to under a cartridge 10 fitted to the cartridge storing device 9 not illustrated, and the carriage 50 has been stopped. At this time, the movement motor 60 for moving up or down the suction device 51 of the mechanism 55 for moving up or down the suction device 51 has been stopped, and the suction pads 52 are closely under the holding tray 62 in a horizontal state.

Then as illustrated in FIG. 8B, operation of the movement motor 60 for moving up or down the suction device 51 moves the suction pads 52 in the upward direction, and the suction pads 52 enter the opening 17 for taking out a pack 2, between the left support 12 and the right support 13, to come in contact with a pack 2 at a lowest portion of the cartridge 10 and simultaneously suck the pack 2. At this time, the suction pump 48 has been driven in advance so that the suction operation can be performed.

Next, as illustrated in FIG. 8C, reverse operation of the movement motor 60 for moving up or down the suction device 51 moves the suction pads 52 in the downward direction while the suction pads 52 are sucking the pack 2. Consequently, the pack 2 is pulled out of the inside of the cartridge 10. Since the opening 17 of the cartridge 10 for taking out a pack 2 is like a flap due to the above-described energizing force of the twisted coil spring (not illustrated) within a predetermined range, the opening 17 of the cartridge 10 for taking out a pack 2 is opened or closed by the pulling-out operation of the suction pads 52.

Further, next picking operation that picks a pack 2 and picking operation that picks a pack 2 after the next picking operation can perform the next picking since packs 2 in the whole cartridge 10 lower by one pack 2, and the next pack 2 is caught by the left support 12 and the right support 13.

Next, as illustrated in FIGS. 8D and 8E, the pulled-out pack 2 is placed on and held by the holding tray 62. Then the suction pump 48 is stopped, and the suction pads 52 lower to a position where the suction pads 52 are not in contact with the pulled-out pack 2, that is to say a position closely under the holding tray 62 that is in a lateral horizontal state, similarly as illustrated in FIG. 8A (that is also a HP of the suction pads 52). At this time, an outside bottom wall surface of the holding tray 62 is in contact with outside upper wall surfaces of the posture-change-assisting members 47.

A transition of medicine distribution operation of the carriage 50 will be described with reference to FIGS. 9A, 9A', 9B, 9C, 9D, and 9E. Here, medicine distribution operation will be described in which a posture of the holding tray 62 changes to move a pack 2 in the holding tray 62 to a separate box 34 that can be loaded into and unloaded from the medicine distribution tray 30. The medicine distribution operation is performed in the following order. Note that the medicine distribution operation may be medicine distribution operation that moves a pack 2 to a specific section 33 of the medicine distribution tray 30.

First, as illustrated in FIG. 9A, the carriage 50 moves to over the medicine distribution tray 30. After the operation illustrated in FIG. 9A, operation of the suction device 51 is stopped (the suction pads 52 occupy the HP), and only the holding device 61 performs operation. Therefore, the suction device 51 side is illustrated with broken lines, and the holding device 61 side is illustrated with solid lines.

Next, operation that changes a posture of the holding tray 62 that is holding a pack 2 is performed, as illustrated in FIGS. 9A' and 9B. Here, the description will be supplemented by a description of a mechanism that changes a posture of the holding tray 62 that is holding a pack 2. The holding tray 62 rotates 90 degrees to change a posture of a pack 2 in the holding tray 62 from a lateral posture in a horizontal state to a perpendicular posture in a vertical state. Couplers between the holding tray 62 and the guide-rod-holding members 65 are rotatable coupling. Then when rotation of the belt 68 is accompanied by downward movement, in the Z direction, of the guide-rod-holding members 65 along the guide rods 64, an outside bottom wall surface of the holding tray 62 coupled to the guide-rod-holding members 65 comes in contact with the inclined portions 47a of the posture-change-assisting members 47, and then the outside bottom wall surface of the holding tray 62 comes in contact with vertical portions 47b of the posture-change-assisting members 47. Consequently, postures of the holding tray 62 and a pack 2 held by the holding tray 62 are changed from lateral postures in horizontal states to perpendicular postures. At this time, an energizing force of a spring (not illustrated) in a clockwise direction in FIG. 9A acts on the holding tray 62 to make postures of the holding tray 62 and the pack 2 held by the holding tray 62 lateral always.

Next, as illustrated in FIGS. 9C and 9D, further rotation of the belt 68 is accompanied by downward movement, in the Z direction, of the holding tray 62 that is holding the pack 2 and being in a perpendicular state, toward a separate box 34, along the guide rods 64, with the guide-rod-holding members 65 between the holding tray 62 and the guide rods 64. Then when the holding tray 62 in a perpendicular state contacts an upper end of the separate box 34, a bottom 62b of the holding tray 62 is simultaneously opened, and the pack 2 in the holding tray 62 is transferred into the separate box 34. In this way, when the holding tray 62 moves down in the Z direction, the bottom 62b of the holding tray 62 in a perpendicular state is simultaneously opened or closed. The operation is performed by, for example, a mechanism including a protrusion (not illustrated) on the carriage 50 side. The protrusion contacts and opens the bottom 62b when the holding tray 62 in a perpendicular state comes to a certain position.

Note that the protrusion of the carriage 50 is not only in the carriage 50 but part of the protrusion may be on a separate box 34 or the medicine distribution trays 30. Alternatively, an intermediate member (not illustrated) between the drawer 20 (see FIGS. 3 and 4, and other drawings) and the medicine distribution tray 30 may have the function of the protrusion.

Next, as illustrated in FIG. 9E, after the pack 2 in the holding tray 62 is transferred to the medicine distribution tray 30, reverse rotation of the belt 68 is accompanied by upward movement, in the Z direction, of the empty holding tray 62, along the guide rods 64, with the guide-rod-holding members 65 between the holding tray 62 and the guide rods 64.

As described above, the carriage 50 includes the holding device 61 including the holding tray 62, and the holding tray 62 is rotatable to change orientation of a pack 2 (item) after the carriage 50 conveys the pack 2 (item) out of the cartridge storing device 9 (first storage 1).

Figure 10B:
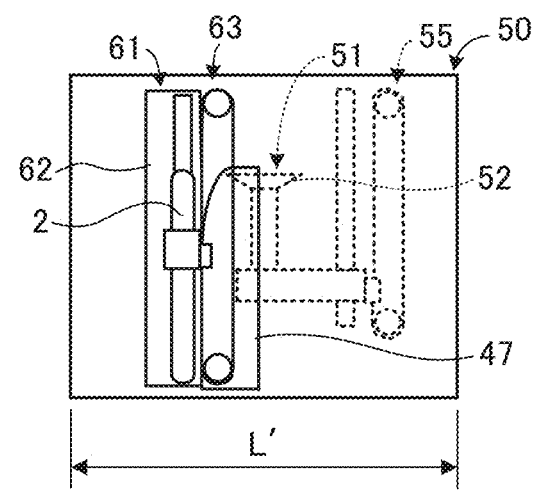

A timing at which the holding tray 62 of the carriage 50 is rotated will be described with reference to FIGS. 10A and 10B. FIG. 10A illustrates a width L of the carriage 50 at a time of FIG. 9A. FIG. 10B illustrates a width L' of the carriage 50 at a time of and after FIG. 9B. When the holding tray 62 of the holding device 61 is in a horizontal state, part of the holding tray 62 protrudes to the left side of the carriage 50 and occupies the width. However, when the holding tray 62 is rotated to be oriented to make postures of the holding tray 62 and a pack 2 vertical, the width occupied by the protrusion of the part of the holding tray 62 is decreased. Therefore, L'<L.

Therefore, if the operation in FIG. 9B is performed immediately after completion of picking operation in FIG. 8E, the width of the upward-or-downward-movement range 25 illustrated in FIG. 5A can be decreased. The upward-or-downward-movement range 25 is necessary when the carriage 50 and the first arm 6 are moved up or down. In other words, the holding tray 62 is rotated before the carriage 50 that is holding a taken-out pack 2 moves back and forth in the vertical direction.

The configuration makes the width of the whole medicine-taking support apparatus 300 more compact.

Figure 11B:
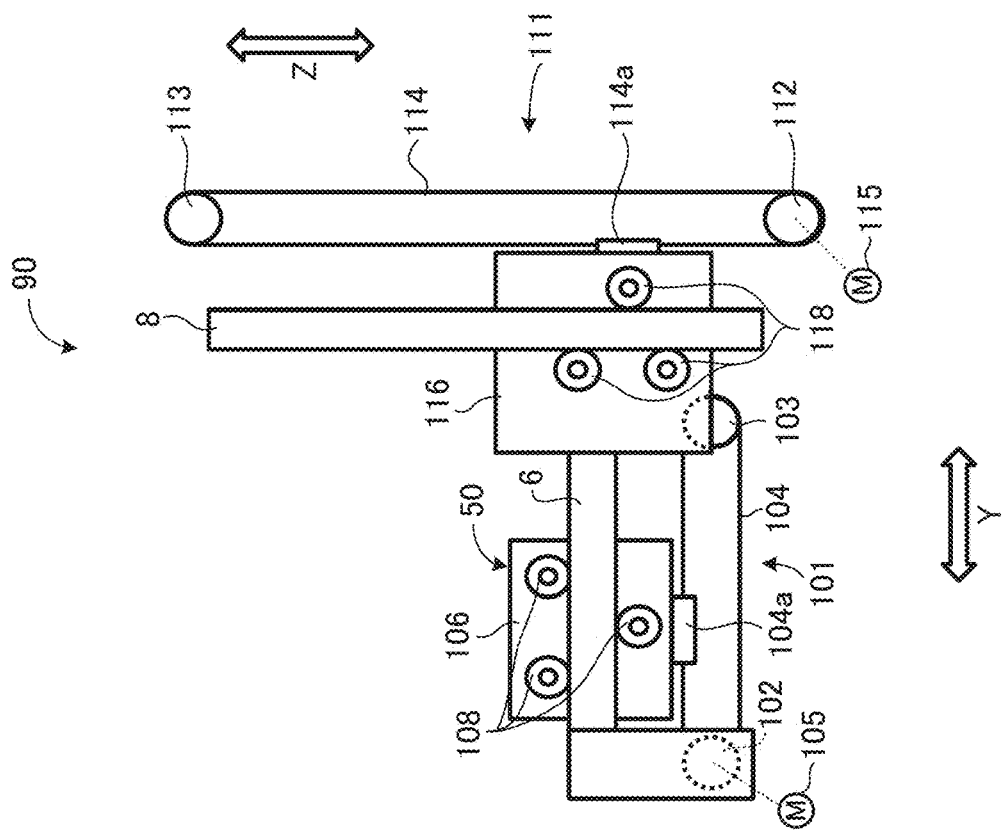
FIG. 11B is a right side view of FIG. 11A.
Figure 11A:
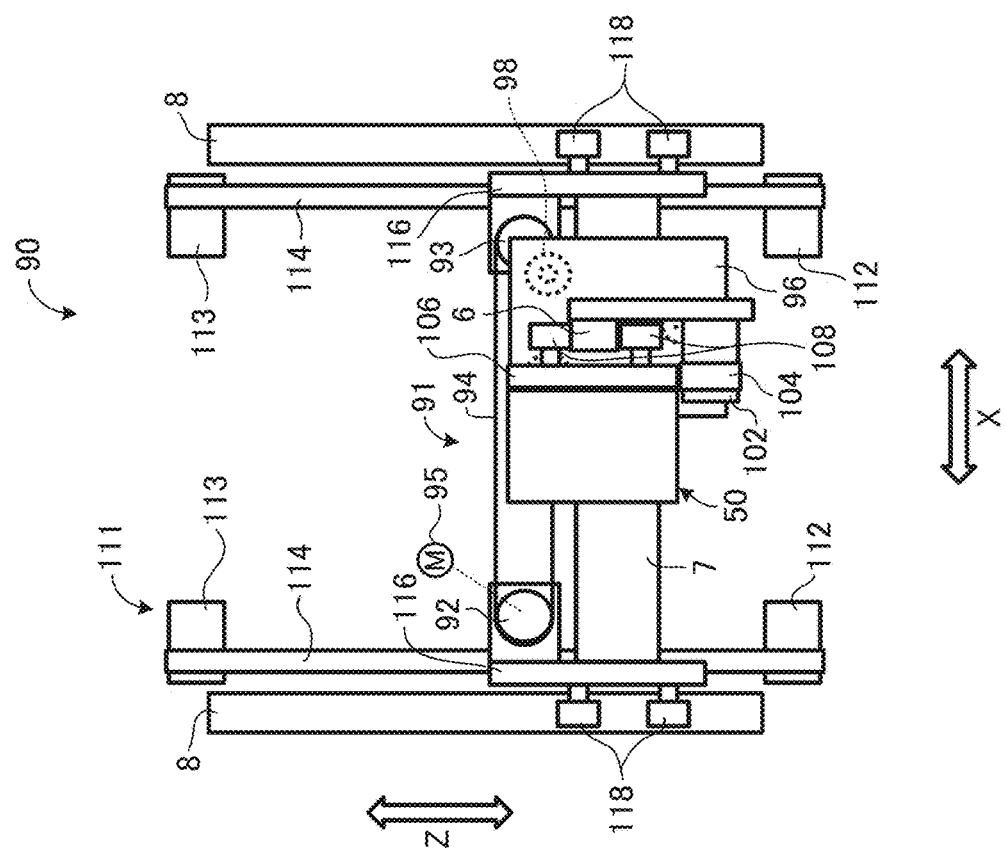
FIG. 11A is a front view illustrating an outline of a three-direction movement mechanism of the carriage.

The three-direction movement mechanism 90 that moves the carriage 50 in three directions will be described with reference to FIGS. 11A and 11B. FIG. 11A is a front view illustrating an outline of the three-direction movement mechanism 90 that moves the carriage 50 in three directions. FIG. 11B is a right side view of FIG. 11A.

As in the configuration of the medicine-taking support apparatus 300 in FIGS. 5A and 5B, cartridges 10 fitted to the cartridge storing device 9 are arranged in planes of upper and lower portions in the Z direction, with the medicine distribution trays 30 between the planes. The medicine distribution trays 30 are over the cartridges 10 in the lowest portion of the cartridge storing device 9. Therefore, the carriage 50 is movable in three directions, that is to say the left or right direction (X direction), the forward or backward direction (Y direction), and the vertical direction (Z direction). In this way, the three-direction movement mechanism 90 as a transfer means or a transfer device that transfers the carriage 50 in the X direction, the Y direction, and the Z direction is provided to transfer a pack 2 taken out of a cartridge 10 by the carriage 50 to the medicine distribution tray 30.

A configuration that moves the carriage 50 in the X direction is an X-direction movement mechanism 91. A configuration that moves the carriage 50 in the Y direction is a Y-direction movement mechanism 101. A configuration that moves the carriage 50 in the Z direction is a Z-direction movement mechanism 111. The X-direction movement mechanism 91, the Y-direction movement mechanism 101, and the Z-direction movement mechanism 111 have similar configurations.

The X-direction movement mechanism 91 includes an X adaptor 96 to which a base end 6a of the first arm 6 is secured, the second arm 7 that supports and guides the carriage 50 in the X direction, with the X adaptor 96 between the second arm 7 and the carriage 50, an endless belt 94 wound around a driving pulley 92 and a driven pulley 93, and an X-direction driving motor 95 coupled to the driving pulley 92 through a driving-force transmission member, such as gears or a belt. That is to say, the base end 6a of the first arm 6 is secured to the X adaptor 96, and is provided on the second arm 7 side, with the X adaptor 96 between the base end 6a and the second arm 7 side. The description "one end of the first support is secured to a second support side" in a first aspect described below and claim 1 strictly means that the one end is attached to the second support side in the relationship described above.

The X adaptor 96 includes three rollers 98 (two of which are hidden by the carriage 50 and are not seen). The three rollers 98 are rotatable and hold the second arm 7 between the three rollers 98. The X adaptor 96 is coupled and secured to the endless belt 94 through a belt-gripping device (not illustrated).

Due to the above-described configuration of the X-direction movement mechanism 91, when the X-direction driving motor 95 is driven, the driving force is transmitted to the endless belt 94 through the above-described driving-force transmission member and the driving pulley 92, the endless belt 94 rotates, and the carriage 50 with the X adaptor 96 moves in the X direction along the second arm 7.

The Y-direction movement mechanism 101 includes a Y adaptor 106 secured to the carriage 50, the first arm 6 that supports and guides the carriage 50 in the Y direction, with the Y adaptor 106 between the first arm 6 and the carriage 50, an endless belt 104 wound around a driving pulley 102 and a driven pulley 103, and a Y-direction driving motor 105 coupled to the driving pulley 102 through a driving-force transmission member, such as gears or a belt.

The Y adaptor 106 includes three rollers 108. The three rollers 108 are rotatable and hold the first arm 6 between the three rollers 108. The Y adaptor 106 is coupled and secured to the endless belt 104 through a belt-gripping device 104a.

Due to the above-described configuration of the Y-direction movement mechanism 101, when the Y-direction driving motor 105 is driven, the driving force is transmitted to the endless belt 104 through the above-described driving-force transmission member and the driving pulley 102, the endless belt 104 rotates, and the carriage 50 with the Y adaptor 106 moves in the Y direction along the first arm 6.

The Z-direction movement mechanism 111 includes a pair of Z adaptors 116 secured to both ends, in the X direction, of the second arm 7, the pair of vertical-movement mechanisms 8 that supports and guides the carriage 50 in the Z direction, with the second arm 7 and the pair of Z adaptors 116 between the pair of vertical-movement mechanisms 8 and the carriage 50, endless belts 114 each wound around a driving pulley 112 and a driven pulley 113, and a Z-direction driving motor 115 coupled to one of the driving pulleys 112 through a driving-force transmission member, such as gears or a belt.

The driving pulley 112, the driven pulley 113, and the endless belt 114 are provided for each of both sides, in the left or right direction X, of the Z-direction movement mechanism 111. The Z-direction driving motor 115 is provided for only one of the driving pulleys 112.

Each of the Z adaptors 116 includes three rollers 118. The three rollers 118 are rotatable and hold the vertical-movement mechanism 8 between the three rollers 118. The Z adaptors 116 are coupled and secured to the respective endless belts 114 through respective belt-gripping devices 114a.

Due to the above-described configuration of the Z-direction movement mechanism 111, when the Z-direction driving motor 115 is driven, the driving force is transmitted to the endless belt 114 through the above-described driving-force transmission member and the driving pulley 112, the endless belt 114 rotates, and the carriage 50 with the second arm 7 and the Z adaptors 116 moves in the Z direction along the vertical-movement mechanisms 8.

Figure 17:
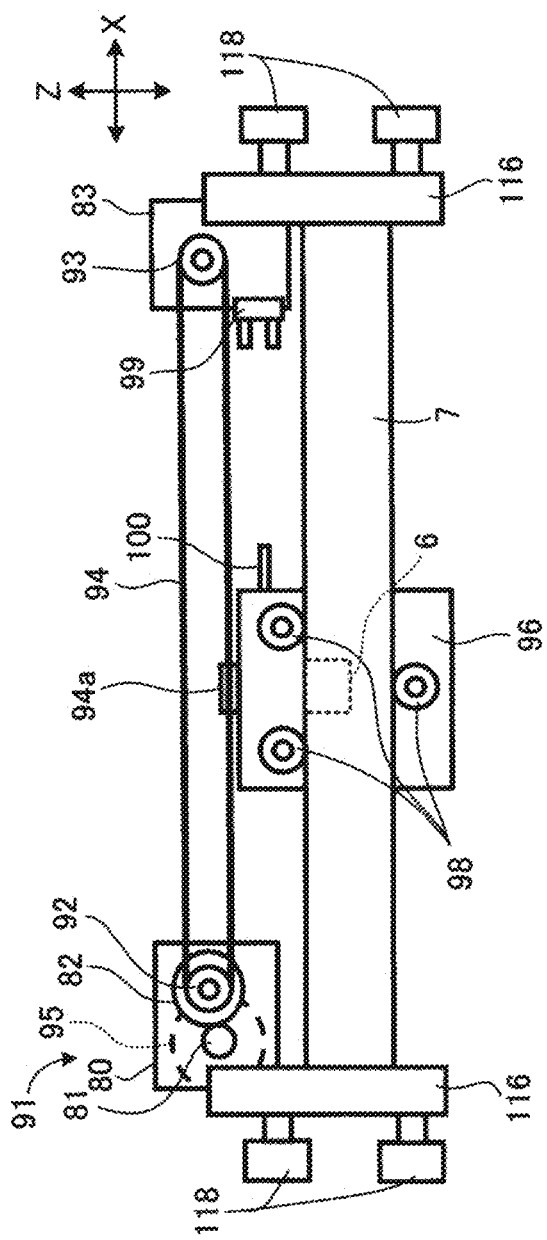
FIG. 17 is a drawing illustrating surroundings around a second arm to which an X-direction HP sensor is fitted.

To control movement of the carriage 50 in the three directions, HP sensors corresponding to the first arm 6, the second arm 7, and the vertical-movement mechanisms 8 are provided to detect whether or not the first arm 6, the second arm 7, and the vertical-movement mechanisms 8 are at predetermined HPs (an example is illustrated in FIG. 17 described below). For the vertical-movement mechanisms 8, for example, a method is possible in which a shutter as a light-blocking member attached to left or right one of the Z adaptors 116 passes across a photointerrupter (a thru-beam photosensor) secured to a main-body frame of the medicine-taking support apparatus 300. The HP may be set at one end of a movement range for convenience of control and a space where the HP sensor is disposed.

The three rollers that support each of the adapters rotatably, with the first arm 6, the second arm 7, or the vertical-movement mechanism 8 between the three rollers, are disposed in a shape like an isosceles triangle. The position of a shaft of the central roller is adjusted in a direction in which the first arm 6, the second arm 7, or the vertical-movement mechanism 8 is pressed to allow smooth back and forth movement of the adaptor.

Conceivable thrust positioning, in a roller shaft direction, of the first arm 6, the second arm 7, or the vertical-movement mechanism 8 is usage of a common flanged roller, or control of movement in a thrust direction with a guide shoe.

Figure 12:
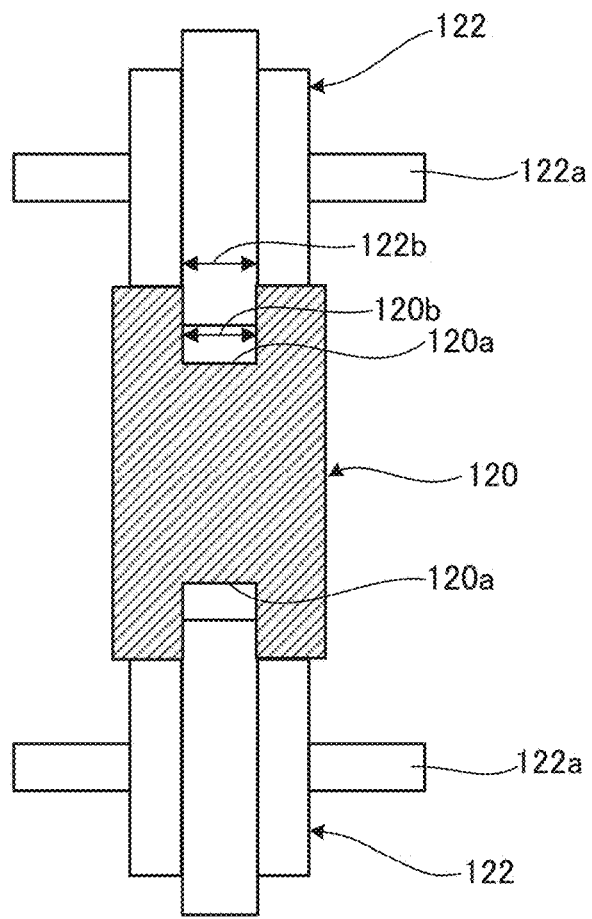
FIG. 12 is a drawing illustrating a thrust positioning configuration using a grooved rail and slot rollers.

An example of a thrust positioning configuration using a grooved rail and slot rollers will be described with reference to FIG. 12. As illustrated in FIG. 12, two slot rollers 122 as members corresponding to the above-described three rollers are in contact with two planes of a grooved rail 120 as a member corresponding to the first arm 6, the second arm 7, or the vertical-movement mechanism 8. A width 120b of a slot 120a on a central rail plane of the grooved rail 120 is substantially equal to a width 122b of a protrusion at the center of the slot roller 122. The grooved rail 120 and the slot roller 122 have fitting shapes. Consequently, a thrust direction of the slot roller 122 relative to the grooved rail 120 is restricted to perform thrust positioning.

Figure 13:
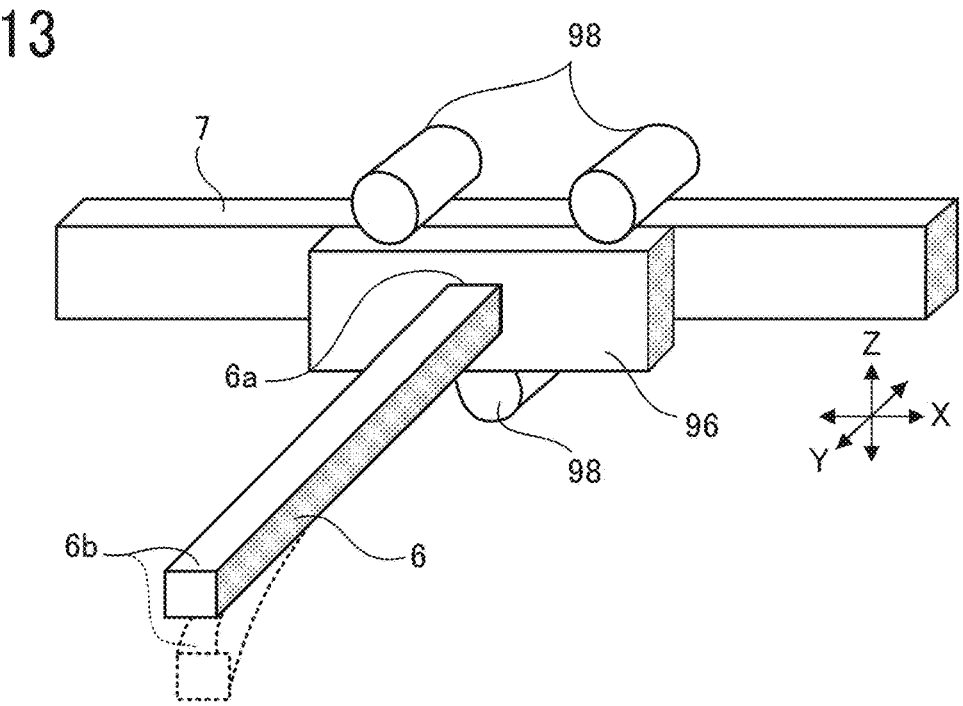
FIG. 13 is a perspective view schematically illustrating a movement mechanism of a first arm.

A disadvantage of a movement mechanism of the first arm 6 will be described with reference to FIG. 13. FIG. 13 is a perspective view simply and schematically illustrating the movement mechanism of the first arm 6.

As illustrated in FIG. 13, the base end 6a of the first arm 6 is secured to the X adaptor 96, like a cantilever, and the X adaptor 96 is moved back and forth in the X direction by a movement mechanism including the three rollers 98 and the second arm 7. Here, the base end 6a of the first arm 6 corresponds to one end of a first support, and a front end 6b of the first arm 6 corresponds to another end of the first support. The base end 6a of the first arm 6 is secured to the second arm 7 side through the X adaptor 96.

The first arm 6 needs to be accurately held horizontally not to change the height of the carriage 50 (not illustrated in FIG. 13) even if the carriage 50 moves to a plurality of cartridges 10 and any portion of the medicine distribution trays 30.

However, when the carriage 50 moves to the front end 6b (that is also a free end) side of the first arm 6, a load of the carriage 50 applies a bending moment in a direction that bends down the front end 6b side of the first arm 6, as illustrated with broken lines in FIG. 13. The carriage 50 lowers from an original position. Consequently, accurate picking operation and medicine distribution operation may be prevented. Further, when wear or deformation of each of the rollers 98 causes unsmoothness between the X adaptor 96 and the second arm 7, the front end 6b of the first arm 6 unnecessarily swings in the vertical direction (Z direction) or the left or right direction (X direction). Further, an inertia that accompanies operation of the first arm 6 may make noise, and may increase unsmoothness with increasing speed. An increase in unsmoothness increases a movement load, and adversely affects consumed electrical energy and durability.

Therefore, front-end guide rails 131 that contact and support the front end 6b of the first arm 6 are added to the medicine-taking support apparatus 300 to solve the disadvantage, as described below.

Figure 14B:
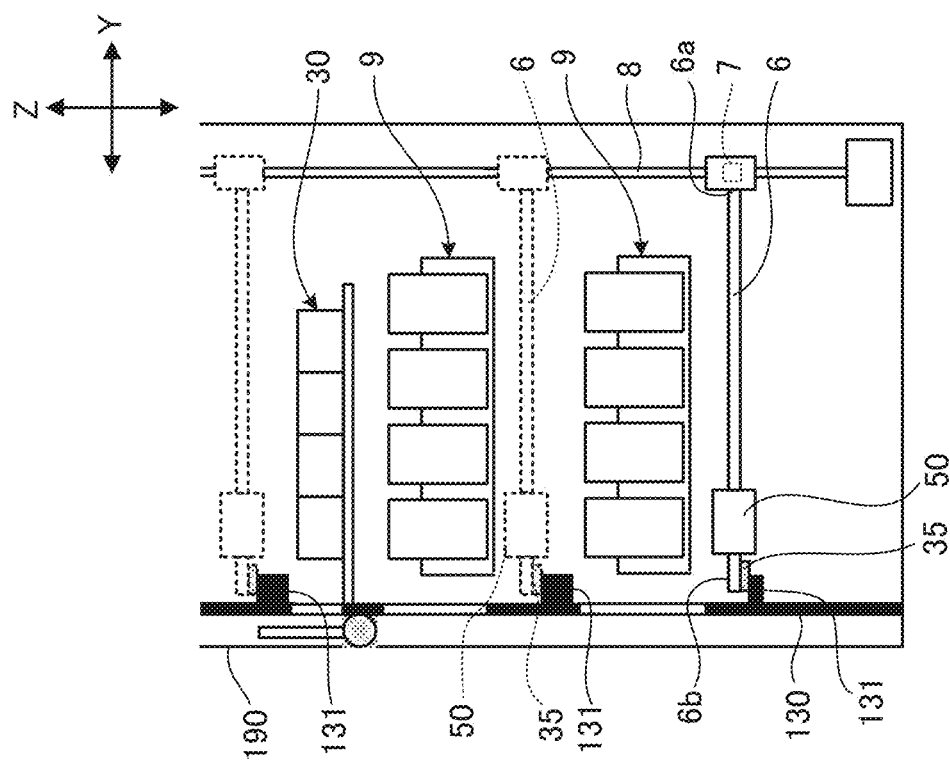
Figure 14A:
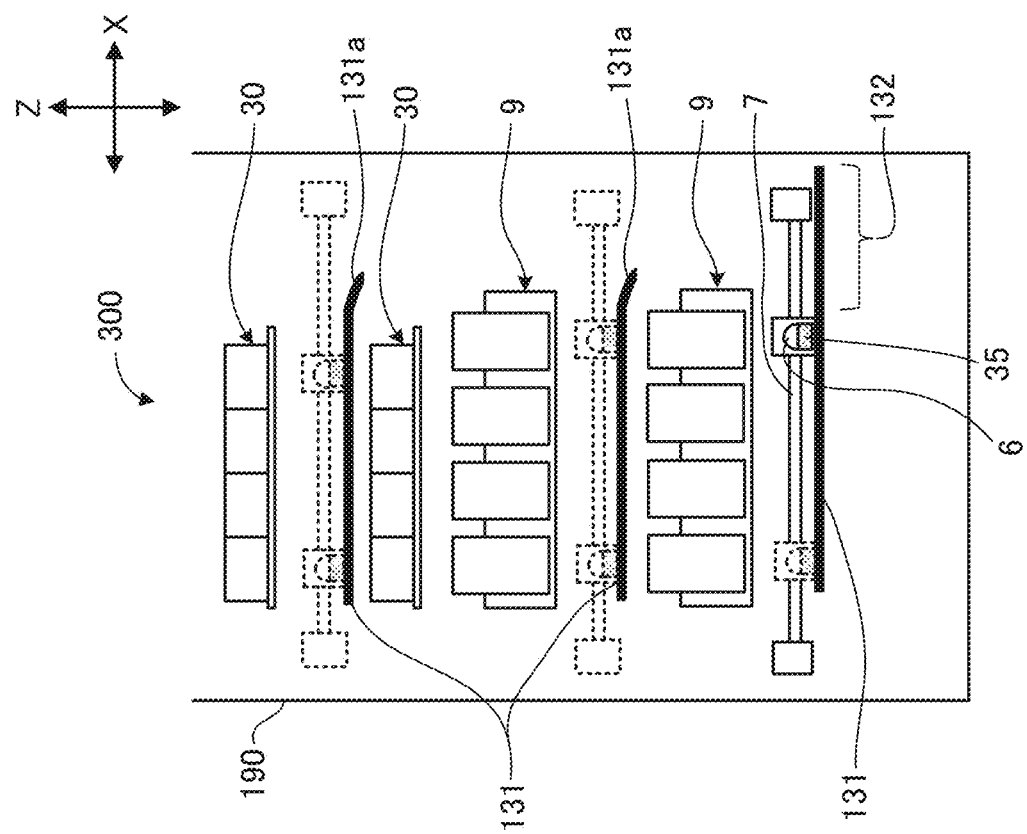
FIG. 14A is an illustration in which the vicinity of the cartridge storing device in a lower portion of the medicine-taking support apparatus, and the lower medicine distribution tray are extracted, and front-end guide rails are seen from the front.

The front-end guide rails 131 that contact and support the front end 6b of the first arm 6 will be described with reference to FIGS. 14A and 14B. FIG. 14A is an illustration in which the vicinity of the cartridge storing device 9 in a lower portion of the medicine-taking support apparatus 300 and the lower medicine distribution tray 30 are extracted, and the front-end guide rails 131 are seen from the front. FIG. 14B is an illustration in which FIG. 14A is seen from the right side.

In an example illustrated in FIGS. 14A and 14B, the front-end guide rails 131 illustrated with thick solid lines are provided for the respective tiers to allow the first arm 6 to be horizontal and to keep a uniform height of the front end when the first arm 6 moves back and forth in the left or right direction (X direction) of the medicine-taking support apparatus 300. That is to say, the front-end guide rails 131 are guide support members disposed in such a manner that when the first arm 6 moves in the left or right direction (X direction) on the second arm 7 that has been stopped, with the X adaptor 96 between the first arm 6 and the second arm 7, one of the front-end guide rails 131 contacts the front end 6b of the first arm 6 to keep the height of the first arm 6 in the vertical direction (Z direction) and guide the first arm 6 horizontally.

Consequently, since variation in the distance between the carriage 50 and the cartridge storing device 9 or the distance between the carriage 50 and the medicine distribution tray 30 does not occur, a pack 2 is stably taken out, and a pack 2 is stably inserted into the medicine distribution trays 30 or a separate box 34. The front-end guide rails 131 are attached to a front frame 130 on the front side of the medicine-taking support apparatus 300, at appropriate heights. The front-end guide rails 131 are disposed at positions corresponding to respective tiers. The front frame 130 is an immovable member of the main-body frame 190.

The front frame 130 also has a function as a support of the drawer structure of the cartridge storing device 9, and a function as portions where the entrances of the medicine distribution trays 30 are disposed.

The lengths of the front-end guide rails 131 in the left or right direction (X direction) correspond to a movement range where the carriage 50 moves left or right, and are effective lengths in a range where picking operation from the cartridge storing device 9, and operation that drops a pack 2 onto the medicine distribution tray 30 are performed. A front-end shoe 35 is added to a portion of the first arm 6 that contacts the front-end guide rail 131. The front-end shoe 35 includes polyacetal resin to decrease friction resistance. As illustrated in FIG. 14A, the front-end guide rail 131 has a tapered portion 131a at the right end of the front-end guide rail 131. The tapered portion 131a allows the front-end shoe 35 to move up onto and move down off the front-end guide rail 131 from the right smoothly and stably. Although out of the illustrated extent, the front-end guide rail 131 corresponding to the cartridge storing device 9 at the highest tier has a similar position relationship and a shape as the other front-end guide rails 131.

As illustrated in FIG. 14A, however, the lowest front-end guide rail 131 does not have the tapered portion 131a, and an extended portion 132 of the front-end guide rail 131 is added to an end, on the right side of the medicine-taking support apparatus 300 relative to the other front-end guide rails 131, of the lowest front-end guide rail 131. The right ends of the other front-end guide rails 131 are limited to a range where the first arm 6 that is moving up or down (Z direction) is not interfered. At the lowest portion, however, a movement range of the first arm 6 is the lower end of the movement path like comb teeth illustrated in FIGS. 5A and 5B. Therefore, interference that accompanies the vertical movement does not occur. Therefore, an effective range of the front-end guide rail 131 to the extended portion 132 is set. Therefore, the front end 6b of the first arm 6 is always supported at the lowest portion. Therefore, the disadvantage caused by a load acting on the first arm 6 described in the description of FIG. 13 is more decreased in the lowest portion than the other tiers.

Figure 15:
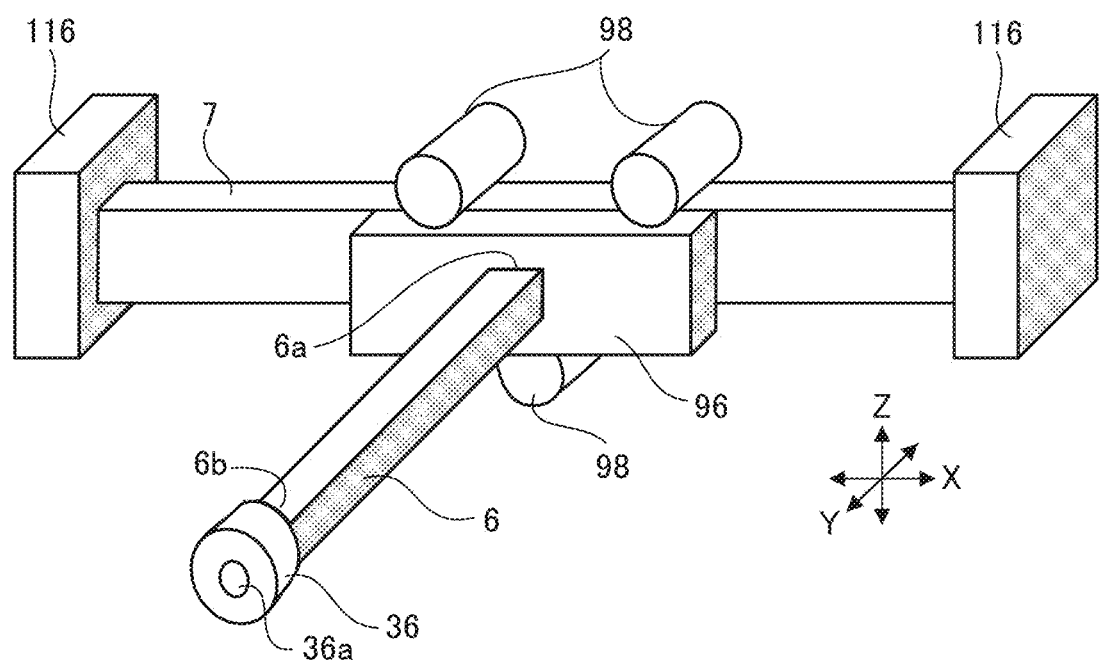
FIG. 15 is a perspective view schematically illustrating a variation example of the movement mechanism of the first arm.
Figure 16:
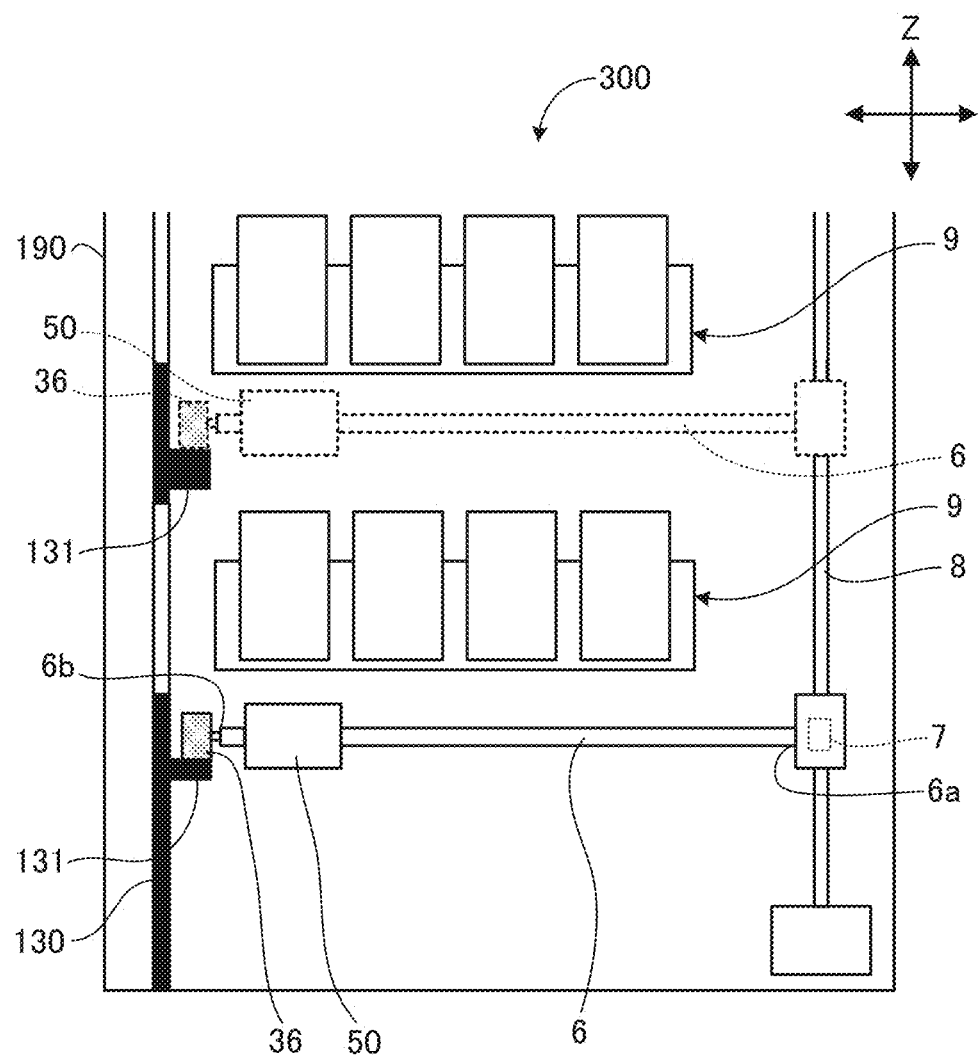
FIG. 16 is a right side view in which a position relationship between a front-end guide roller in FIG. 15 and the front-end guide rails is illustrated, and part of the medicine-taking support apparatus is extracted.

A variation example of the movement mechanism of the first arm 6 will be described with reference to FIGS. 15 and 16. FIG. 15 is a perspective view schematically illustrating the variation example of the movement mechanism of the first arm 6. FIG. 16 is a right side view in which a position relationship between a front-end guide roller 36 in FIG. 15 and the front-end guide rails 131 is illustrated, and part of the medicine-taking support apparatus 300 is extracted.

In the variation example illustrated in FIGS. 15 and 16, instead of the front-end shoe 35 illustrated in FIGS. 14A and 14B, the front-end guide roller 36 that is rotatable while contacting the front-end guide rail 131 is provided. The front-end guide roller 36 is rotatable on a roller shaft 36a adhered to the front end 6b of the first arm 6. The front-end guide roller 36 has a remarkably lower dragging resistance than the dragging resistance of the front-end shoe 35. Therefore, the first arm 6 more smoothly moves left and right, and disadvantages, such as load increase and variations in the height position of the carriage 50, due to wear of the front-end shoe 35 do not occur. The front-end guide roller 36 including a ball bearing is more effective for the decrease in movement load, the decrease in noise, higher durability, and the like.

An X-direction HP sensor 99 that detects a HP, in the left or right direction (X direction), of the first arm 6 will described with reference to FIG. 17. FIG. 17 is a drawing illustrating surroundings around the second arm 7 to which the X-direction HP sensor 99 is fitted.

Although the X-direction movement mechanism 91 that is a configuration that moves the carriage 50 in the X direction has been described with reference to FIGS. 11A and 11B, the detailed configuration in FIG. 17 will be described below.

In FIG. 17, the configuration of a main portion that moves the first arm 6 in the left or right direction (X direction) includes the pair of Z adaptors 116 provided in the X direction, the second arm 7 supported by each of the Z adaptors 116, and the X-direction movement mechanism 91. In FIG. 17, a motor bracket 80 is attached to the left Z adaptor 116, and a driven-pulley bracket 83 is attached to the right Z adaptor 116. The X-direction driving motor 95 is securely disposed in the motor bracket 80. The motor bracket 80 supports the driving pulley 92 rotatably. The X-direction HP sensor 99 is also securely disposed in the driven-pulley bracket 83. The X-direction HP sensor 99 includes a thru-beam photosensor that includes a photointerrupter. The X-direction HP sensor 99 functions as a first detector that detects a fact that the front-end shoe 35 or the front-end guide roller 36 that is the front end 6b of the first arm 6 is at a predetermined position. Here, the predetermined position includes a HP position of the front end 6b of the first arm 6, the front-end shoe 35, or the front-end guide roller 36.

The X-direction movement mechanism 91 includes the X adaptor 96 to which the base end 6a of the first arm 6, and a filler 100 as a light-blocking member are secured, the second arm 7 that supports and guides the first arm 6 illustrated with a broken line in the X direction, with the X adaptor 96 between the second arm 7 and the first arm 6, the endless belt 94 wound around the driving pulley 92 and the driven pulley 93, and the X-direction driving motor 95 coupled to the driving pulley 92 through a driving-force transmission member, such as gears. The driving-force transmission member or a driving-force transmission device includes a pinion gear 81 secured to an output shaft of the X-direction driving motor 95, and a pulley speed reduction gear 82 coaxially attached to a shaft of the driving pulley 92 and always meshes with the pinion gear 81.

The X adaptor 96 includes the three rollers 98. The three rollers 98 are rotatable and hold the second arm 7 between the three rollers 98. The X adaptor 96 is coupled and secured to the endless belt 94 through a belt-gripping device 94a.

Due to the configuration of the X-direction movement mechanism 91 illustrated in FIG. 17, when the X-direction driving motor 95 is driven, the driving force is transmitted to the endless belt 94 through the above-described driving-force transmission device and the driving pulley 92, the endless belt 94 rotates, and the first arm 6 attached and secured to the X adaptor 96 moves in the X direction that is a horizontal direction, along the second arm 7. Then the first arm 6 with the X adaptor 96 further moves right in the X direction along the second arm 7, and reaches a HP that is the closest to the right in FIG. 17. At this time, the filler 100 engages with the X-direction HP sensor 99. Consequently, the X-direction HP sensor 99 becomes on, and can detect the HP of the X adaptor 96 and the first arm 6.

Although not illustrated to avoid redundant description, the Y-direction movement mechanism 101 and the Z-direction movement mechanism 111 illustrated in FIGS. 11A and 11B include a Y-direction HP sensor 109 corresponding to the second arm 7, and a Z-direction HP sensor 119 corresponding to the vertical-movement mechanisms 8, respectively (see FIG. 21 described below), as a configuration similar to the combination of the X-direction HP sensor 99 and the filler 100 in the X-direction movement mechanism 91.

Figure 19A:
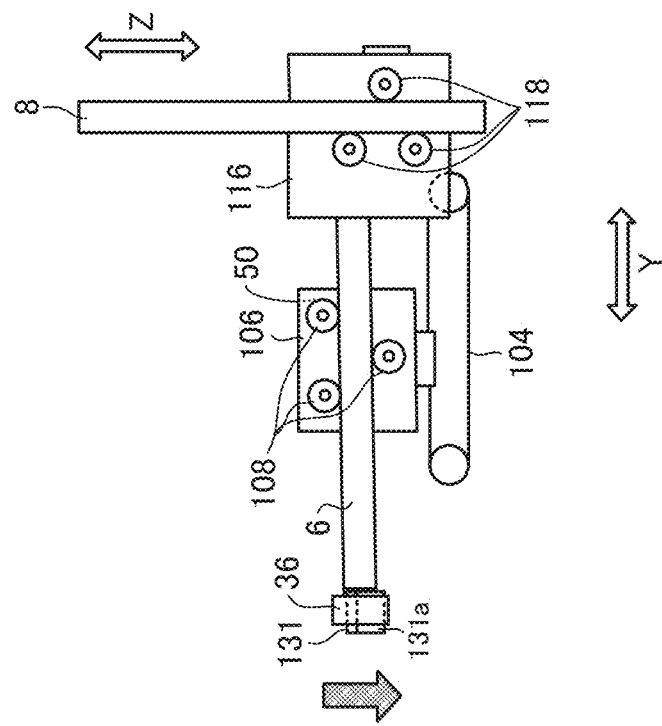
FIGS. 19A and 19B are drawings illustrating a case where the first arm leaves the front-end guide rail at a low speed.
Figure 19B:
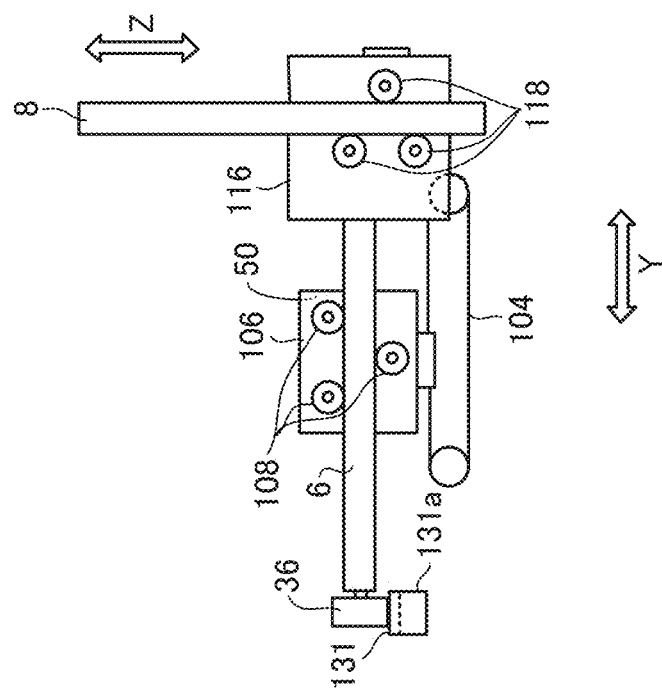
Figure 20C:
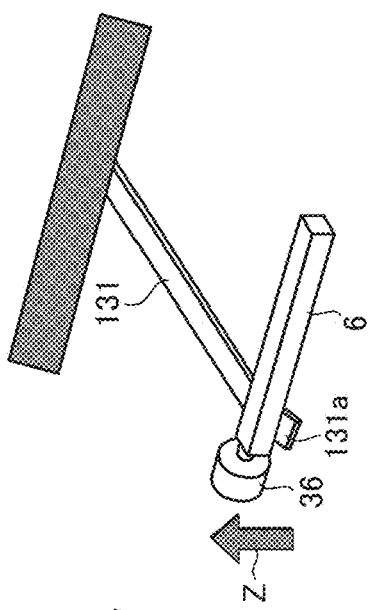
FIGS. 20A, 20B, and 20C are drawings illustrating disadvantages at a time when the first arm moves up onto and collides with the front-end guide rail at a high speed.

With reference to FIGS. 18A to 20C, described are movement speeds of the first arm 6 in a case where the first arm 6 moves in the X direction to leave (separate from) the front-end guide rail 131, and in a case where the first arm 6 moves in the X direction to move up onto and collide with the front-end guide rail 131, and disadvantages caused by the movement speeds. FIGS. 18A and 18B are drawings illustrating a falling speed of the first arm 6 at a time when the first arm 6 leaves the front-end guide rail 131 at a high speed. FIGS. 19A and 19B are drawings illustrating a falling speed of the first arm 6 at a time when the first arm 6 leaves the front-end guide rail 131 at a low speed. FIGS. 20A to 20C are drawings illustrating disadvantages at a time when the first arm 6 moves up onto and collides with the front-end guide rail 131 at a high speed.

In FIGS. 18B and 19B, black thick arrows indicate directions and magnitudes of falling speeds of the first arm 6 with the front-end guide roller 36.

FIGS. 18A and 18B illustrate a transition at a time when the first arm 6 leaves (separates from) the tapered portion 131a of the front-end guide rail 131 at a high speed, with the front-end guide roller 36 between the first arm 6 and the tapered portion 131a. In FIGS. 18A and 18B, the first arm 6 moves in the X direction from the drawing depth side to the drawing front side at a high speed. A falling speed of the first arm 6 is relatively high immediately after the first arm 6 leaves the tapered portion 131a at a high speed, with the front-end guide roller 36 between the first arm 6 and the tapered portion 131a, as illustrated in FIG. 18B, compared with a state illustrated in FIG. 18A immediately before the first arm 6 leaving the tapered portion 131a at a high speed, with the front-end guide roller 36 between the first arm 6 and the tapered portion 131a. Consequently, the first arm 6 and the carriage 50 attached to the Y adaptor 106 tilt.

Since in FIG. 18B, the front-end guide rail 131 and the tapered portion 131a are all hidden by the front-end guide roller 36 and are not seen, the front-end guide rail 131 and the tapered portion 131a are intentionally not illustrated.

On the other hand, FIGS. 19A and 19B illustrate a transition at a time when the first arm 6 leaves (separates from) the tapered portion 131a of the front-end guide rail 131 at a relatively low speed, with the front-end guide roller 36 between the first arm 6 and the tapered portion 131a, in contrast to the illustrations of FIGS. 18A and 18B. Compared with a state illustrated in FIG. 19A immediately before the first arm 6 leaving the tapered portion 131a at a low speed, a falling speed of the first arm 6 is not very high immediately after the first arm 6 leaves the tapered portion 131a at a low speed, with the front-end guide roller 36 between the first arm 6 and the tapered portion 131a, as illustrated in FIG. 19B.

That is to say, a movement speed or a driving speed of the first arm 6 that moves the first arm 6 in the X direction is reduced to reduce a falling speed of the front-end guide roller 36 when the front-end guide roller 36 moves down off the front-end guide rail 131. A falling speed of the first arm 6 and the front-end guide roller 36 is reduced. Consequently, the disadvantages illustrated with reference to FIG. 13 and caused by the first arm 6 of a cantilever type are eased to increase durability of the X adaptor 96 and the rollers 98 that are supports of the first arm 6.

Figure 20B:
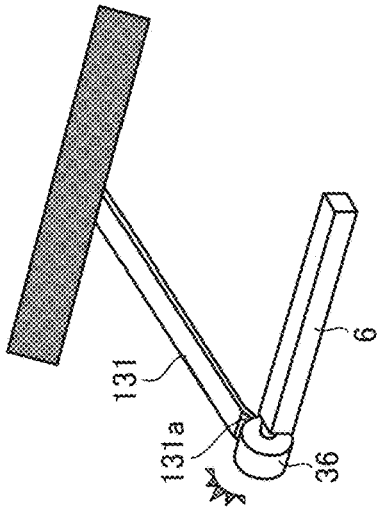
Figure 20A:
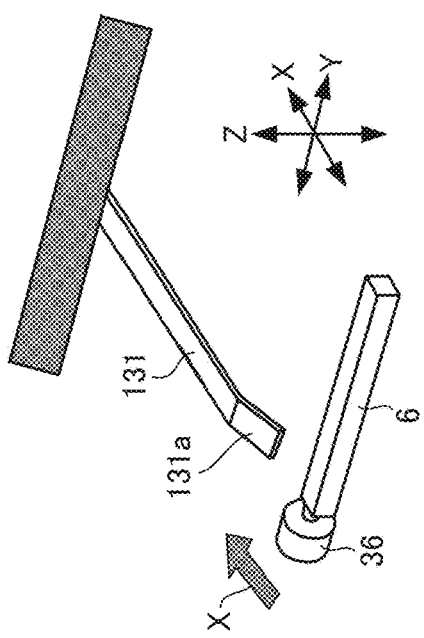

FIGS. 20A to 20C illustrate a state transition at a time when the first arm 6 collides with the tapered portion 131a of the front-end guide rail 131 at a relatively high speed, with the front-end guide roller 36 between the first arm 6 and the tapered portion 131a. First, as illustrated in FIG. 20A, the front-end guide roller 36 moves toward the tapered portion 131a in the X direction at a high speed. Next, as illustrated in FIG. 20B, the front-end guide roller 36 collides with the tapered portion 131a. At this time, as illustrated in FIG. 20C, the front-end guide roller 36 jumps up from the tapered portion 131a, and a driving amount by which the X-direction driving motor 95 drives the first arm 6 in the X direction does not harmonize with the position of the first arm 6 illustrated in FIGS. 11A, 11B, and 17.

Although the above-described disadvantages are described for a case where the front end 6b of the first arm 6 is provided with the front-end guide roller 36, as illustrated in FIG. 16, similar disadvantages naturally occur in a case where the front end 6b of the first arm 6 is provided with the front-end shoe 35, as illustrated in FIGS. 14A and 14B.

Therefore, when the first arm 6 moves up onto, that is to say contacts, the front-end guide rail 131 or the tapered portion 131a, or when the first arm 6 moves down off, that is to say separates from, the front-end guide rail 131 or the tapered portion 131a, with the front-end guide roller 36 between the first arm 6 and the front-end guide rail 131 or the tapered portion 131a, it is sufficient to control the X-direction driving motor 95 to reduce a movement speed of the first arm 6. Specific values for allowing a movement speed or a driving speed of the front-end guide roller 36 of the first arm 6 to be an appropriate low speed are experimentally set considering, for example, the weights of the carriage 50, an item (pack 2), and the like that are held, and the weight, rigidity, and the like of the first arm 6.

A timing at which a movement speed of the first arm 6 is reduced when the first arm 6 moves up onto (or moves down off) the front-end guide rail 131 or the tapered portion 131a, with the front-end guide roller 36 between the first arm 6 and the front-end guide rail 131 or the tapered portion 131a, is a timing at which the first arm 6 is conveyed by a specified driving amount of the X-direction driving motor 95 after the X-direction HP sensor 99 illustrated in FIG. 17 detects the first arm 6 having separated from a HP that is also an initial position of the first arm 6.

The configuration solves the disadvantages illustrated in FIGS. 18A to 19B.

Therefore, the first arm 6 having a supporting cantilever structure smoothly and stably moves up onto and moves down off the tapered portion 131a, with the front-end guide roller 36 between the first arm 6 and the tapered portion 131a. Further, the configuration also solves the disadvantage illustrated in FIGS. 20B and 20C. Therefore, an impact load acting on the first arm 6 is decreased, and durability and stop position accuracy of the first arm 6 is increased.

A control configuration of the medicine-taking support apparatus 300 will be described with reference to FIG. 21. FIG. 21 is a control block diagram illustrating a main control configuration of the medicine-taking support apparatus 300.

Figure 21:
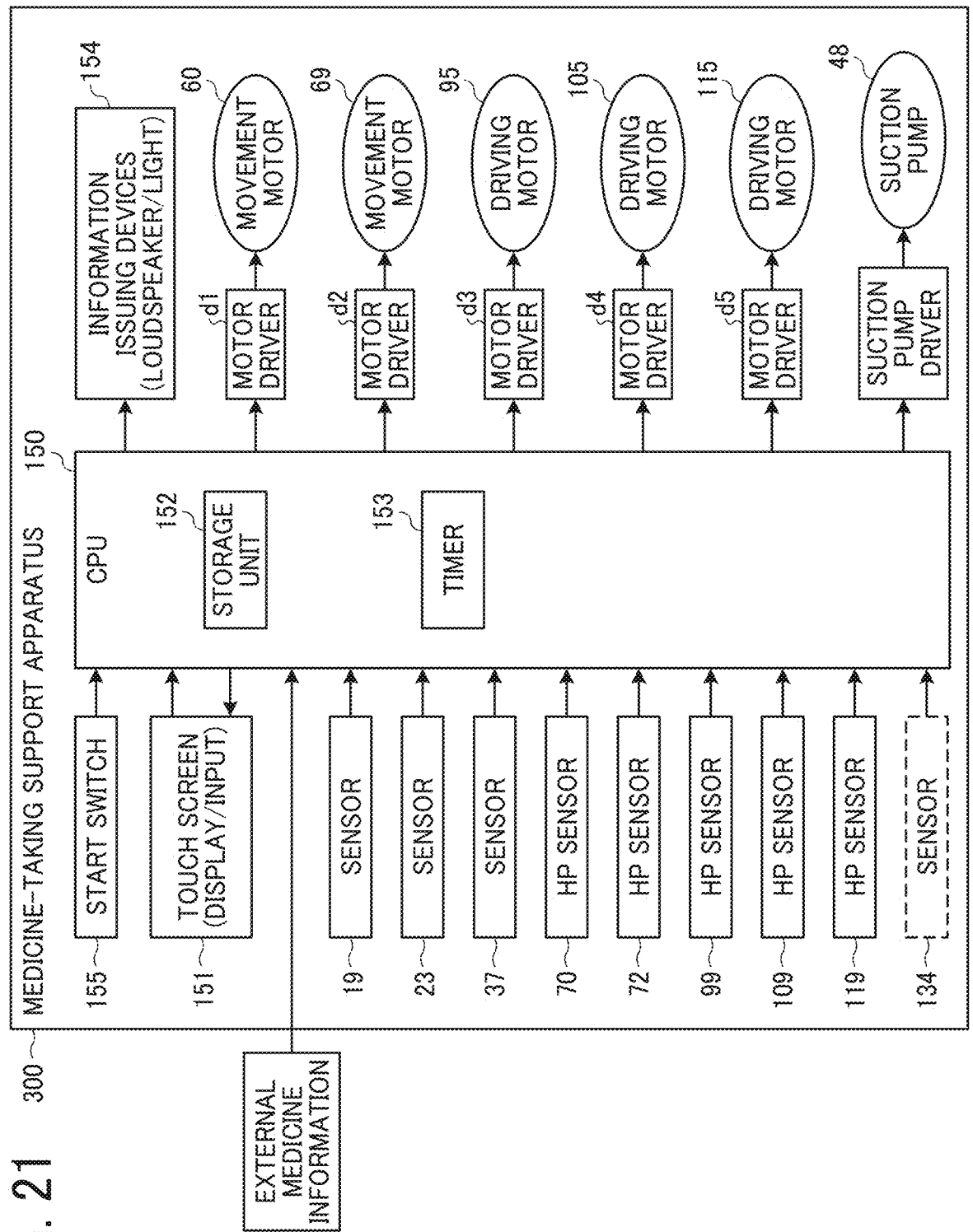
FIG. 21 is a control block diagram illustrating a main control configuration of the medicine-taking support apparatus illustrated in FIGS. 3 to 5B, and other drawings.

As illustrated in FIG. 21, the medicine-taking support apparatus 300 includes a central processing unit (CPU) functioning as a controller 150 as a controller that controls operation of each device, each mechanism, and the like of the medicine-taking support apparatus 300. The CPU contains a storage unit 152, a timer 153, and the like. The CPU issues an instruction to issue information to a user or the like, or an instruction for operation of the medicine-taking support apparatus 300 at a timing that follows programs, on the basis of various input including sensors described below. Prescription information and medicine information, as external medicine information, are input into the storage unit 152 from the outside.

The CPU includes not only arithmetic and control functions but also may include a timer (time measurement) function. The storage unit 152 includes a read-only memory (ROM), a random access memory (RAM), an external memory, and the like. The ROM preliminarily stores programs that can be read out by the CPU (programs, such as a control flowchart described below), calculation formulae used for calculations at a time when the CPU performs various controls, various data, or the like. The data includes, for example, data on relationships between packs 2 and sections 33 of the medicine distribution trays 30 (see FIG. 4) assigned to each medicine-taking person, each medicine-taking timing, or each order of medicine taking.

A touch screen 151 including an input device and a display as a user interface is electrically coupled to an input/output port of the CPU. A user inputs various settings with the touch screen 151. A current time, a progress state of storage of packs 2, an end time, or the like is displayed on the touch screen 151. Forms of input method and display are not limited to the example, but may be, for example, a combination of a keyboard and a light-emitting diode (LED) display, as an input device and a display that are separate.

A start switch 155 for operating the medicine-taking support apparatus 300 is electrically coupled to an input port of the CPU. Pushing the start switch 155 sequentially starts medicine distribution operation that distributes medicine to the medicine distribution trays 30. Medicine distribution operation that distributes medicine to the medicine distribution trays 30 may be started at a predetermined time by the timer 153.

A cartridge existence and non-existence detection sensor 19 that detects existence and non-existence of a cartridge 10, a drawer opening and closing detection sensor 23, and a medicine distribution tray detection sensor 37 that detects the type of the medicine distribution tray 30 accommodated in the medicine-taking support apparatus 300, and existence and non-existence of the medicine distribution tray 30 are electrically coupled to input ports of the CPU.

Further, the suction device HP sensor 70 that detects a HP of the suction device 51 (the suction pads 52 in particular) in the carriage 50, and the holding-device HP sensor 72 that detects a HP of the holding device 61 (the holding tray 62 in particular) in the carriage 50 are also electrically coupled to input ports of the CPU.

In FIG. 21, the cartridge existence and non-existence detection sensor 19, the drawer opening and closing detection sensor 23, and the medicine distribution tray detection sensor 37 are simplified to be described as only SENSOR 19, SENSOR 23, and SENSOR 37, and the suction device HP sensor 70 and the holding-device HP sensor 72 are simplified to be described as only HP SENSOR 70 and HP SENSOR 72. The sensor 19, the sensor 23, the sensor 37, the HP sensor 70, and the HP sensor 72 simply illustrated are illustrated only in FIG. 21.

Further, the X-direction HP sensor 99 that detects a HP of the first arm 6 of the X-direction movement mechanism 91, the Y-direction HP sensor 109 that detects a HP of the second arm 7 of the Y-direction movement mechanism 101, and the Z-direction HP sensor 119 that detects a HP of the vertical-movement mechanism 8 of the Z-direction movement mechanism 111 are also electrically coupled to input ports of the CPU.

In FIG. 21, the X-direction HP sensor 99, the Y-direction HP sensor 109, and the Z-direction HP sensor 119 are simplified to be described as only HP SENSOR 99, HP SENSOR 109, and HP SENSOR 119. A sensor 134 surrounded by a broken line in FIG. 21 is used in a variation example of driving control of the first arm 6 illustrated in FIG. 28 described below.

Information issuing devices 154 are electrically coupled to output ports of the CPU. The movement motor 60 for moving up or down the suction device 51, the movement motor 69 for rotating or moving up or down the holding device 61, the X-direction driving motor 95 of the X-direction movement mechanism 91, the Y-direction driving motor 105 of the Y-direction movement mechanism 101, and the Z-direction driving motor 115 of the Z-direction movement mechanism 111 are electrically coupled to output ports of the CPU through corresponding various motor drivers d1 to d5. The suction pump 48 is also electrically coupled to an output port of the CPU through a suction pump driver.

In FIG. 21, the movement motor 60 for moving up or down the suction device 51, and the movement motor 69 for rotating or moving up or down the holding device 61 are simplified to be described as only MOVEMENT MOTOR 60 and MOVEMENT MOTOR 69, and the X-direction driving motor 95, the Y-direction driving motor 105, and the Z-direction driving motor 115 are simplified to be described as only DRIVING MOTOR 95, DRIVING MOTOR 105, and DRIVING MOTOR 115.

The information issuing devices 154 issue information about states of the above-described devices and mechanisms by light, such as an LED, sounds including voices, and vibration. The information issuing devices 154 include a loudspeaker that is a sound device, a light that is a light device, and the like for informing a user or the like apart from the medicine-taking support apparatus 300 of a timing of medicine taking, and the like.

The above-described external medicine information is input into the CPU through an input/output (I/O) device, is stored in the storage unit 152, and is used for allocation of medicine distribution to medicine-taking people.

Note that an LED or the like for identification of cartridges 10 disposed in the drawers 20 may be electrically coupled to the CPU.

When input information from the touch screen 151, or a signal or information from the various sensor 19, 23, or 37, or the various HP sensor 70, 72, 99, 109, or 119 is input into the CPU, the CPU outputs an instruction to a loudspeaker or a light of a display of the touch screen 151 (including the information issuing devices 154), or the driver corresponding to the various movement motor 60 or 69, the driving motor 95, 105, or 115, the suction pump 48, or the LED.

The HP sensor 70, the motor driver d1, and the movement motor 60 are used to drive and control the mechanism 55 for moving up or down the suction device 51. The HP sensor 72, the motor driver d2, and the movement motor 69 are used to drive and control the mechanism 63 for rotating or moving up or down the holding device 61.

The HP sensor 99, the motor driver d3, and the driving motor 95 are used to drive and control the X-direction movement mechanism 91. Similarly, the HP sensor 109, the motor driver d4, and the driving motor 105 are used to drive and control the Y-direction movement mechanism 101. Similarly, the HP sensor 119, the motor driver d5, and the driving motor 115 are used to drive and control the Z-direction movement mechanism 111.

Further, the CPU has functions of performing control operation illustrated in the description above or below, a control flowchart, a timing chart, and the like.

For example, stepping motors that perform driving by pulse input may be used as the movement motors 60 and 69, and the driving motors 95, 105, and 115 because of the accuracy of a driving amount, and easiness of accurate control.

Figure 22:
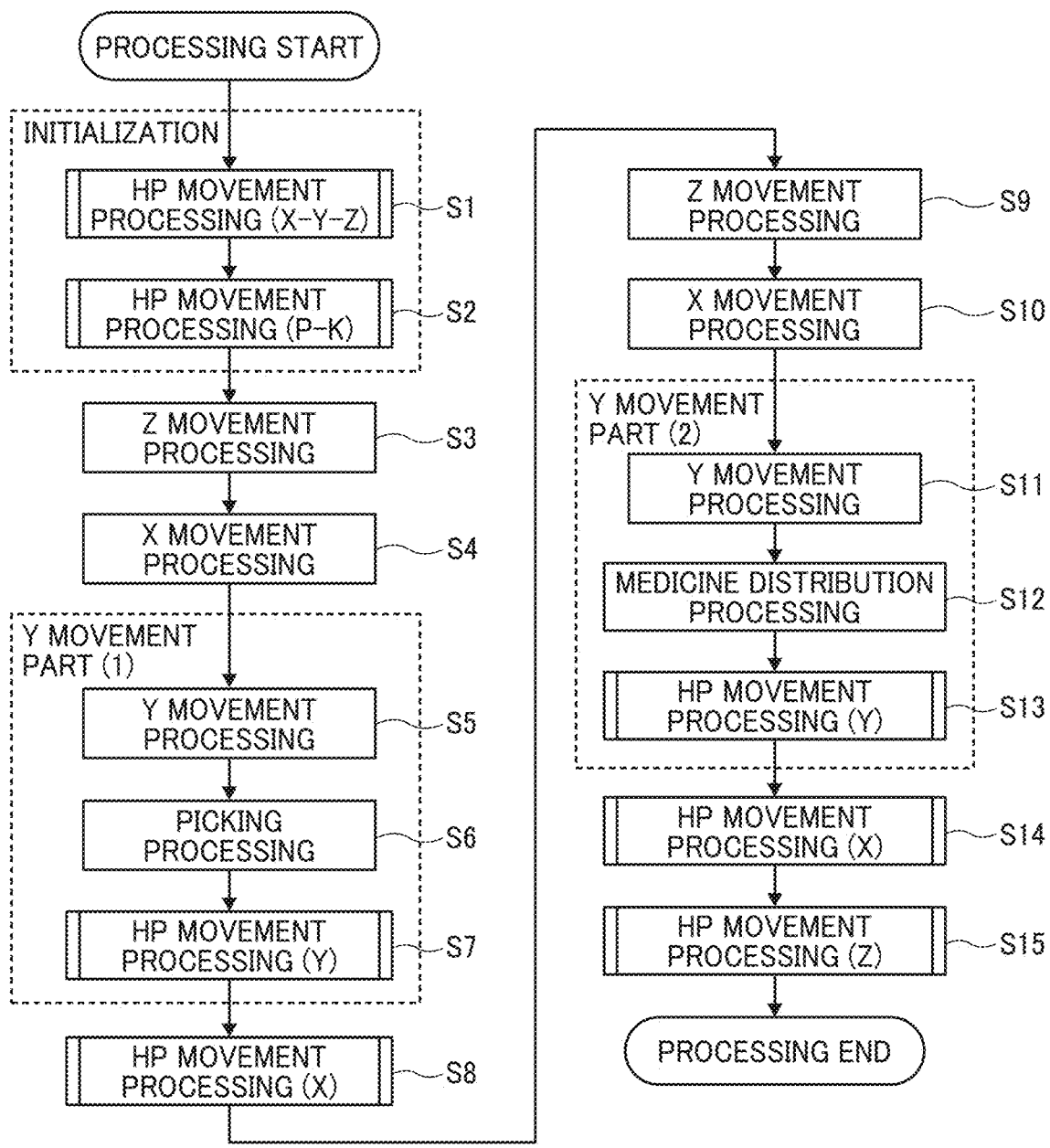
FIG. 22 is a flowchart illustrating a series of operation flow in the medicine-taking support apparatus illustrated in FIGS. 3 to 5B, and other drawings, and in the series of operation flow, one picking to medicine distribution are performed.

A series of operation flow in the medicine-taking support apparatus 300 according to the second embodiment of the present disclosure will be described with reference to FIG. 22. In the series of operation flow, one picking to medicine distribution are performed. FIG. 22 is a flowchart illustrating a series of operation flow in the medicine-taking support apparatus 300 according to the second embodiment of the present disclosure. In the series of operation flow, one picking to medicine distribution are performed. Operation illustrated in flowcharts described below and including FIG. 22 is performed under control commands from the CPU of the controller 150.

In FIG. 22, when the processing starts, first, HP movement processing of the X-direction movement mechanism 91, the Y-direction movement mechanism 101, and the Z-direction movement mechanism 111 (step S1), and HP movement processing driven by the mechanism 55 for moving up or down the suction device 51, and the mechanism 63 for rotating or moving up or down the holding device 61 (step S2) are performed as operation of initialization surrounded by a broken-line square.

Note that in the drawings described below and including FIG. 22, the HP movement processing of the X-direction movement mechanism 91 is described as HP MOVEMENT PROCESSING (X), the HP movement processing of the Y-direction movement mechanism 101 is described as HP MOVEMENT PROCESSING (Y), and the HP movement processing of the Z-direction movement mechanism 111 is described as HP MOVEMENT PROCESSING (Z). In FIG. 22, the HP MOVEMENT PROCESSING (X), the HP MOVEMENT PROCESSING (Y), and the HP MOVEMENT PROCESSING (Z) are collectively described as HP MOVEMENT PROCESSING (X-Y-Z).

Further, HP movement processing of the mechanism 55 for moving up or down the suction device 51 is described as HP MOVEMENT PROCESSING (P), and HP movement processing of the mechanism 63 for rotating or moving up or down the holding device 61 is described as HP MOVEMENT PROCESSING (K). In FIG. 22, the HP MOVEMENT PROCESSING (P) and the HP MOVEMENT PROCESSING (K) are collectively described as HP MOVEMENT PROCESSING (P-K).

Figure 23:
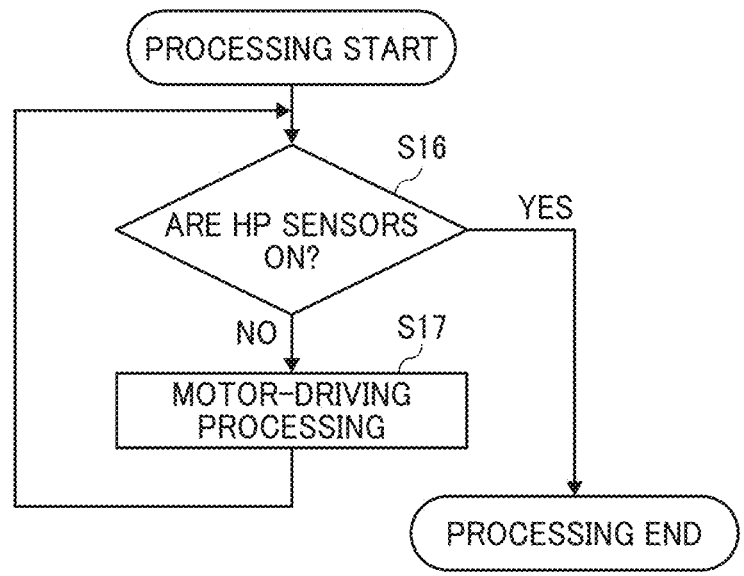
FIG. 23 is a flowchart illustrating a subroutine of HP movement processing in FIG. 22.

The HP movement processing in FIG. 22 will be described with reference to FIG. 23 although the description is mixed up. FIG. 23 is a flowchart illustrating a subroutine of the HP movement processing in FIG. 22.

In FIG. 23, when the processing starts, whether movement devices (to which the carriage 50, the first arm 6, the second arm 7, the vertical-movement mechanisms 8, the suction pads 52, and the holding tray 62 are collectively referred) are at respective HPs is detected by the corresponding HP sensors (the X-direction HP sensor 99, the Y-direction HP sensor 109, the Z-direction HP sensor 119, the suction device HP sensor 70, and the holding-device HP sensor 72) (step S16).

If in step S16, the movement device is not at the HP (if the HP sensor corresponding to the movement device is off (hereinafter referred to as OFF)), corresponding motor-driving processing is performed to rotate the corresponding motor (the X-direction driving motor 95, the Y-direction driving motor 105, the Z-direction driving motor 115, the movement motor 60 for moving up or down the suction device 51, or the movement motor 69 for rotating or moving up or down the holding device 61) in a direction that allows the movement device to move to the HP. If the corresponding HP sensor becomes on (hereinafter referred to as ON), the processing is ended.

Initialization in FIG. 22 allows a setting of the three-direction movement mechanism 90 to be at a corner closest to the back of the medicine-taking support apparatus 300, in a right lowest portion of the movement path 26 like comb teeth illustrated in FIGS. 5A and 5B. In operation from this position, if the X-direction movement mechanism 91 is at a HP, the setting allows movement of the first arm 6 and the carriage 50 in the vertical direction (Z direction) without interference in the upward-or-downward-movement range 25 illustrated with the broken-line square frame in FIG. 5A. As part of the initialization, the HP movement processing (P-K) driven by the mechanism 55 for moving up or down the suction device 51, and the mechanism 63 for rotating or moving up or down the holding device 61, in the carriage 50 is performed to prepare picking operation that picks a pack 2, and medicine distribution operation.

Next, the carriage 50 moves to under a predetermined cartridge 10 in the cartridge storing device 9. At this time, the order of movement of the three-direction movement mechanism 90 is the Z-direction movement mechanism 111→the X-direction movement mechanism 91→the Y-direction movement mechanism 101 (hereinafter referred to as Z→X→Y) (steps S3 to S5). Then driving of the mechanism 55 for moving up or down the suction device 51 and driving of the suction pump 48 are combined to perform picking processing in order of FIGS. 8A to 8E.

Next, HP movement processing is performed in order of Y→X to return the carriage 50 into the upward-or-downward-movement range 25 in FIG. 5A. Since the movement in the Y direction is performed immediately before and after the picking processing, a time in which the carriage 50 is at the front end 6b side of the first arm 6 and receives a bending moment is made the shortest, and the disadvantage described in the description of FIG. 13 and caused by the first arm 6 of a cantilever type is minimized. The series of operation in this order is surrounded by a broken-line square as Y MOVEMENT PART (1) in FIG. 22 (steps S5 to S7).

Next, movement processing in order of Z→X→Y is performed to move the carriage 50 to a position of a predetermined section 33 in the medicine distribution tray 30 (steps S9 to S11). Then the mechanism 63 for rotating or moving up or down the holding device 61 is operated to perform medicine distribution processing in order of FIGS. 9A to 9E. Then HP movement processing is performed in order of Y→X→Z to return the carriage 50 to the same position as the position at a time of the initialization, and the series of operation from picking operation to medicine distribution operation is ended (steps S11 to S15). Y movement performed immediately before and after medicine distribution processing is surrounded by a broken-line square as Y MOVEMENT PART (2), similarly as Y MOVEMENT PART (1) at a time of picking (steps S11 to S13). Medicine distribution operation is performed in order of the Y movement to obtain a similar effect as the effect of Y MOVEMENT PART (1).

Figure 24:
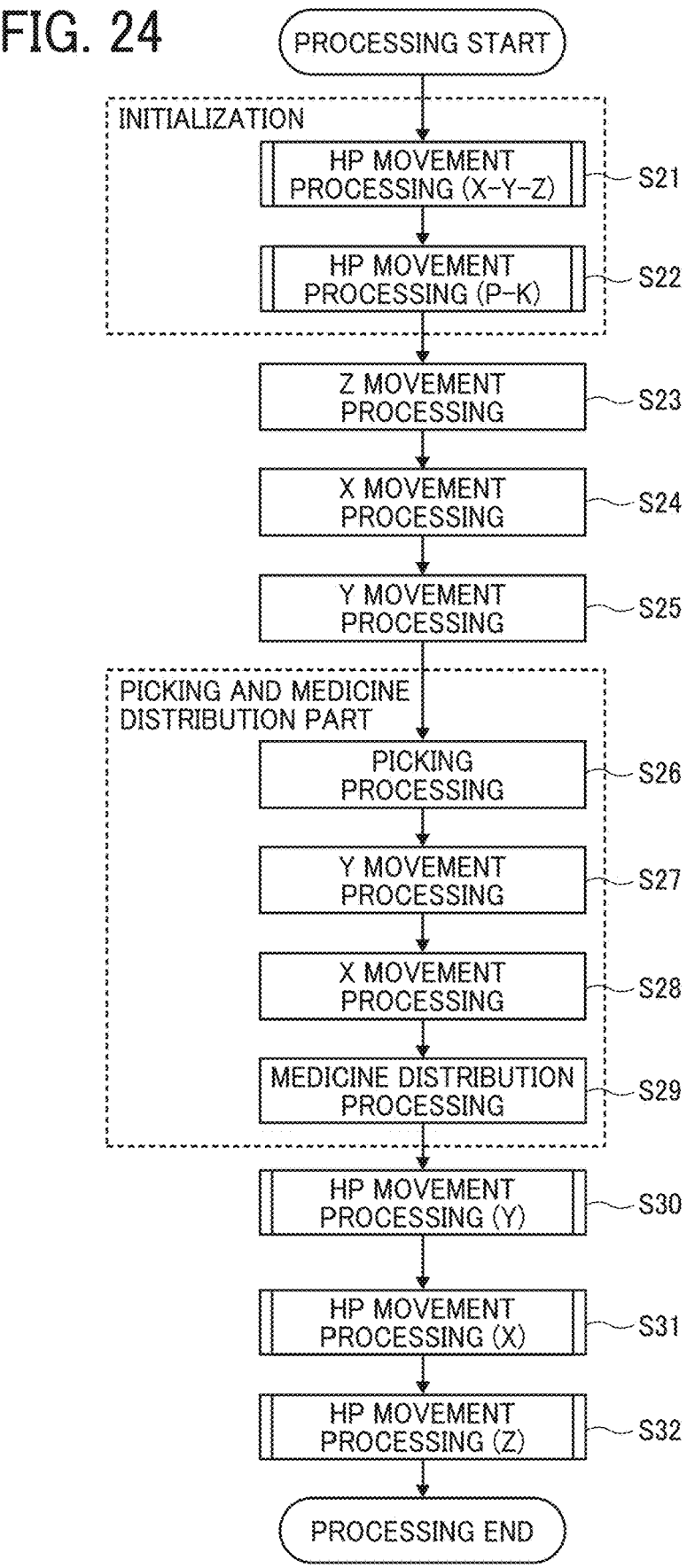
FIG. 24 is a flowchart of operation from picking operation to medicine distribution operation according to an example different from FIG. 22.

As a flowchart (2) of operation from picking operation to medicine distribution operation, FIG. 24 illustrates a flowchart in a case where the carriage 50 moves in a place where the cartridge storing device 9, the movement path 26 that is a movement space under the cartridge storing device 9, the movement path 26 that is a movement space over the medicine distribution tray 30 that is the next tier, and the medicine distribution tray 30 that is the next tier sequentially and continuously align, as in a highest portion in FIG. 5A. The flowchart illustrated in FIG. 24 starts from step S21, and ends at step S32. Hereinafter, the difference between the flowchart illustrated in FIG. 24 and the flowchart illustrated in FIG. 22 will be mainly described.

Compared with the flowchart illustrated in FIG. 22, the flowchart illustrated in FIG. 24 does not include the HP movement processing (Y) in step S7, the HP movement processing (X) in step S8, and the Z movement processing in step S9 between the picking processing (step S6) and the medicine distribution processing (step S12) in FIG. 22. Therefore, in the flowchart illustrated in FIG. 24, only two pieces of processing, that is to say Y movement processing (step S27) and X movement processing (step S28) are needed between picking processing (step S26) and medicine distribution processing (step S29) in a picking and medicine distribution part surrounded by a broken line. It can be understood that the carriage 50 is efficiently moved in a highest tier in FIG. 5A, and the productivity is improved.

Figure 25:
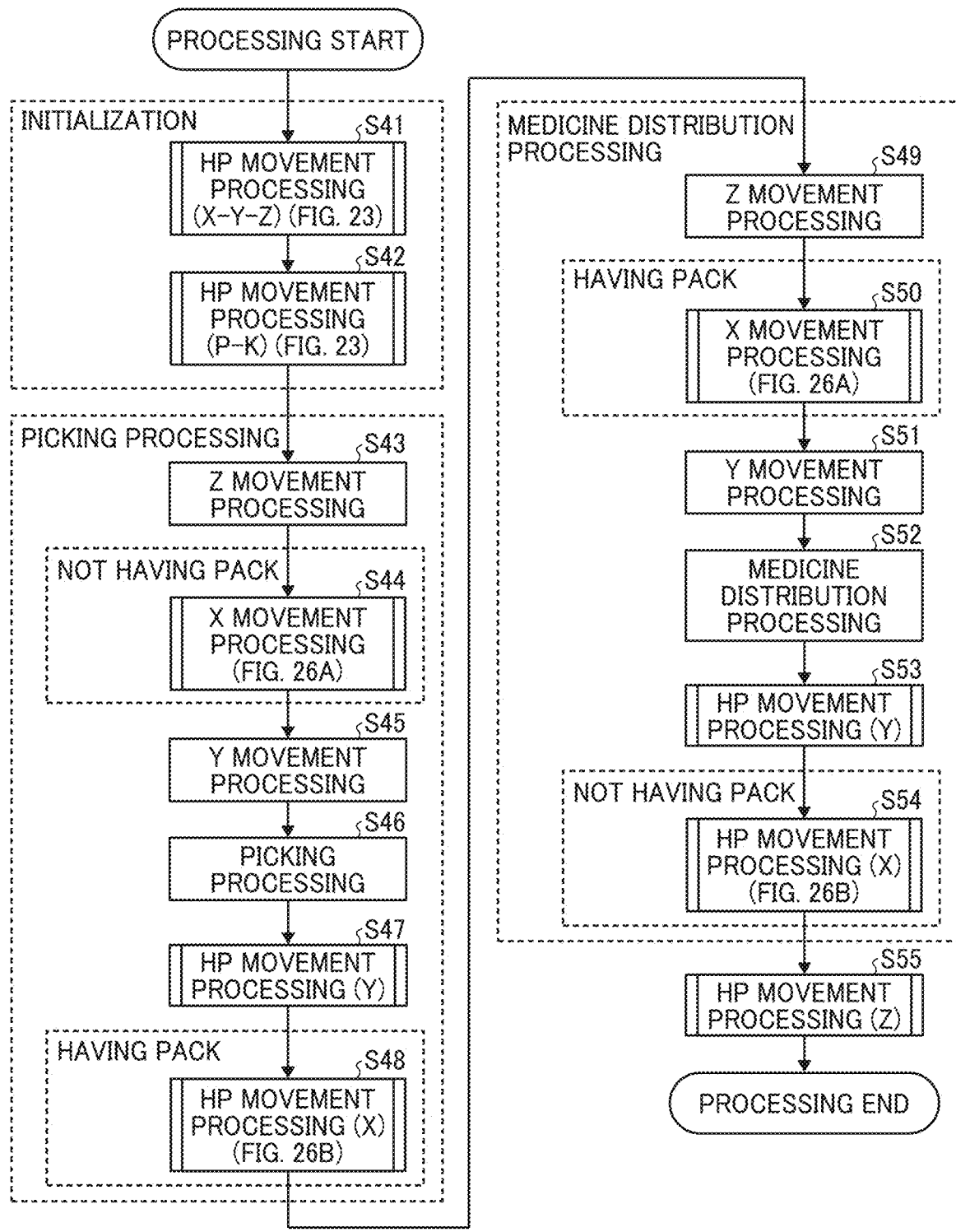
FIG. 25 is a flowchart illustrating an operation flow that illustrates contents of driving control operation of the first arm in more detail, and in the operation flow, one picking to medicine distribution are performed.

Contents of driving control operation of the first arm 6 described in FIG. 22 will be described in more detail with reference to FIG. 25. FIG. 25 is a flowchart illustrating a series of operation flow that illustrates contents of driving control operation of the first arm 6 in FIG. 22 in more detail. In the series of operation flow, one picking to medicine distribution are performed.

The first difference between the flowchart illustrated in FIG. 25 and the flowchart of the medicine-taking support apparatus 300 illustrated in FIG. 22 is that the X movement processing in FIG. 22 is divided into subroutines to replenish more detailed contents of driving control operation of the first arm 6. The second difference is that the HP movement processing (X) in FIG. 22 is divided into subroutines to replenish more detailed contents of driving control operation of the first arm 6. The third difference is that whether the carriage 50 has a pack 2 or not (does not have) is clarified.

Hereinafter, the flowchart illustrated in FIG. 25 will be described.

In FIG. 25, when the processing starts, first, HP movement processing of the X-direction movement mechanism 91, the Y-direction movement mechanism 101, and the Z-direction movement mechanism 111 (step S41), and HP movement processing driven by the mechanism 55 for moving up or down the suction device 51, and the mechanism 63 for rotating or moving up or down the holding device 61 (step S42) that are similar as the processing described in FIG. 22 are performed as operation of initialization surrounded by a broken-line square.

Since the contents of the HP movement processing are substantially the same as the subroutine of the HP movement processing illustrated in FIG. 23, the description is omitted (see FIG. 23 in brackets in steps S41 and S42).

The initialization in FIG. 25 performs a setting of the three-direction movement mechanism 90 similarly as the initialization described in FIG. 22. That is to say, the three-direction movement mechanism 90 is allowed to be at a corner closest to the back of the medicine-taking support apparatus 300, in a right lowest portion of the movement path 26 like comb teeth illustrated in FIGS. 5A and 5B. In operation from this position, if the X-direction movement mechanism 91 is at a HP, the setting allows movement of the first arm 6 and the carriage 50 in the vertical direction (Z direction) without interference in the upward-or-downward-movement range 25 illustrated with the broken-line square frame in FIG. 5A. As part of the initialization, the HP movement processing (P-K) driven by the mechanism 55 for moving up or down the suction device 51, and the mechanism 63 for rotating or moving up or down the holding device 61, in the carriage 50 is performed to prepare picking operation that picks a pack 2, and medicine distribution operation.

Next, the carriage 50 moves to under a predetermined cartridge 10 in the cartridge storing device 9. At this time, the order of movement of the three-direction movement mechanism 90 is Z→X→Y (steps S43 to S45). Then driving of the mechanism 55 for moving up or down the suction device 51 and driving of the suction pump 48 are combined to perform picking processing in order of FIGS. 8A to 8E. Since the picking processing at this time includes operation that takes a pack 2 into the carriage 50 and holds the pack 2 in the carriage 50, NOT HAVING PACK 2 surrounded with a broken-line square is a premise (step S44).

Next, HP movement processing is performed in order of Y→X to return the carriage 50 into the upward-or-downward-movement range 25 in FIG. 5A. Since the movement in the Y direction is performed immediately before and after the picking processing, a time in which the carriage 50 is at the front end 6b side of the first arm 6 and receives a bending moment is made the shortest, and the disadvantage described in the description of FIG. 13 and caused by the first arm 6 of a cantilever type is minimized (steps S45 to S47).

Next, the carriage 50 holding or having the pack 2 obtained by the above-described picking processing performs medicine distribution processing surrounded by a broken-line square. Movement processing in order of Z→X→Y is performed to move the carriage 50 to a position of a predetermined section 33 in the medicine distribution tray 30 (steps S49 to S53). Then the mechanism 63 for rotating or moving up or down the holding device 61 is operated to perform medicine distribution processing in order of FIGS. 9A to 9E. Then HP movement processing is performed in order of Y→X→Z. At this time, after the end of the medicine distribution processing that distributes medicine to the medicine distribution tray 30, the carriage 50 that does not hold or have the pack 2 performs HP movement processing (X) (step S54). Then the carriage 50 is returned to the same position as the position at a time of the initialization, and the series of operation from picking operation to medicine distribution operation is ended (steps S41 to S55).

Figure 26A:
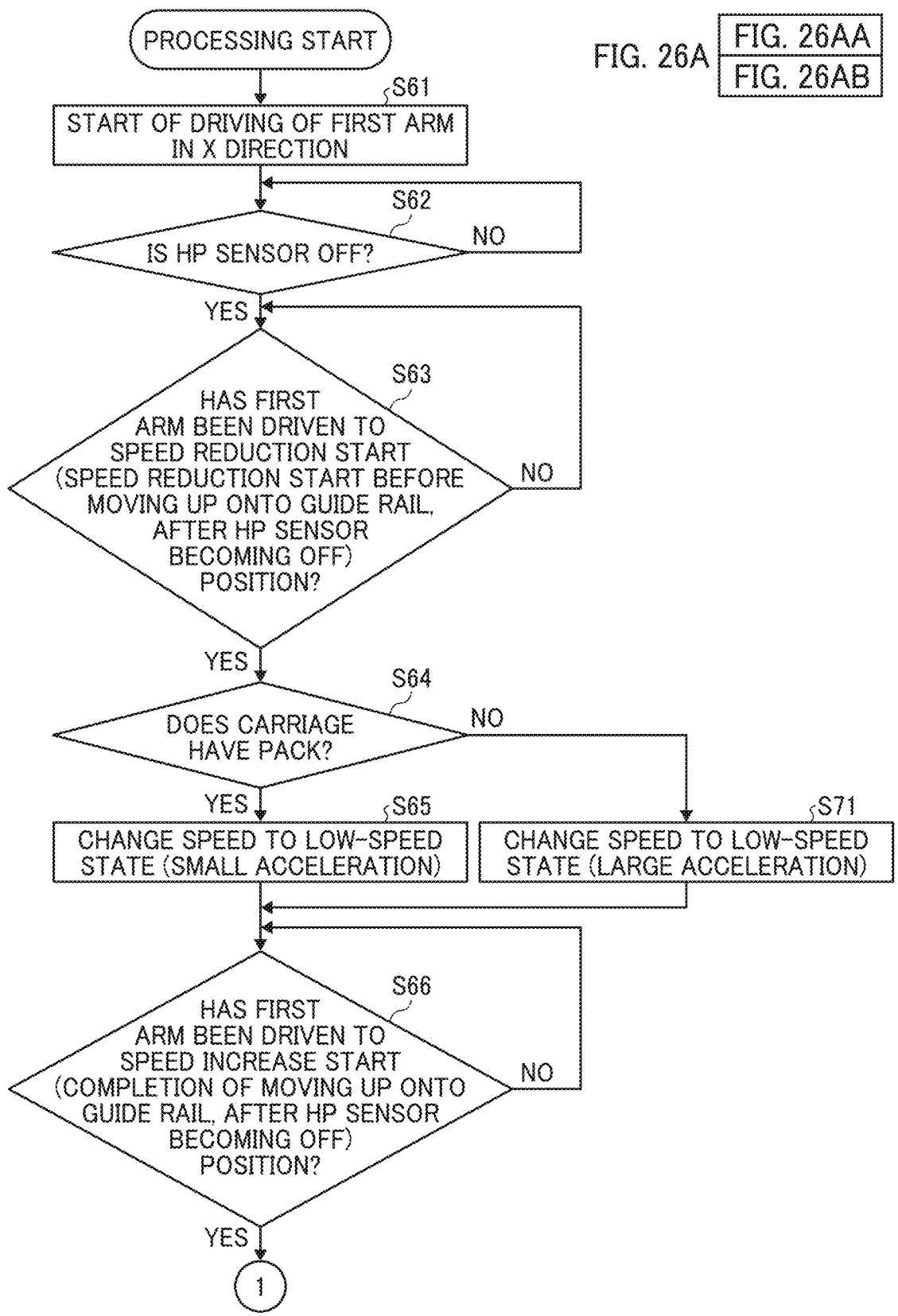
FIG. 26A including FIG. 26AA and FIG. 26AB is a flowchart illustrating a subroutine of X movement processing at a time of picking processing in FIG. 25.
Figure 26A:
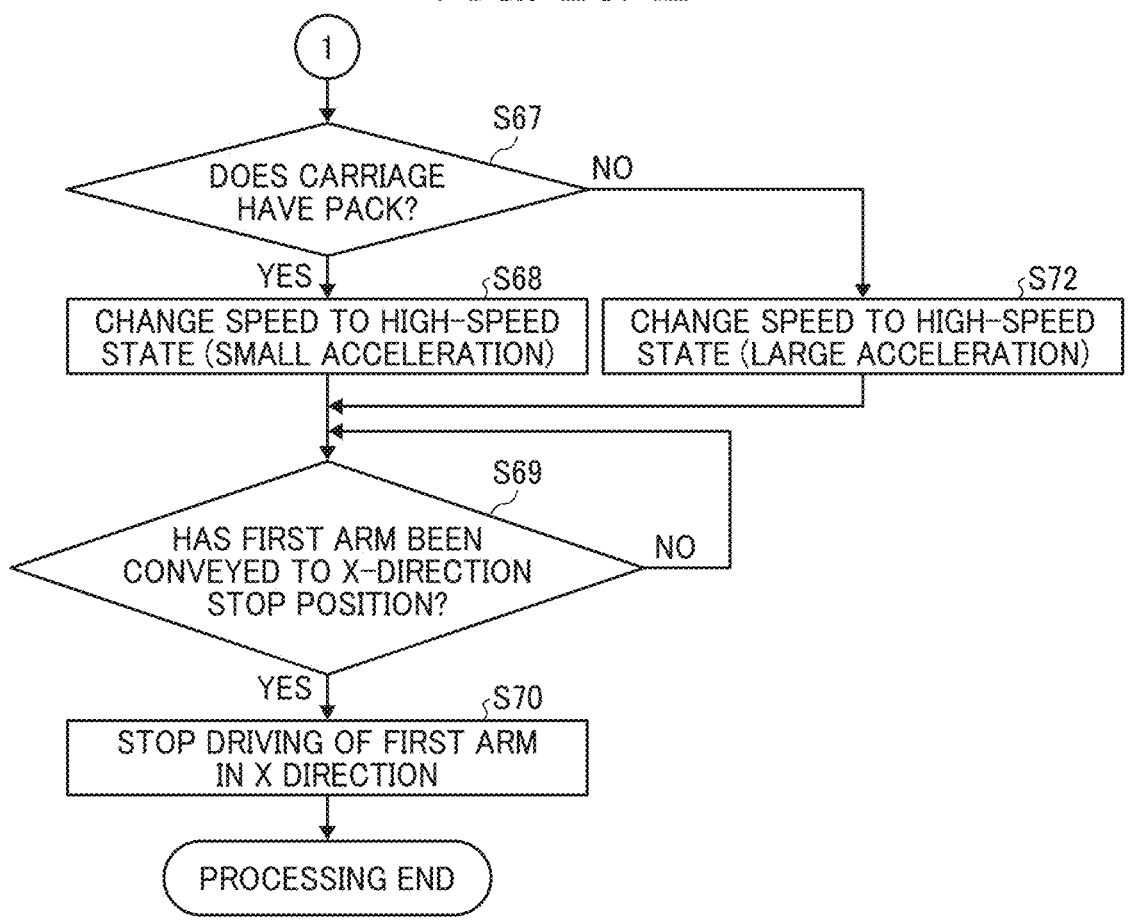
Figure 26B:
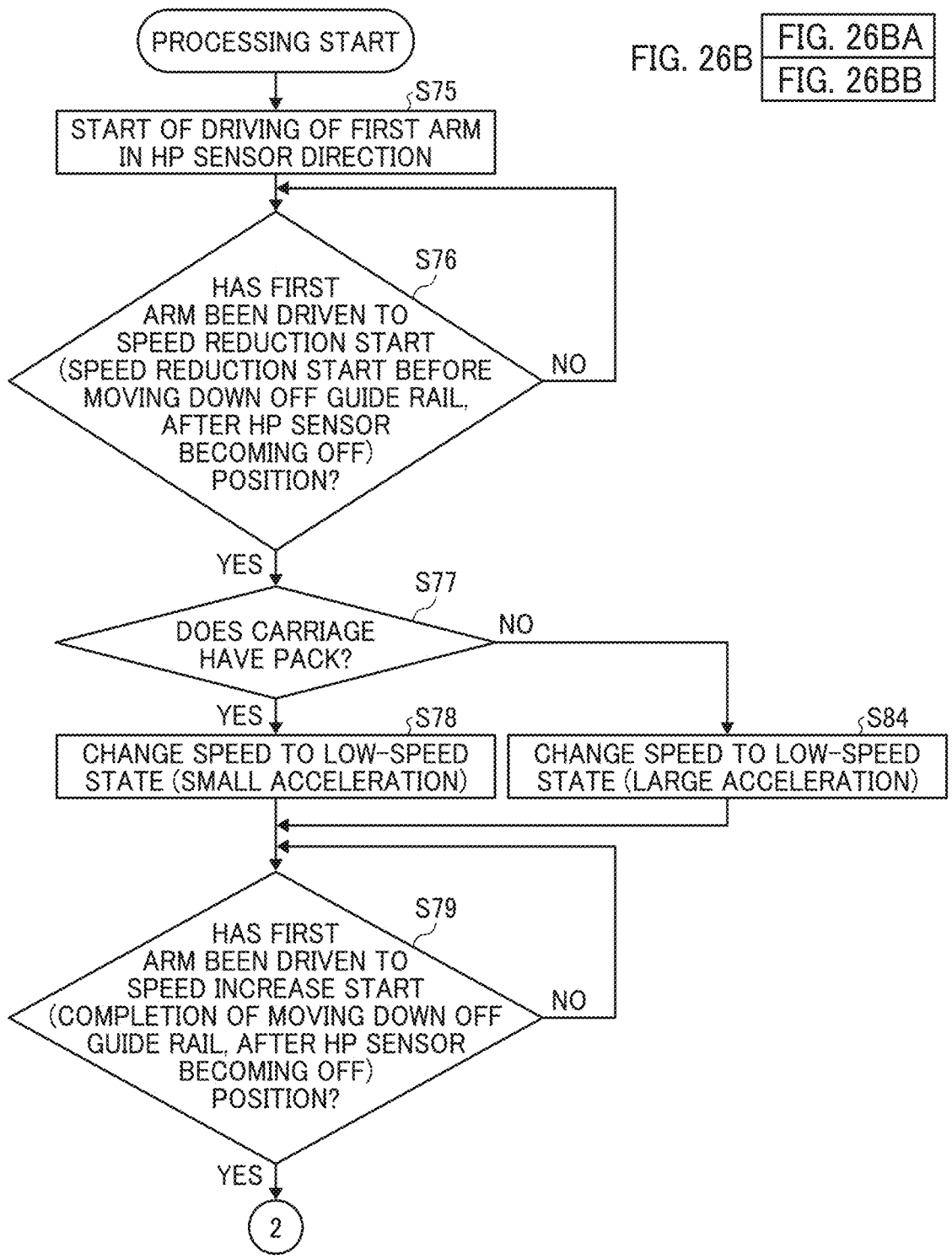
FIG. 26B including FIG. 26BA and FIG. 26BB is a flowchart illustrating a subroutine of HP movement processing (X) at a time of the picking processing.
Figure 27:
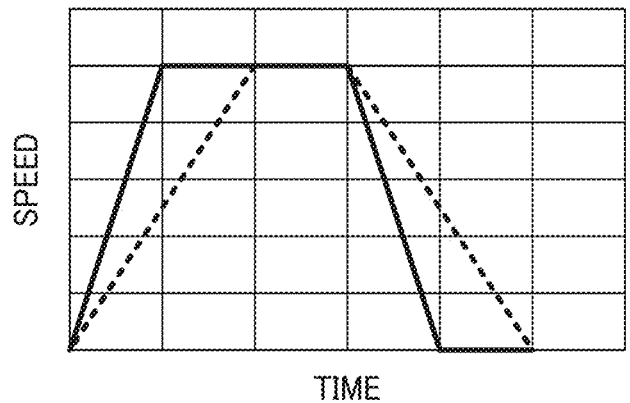
FIG. 27 is a graph in which acceleration of the first arm is varied on the basis of whether or not the carriage holds a pack.

Next, subroutines of the X movement processing and the HP movement processing (X) at a time of the picking processing described with reference to FIG. 25 will be described with reference to FIGS. 26A, 26B, and 27. FIG. 26A including FIG. 26AA and FIG. 26AB is a flowchart illustrating a subroutine of the X movement processing at a time of the picking processing in FIG. 25. FIG. 26B including FIG. 26BA and FIG. 26BB is a flowchart illustrating a subroutine of the HP movement processing (X) at a time of the picking processing. FIG. 27 is a graph illustrating an example in which movement acceleration of the first arm 6 is changed on the basis of whether or not the carriage 50 holds a pack 2 at at least one of a time when the front-end guide roller 36 of the first arm 6 moves up onto the front-end guide rail 131 and a time when the front-end guide roller 36 of the first arm 6 moves down off the front-end guide rail 131.

When the X movement processing in FIG. 26A starts, operation of the X-direction driving motor 95 that is for moving the first arm 6 and has been described with reference to FIG. 17 starts movement of the first arm 6 in the X direction (step S61). Next, the X-direction HP sensor 99 detects whether or not the first arm 6 is at a HP, a speed reduction is started after the first arm 6 is conveyed a specified distance after the first arm 6 separates from the HP (the X-direction HP sensor 99 becomes OFF).

Here, a movement distance of the front-end guide roller 36 from a position where the X-direction HP sensor 99 is disposed, to a "speed reduction start position in front of the front-end guide rail 131" before the front-end guide roller 36 moving up onto the tapered portion 131*a* of the front-end guide rail 131 is constant. On the other hand, a driving amount for the constant distance by which the X-direction driving motor 95 moves and conveys the first arm 6 is already known. Data on the distance and the driving amount of the X-direction driving motor 95 is preliminarily stored, for example, as a data table in the ROM of the controller 150 illustrated in FIG. 21. In this way, an OFF signal from the X-direction HP sensor 99 and a driving amount of the X-direction driving motor 95 trigger a speed reduction start in such a manner that the speed reduction will be completed when the front-end guide roller 36 of the first arm 6 starts to move up onto the tapered portion 131*a* of the front-end guide rail 131. Further, a driving amount of the X-direction driving motor 95 at a moment when the X-direction HP sensor 99 becomes OFF is obtained to detect the speed reduction start position (steps S62 and S63).

In step S64, the acceleration of the first arm 6 is changed according to whether or not the carriage 50 has a pack 2. The reason is that a speed increase or reduction at a time when the carriage 50 has a pack 2 is eased, as illustrated in FIG. 27, to prevent the pack 2 from leaving and falling from the suction pads 52 that are sucking and holding the pack 2 due to an inertia that accompanies the speed increase or reduction of the first arm 6. In case of a sudden speed reduction, a large inertia acts on a pack 2, the pack 2 may leave and fall from the suction pads 52.

On the other hand, in a case of a gentle speed reduction, a decreased inertia acts on a pack 2, and the pack 2 is less likely to fall. Further, when no pack 2 is sucked and held, an inertia that acts on a pack 2 does not need to be considered. Therefore, a time needed for a speed reduction is decreased, and the productivity is increased. That is to say, a speed increase or reduction is eased in part of movement of the first arm 6 in the X direction to solve the above-described problem without decreasing the productivity very much.

Although when the carriage 50 has a pack 2, and when the carriage 50 does not have a pack 2, the speed is similarly changed to a low-speed state where the speed is reduced, a magnitude relationship between the acceleration at that time is set considering the above description (steps S65 and S71).

Next, after it is checked whether or not the first arm 6 has been driven to a speed increase start (completion of moving up onto the front-end guide rail 131, after the X-direction HP sensor 99 becoming OFF) position, the acceleration of the first arm 6 is changed according to whether or not the carriage 50 has a pack 2 (steps S68 and S72). Since at this time, the first arm 6 has been driven to the speed increase start position, the speed of the first arm 6 is changed to a high-speed state irrespective of whether or not the carriage 50 has a pack 2. However, a magnitude relationship between the acceleration at that time is set considering the above description (steps S68 and S72).

Next, it is checked whether or not the first arm 6 has been conveyed to an X-direction stop position, and in a case of YES, the driving of the first arm 6 in the X direction is stopped and ended (steps S69 and S70).

When HP movement processing (X) in FIG. 26B is started, operation of the X-direction driving motor 95 starts driving of the first arm 6 toward the X-direction HP sensor 99 (step S75). Next, after it is checked whether or not the first arm 6 has been driven to a speed reduction start (before moving down off the front-end guide rail 131, after the X-direction HP sensor 99 becoming OFF) position, the acceleration of the first arm 6 is changed according to whether or not the carriage 50 has a pack 2. At this time, a driving amount of the X-direction driving motor 95 at a moment when the X-direction HP sensor 99 becomes OFF is obtained to detect the speed reduction start position of the first arm 6.

Since in step S77, the first arm 6 has been driven to the speed reduction start position, the speed of the first arm 6 is changed to a low-speed state irrespective of whether or not the carriage 50 has a pack 2. However, a magnitude relationship between the acceleration at that time is set considering the above description (steps S78 and S84).

Next, it is checked whether or not the first arm 6 has been driven to a speed increase start (completion of moving down off the front-end guide rail 131, after the X-direction HP sensor 99 becoming OFF) position. At this time, a driving amount of the X-direction driving motor 95 at a moment when the X-direction HP sensor 99 becomes OFF is obtained to detect the speed increase start position of the first arm 6. Then the acceleration of the first arm 6 is changed according to whether or not the carriage 50 has a pack 2. Since at this time, the first arm 6 has been driven to the speed increase start position, the speed of the first arm 6 is changed to a high-speed state irrespective of whether or not the carriage 50 has a pack 2. However, a magnitude relationship between the acceleration at that time is set considering the above description (steps S81 and S85).

Next, the X-direction HP sensor 99 detects whether or not the first arm 6 is at a HP, and in a case of YES, the driving of the first arm 6 in an X-direction HP sensor 99 direction is stopped and ended (steps S82 and S83).

Figure 28:
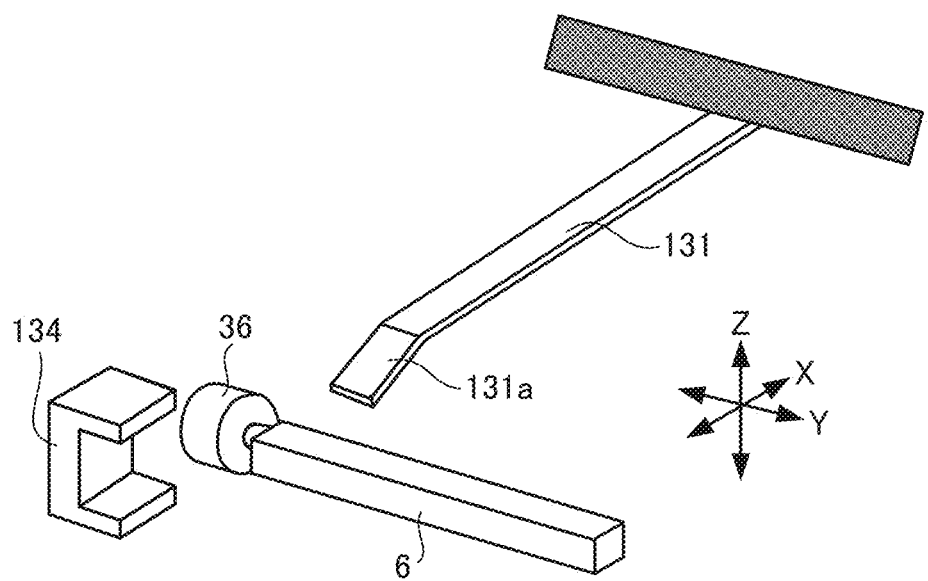
FIG. 28 is a perspective view of surroundings of a portion where a sensor in front of the front-end guide rail is disposed.
Figure 29A:
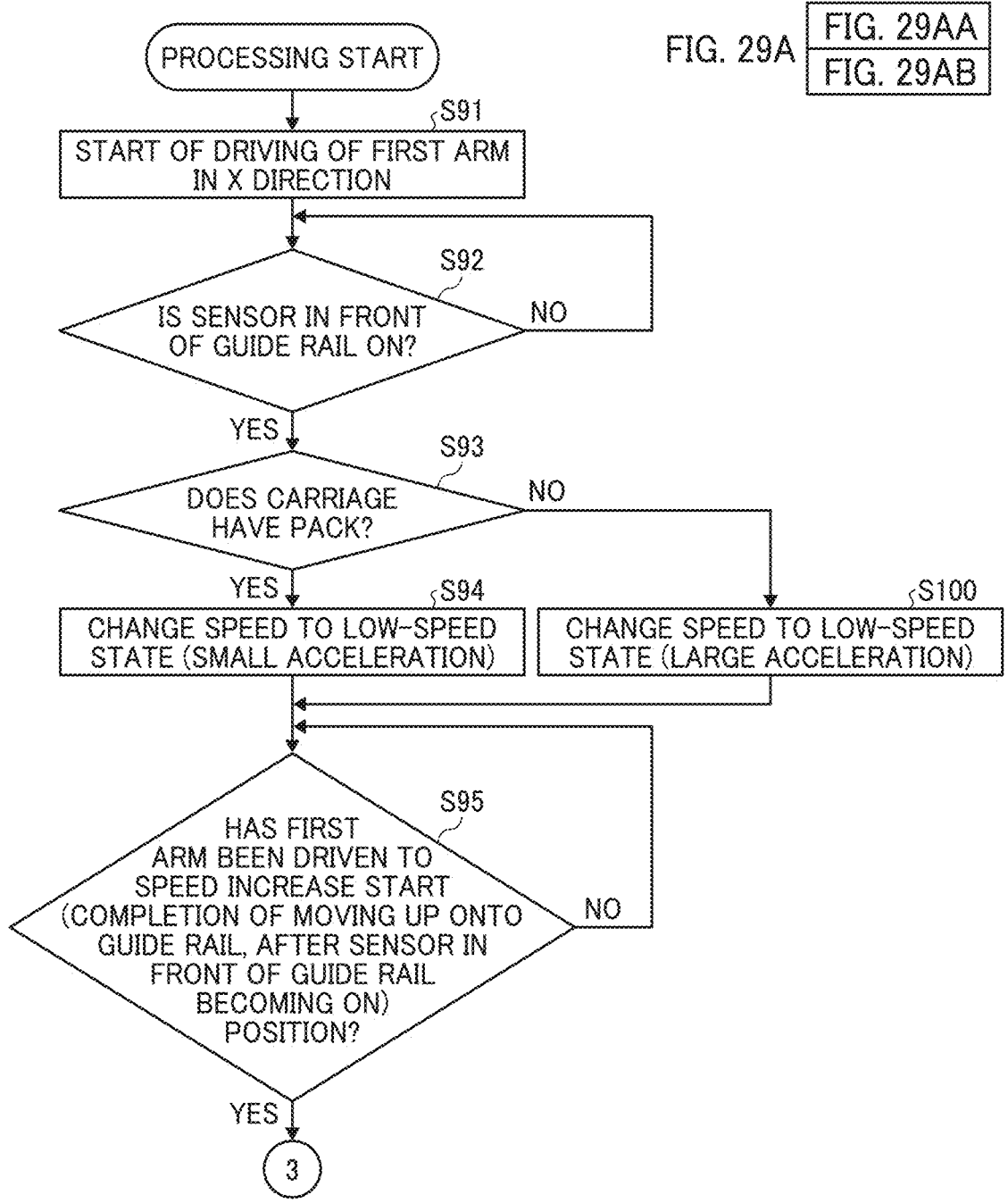
FIG. 29A including FIG. 29AA and FIG. 29AB is a flowchart illustrating a subroutine of X-direction movement processing using the sensor in front of the front-end guide rail.
Figure 29A:
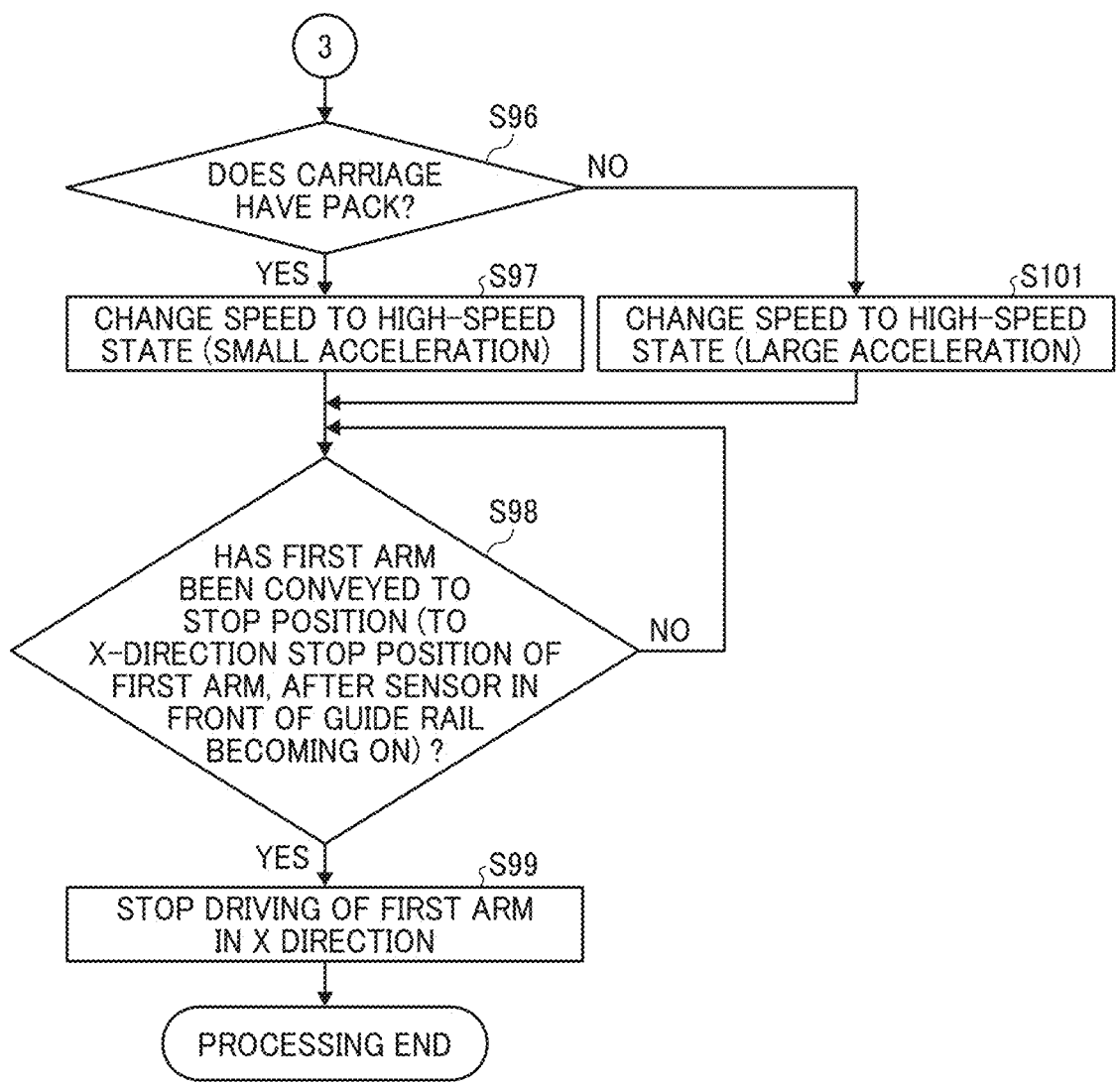
Figure 29B:
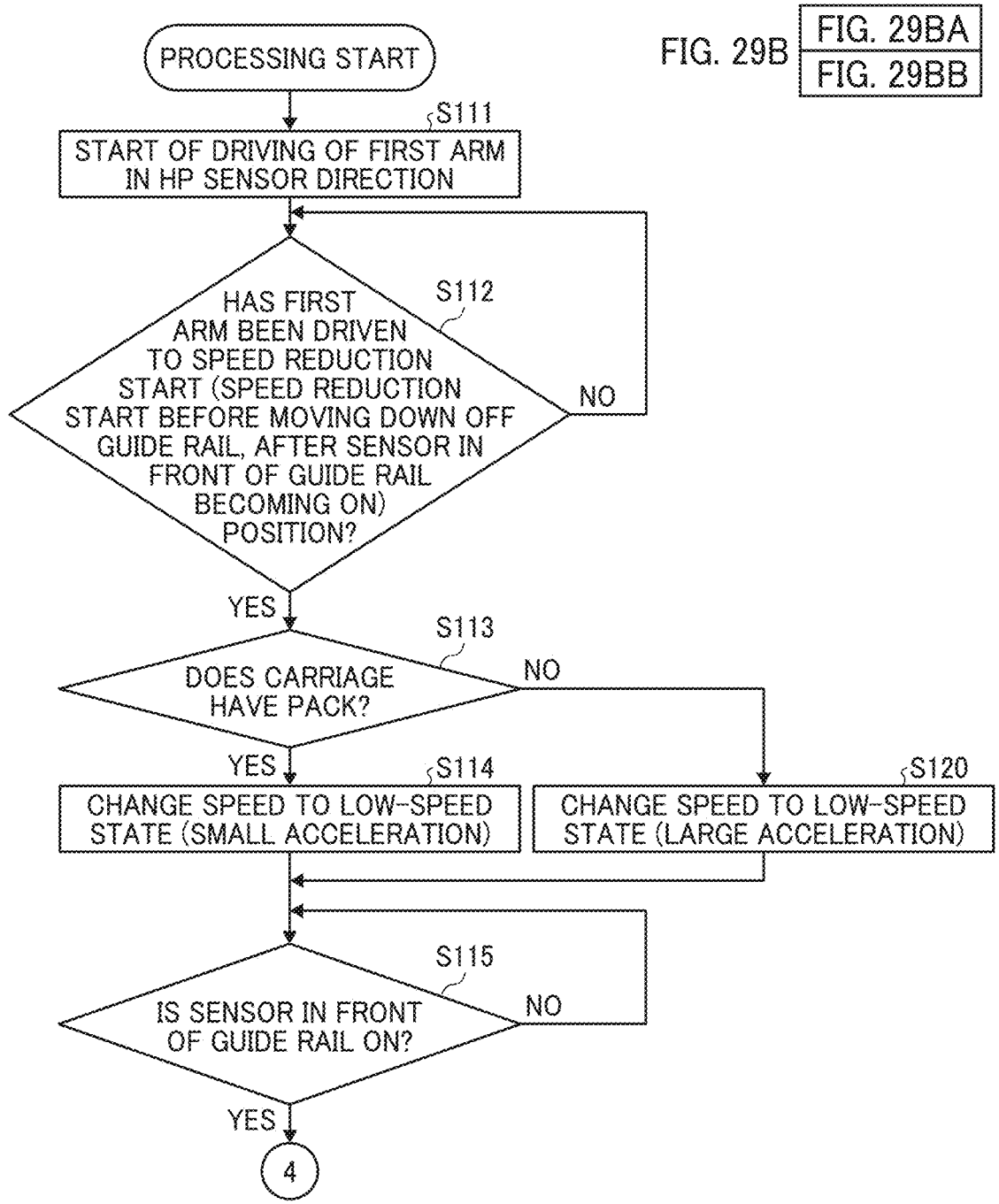
FIG. 29B including FIG. 29BA and FIG. 29BB is a flowchart illustrating a subroutine of HP movement processing (X)
Figure 29B:
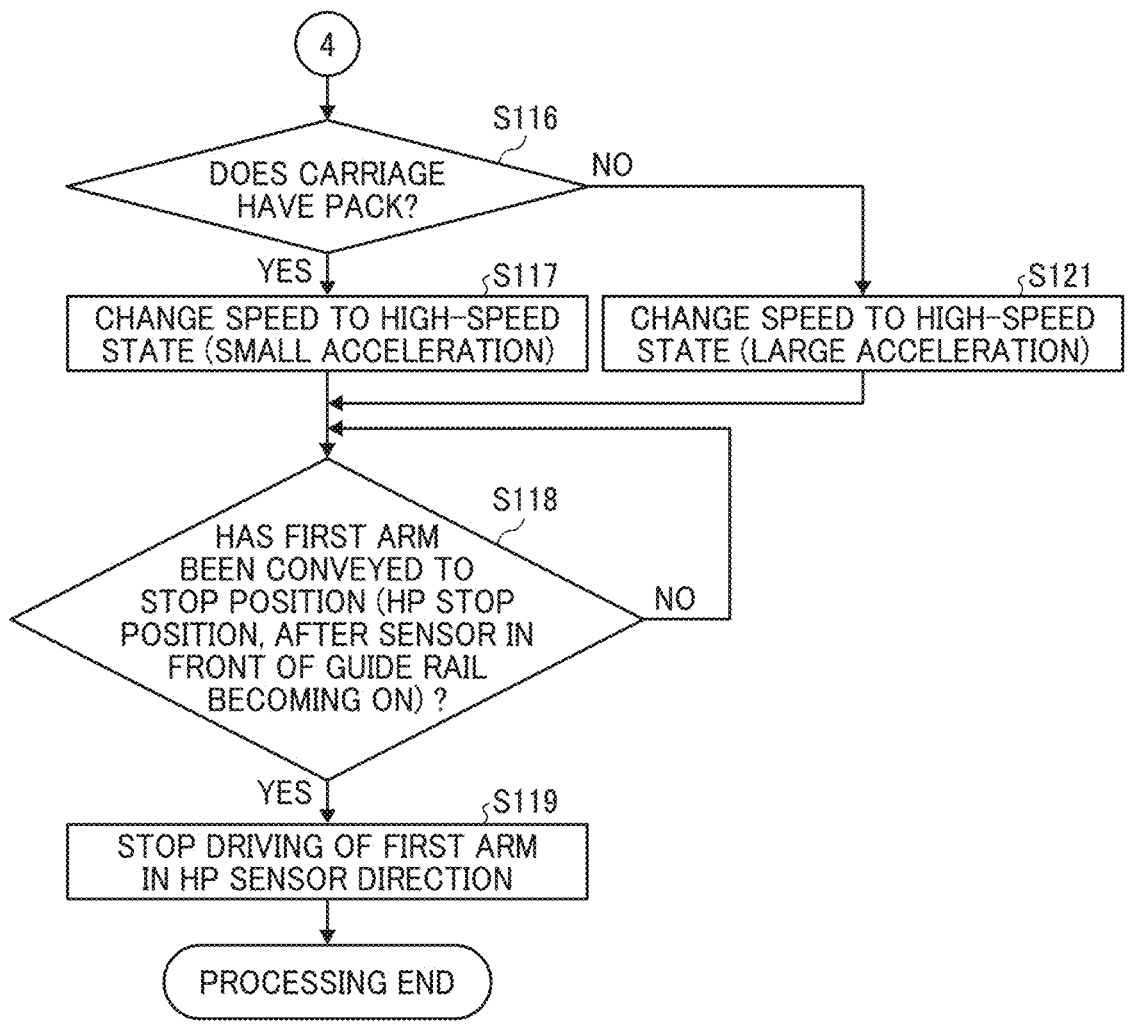

A variation example of driving control of the first arm 6 will be described with reference to FIGS. 28, 29A, and 29B. FIG. 28 is a perspective view of surroundings of a portion where a sensor 134 in front of the front-end guide rail 131 is disposed. The sensor 134 in front of the front-end guide rail 131 detects a movement position of the front-end guide roller 36 of the first arm 6. FIG. 29A including FIG. 29AA and FIG. 29AB is a flowchart illustrating a subroutine of X movement processing using the sensor 134 in front of the front-end guide rail 131. FIG. 29B including FIG. 29BA and FIG. 29BB is a flowchart illustrating a subroutine of HP movement processing (X).

As illustrated in FIG. 28, the sensor 134 in front of the front-end guide rail 131 is disposed at an immovable member on the main-body frame 190 side. The sensor 134 in front of the front-end guide rail 131 detects passage of the first arm 6 before the front end 6*b* (in FIG. 28, the front-end guide roller 36 is indicated) of the first arm 6 moves up onto the front-end guide rail 131. The sensor 134 in front of the front-end guide rail 131 functions as a second detector that detects the front end 6*b* of the first arm 6 at a specific position where the front end 6*b* of the first arm 6 does not contact the front-end guide rail 131, that is to say at a position immediately before the front end 6*b* starting to contact the front-end guide rail 131.

The sensor 134 in front of the front-end guide rail 131 is a thru-beam photosensor that includes a light emitter and a light receiver.

Here, a movement distance of the front-end guide roller 36 from a position where the sensor 134 in front of the front-end guide rail 131 is disposed, to a "speed reduction start position in front of the front-end guide rail 131" before the front-end guide roller 36 moving up onto the tapered portion 131a of the front-end guide rail 131 is constant. On the other hand, a driving amount for the constant distance by which the X-direction driving motor 95 moves and conveys the first arm 6 is already known. Data on the distance and the driving amount of the X-direction driving motor 95 is preliminarily stored, for example, as a data table in the ROM of the controller 150 illustrated in FIG. 21.

If passage of the front-end guide roller 36 of the first arm 6 through the sensor 134 in front of the front-end guide rail 131 is detected, the CPU of the controller 150 illustrated in FIG. 21 performs control in such a manner that an ON signal from the sensor 134 in front of the front-end guide rail 131 triggers a start of a speed reduction of the X-direction driving motor 95. However, the speed reduction is started in such a manner that the speed reduction will be completed when the front-end guide roller 36 starts to move up onto the front-end guide rail 131.

When the front-end guide roller 36 of the first arm 6 leaves the front-end guide rail 131, the CPU of the controller 150 illustrated in FIG. 21 performs control in such a manner that an ON signal from the sensor 134 in front of the front-end guide rail 131 and an X-direction driving amount trigger a start of a speed reduction of the X-direction driving motor 95. However, the speed reduction is started in such a manner that the speed reduction will be completed when the front-end guide roller 36 starts to move down off the front-end guide rail 131.

When X movement processing in FIG. 29A starts, operation of the X-direction driving motor 95 starts movement of the first arm 6 in the X direction (step S91). The sensor 134 in front of the front-end guide rail 131 detects passage of the first arm 6 before the front-end guide roller 36 of the first arm 6 moves up onto the front-end guide rail 131. If the sensor 134 in front of the front-end guide rail 131 becomes ON, an ON signal from the sensor 134 in front of the front-end guide rail 131 triggers a speed reduction of the first arm 6. Consequently, the speed of the first arm 6 is changed to a low-speed state. At this time, it is checked whether or not the carriage 50 has a pack 2. If the carriage 50 has a pack 2, the acceleration of the first arm 6 is eased to prevent the pack 2 from falling from the suction pads 52 due to an inertia of the pack 2. If the carriage 50 does not have a pack 2, the acceleration is made relatively large. However, the speed reduction is started in such a manner that the speed reduction will be completed when the front-end guide roller 36 starts to move up onto the front-end guide rail 131 (steps S92 to S94, and S100).

Next, it is checked whether or not the first arm 6 has reached a speed increase start position. If the first arm 6 has reached a speed increase start position, it is checked whether or not the carriage 50 has a pack 2, as described above, and the speed of the first arm 6 is increased to be changed to a high-speed state. At this time, if the carriage 50 has a pack 2, the acceleration of the first arm 6 is eased to prevent the pack 2 from falling from the suction pads 52 due to an inertia of the pack 2. If the carriage 50 does not have a pack 2, the acceleration is made relatively large (steps S95 to S97, and S101).

Next, it is checked whether or not the first arm 6 has been conveyed to an X-direction stop position, and in a case of YES, the driving of the first arm 6 in the X direction is stopped and ended (steps S98 and S99).

Next, when HP movement processing (X) in FIG. 29B starts, operation of the X-direction driving motor 95 starts driving of the first arm 6 in a HP direction (step S111). When the front-end guide roller 36 of the first arm 6 leaves the front-end guide rail 131, it is checked whether or not the first arm 6 has reached a speed reduction start position. If the first arm 6 has reached the speed reduction start position, the speed of the first arm 6 is reduced to be changed to a low-speed state. However, the speed reduction is started in such a manner that the speed reduction will be completed when the front-end guide roller 36 starts to move down off the front-end guide rail 131. Then, if the carriage 50 has a pack 2, the acceleration of the first arm 6 is eased to prevent the pack 2 from falling from the suction pads 52 due to an inertia of the pack 2. If the carriage 50 does not have a pack 2, the acceleration is made relatively large (steps S112 to S114, and S120).

Next, it is checked whether or not the sensor 134 in front of the front-end guide rail 131 has become ON. If the sensor 134 in front of the front-end guide rail 131 has become ON, it is checked whether or not the carriage 50 has a pack 2, as described above, and the speed of the first arm 6 is increased to be changed to a high-speed state. At this time, if the carriage 50 has a pack 2, the acceleration of the first arm 6 is eased to prevent the pack 2 from falling from the suction pads 52 due to an inertia of the pack 2. If the carriage 50 does not have a pack 2, the acceleration is made relatively large (steps S115 to S117, and S121).

Next, on the basis of a motor driving amount, it is determined whether or not the first arm 6 is at a HP, and in a case of YES, the driving of the first arm 6 in the HP direction is stopped and ended (steps S118 and S119).

According to the variation example, the X-direction HP sensor 99 illustrated in FIG. 17 is not necessary, and a wiring (wire harness) configuration around the first arm 6 is simplified and made compact.

Figure 30:
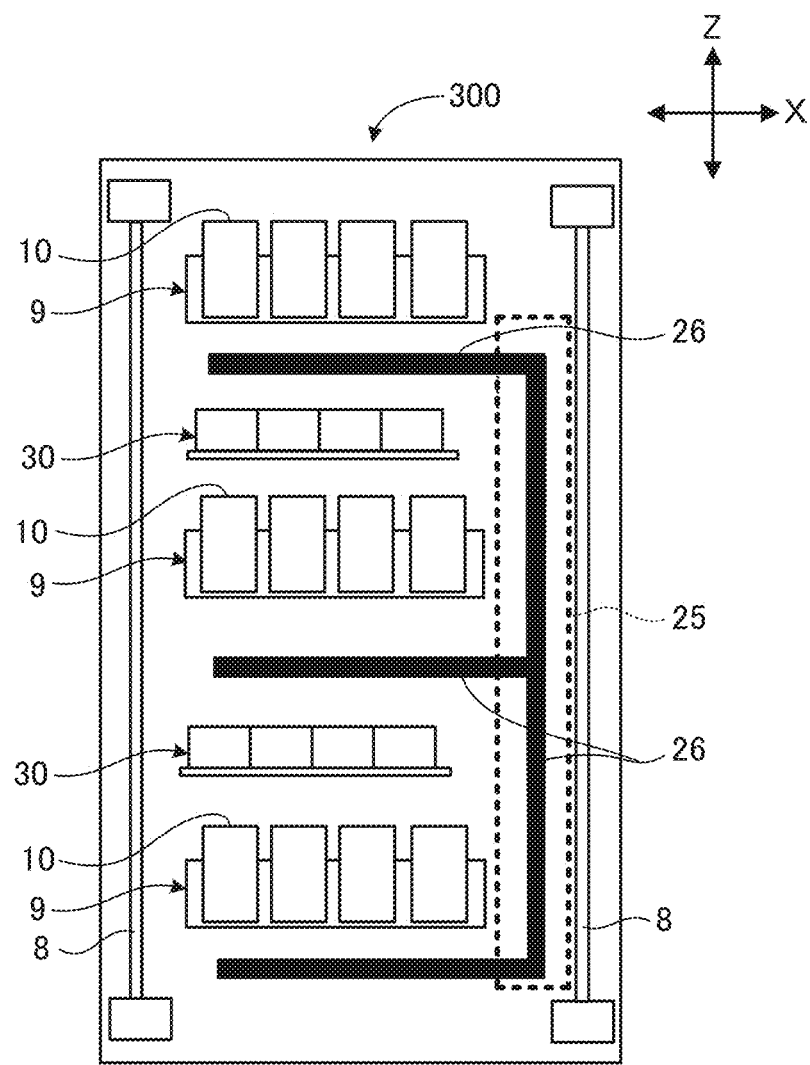
FIG. 30 is a front view illustrating a medicine-taking support apparatus according to an embodiment different from the second embodiment illustrated in FIGS. 5A and 5B.

A medicine-taking support apparatus 300 according to an embodiment different from the second embodiment illustrated in FIGS. 5A and 5B will be described with reference to FIG. 30 although the description is mixed up. FIG. 30 is a front view illustrating the medicine-taking support apparatus 300 according to an embodiment different from the second embodiment illustrated in FIGS. 5A and 5B. A difference between the medicine-taking support apparatus 300 illustrated in FIG. 30 and the medicine-taking support apparatus 300 illustrated in FIGS. 5A and 5B is that the order of total five tiers including three tiers of a cartridge storing device 9 and two tiers of medicine distribution trays 30 is changed to alternate the three tiers of the cartridge storing device 9 and the two tiers of the medicine distribution trays 30. Therefore, in two places, the cartridge storing device 9 at a higher tier, a movement space including a movement path 26 under the cartridge storing device 9 at a higher tier, a movement space including the movement path 26 over the medicine distribution tray 30 at the next tier, and the medicine distribution tray 30 at the next tier sequentially and continuously align. Consequently, the movement path 26 of a carriage 50 has only three branches.

In other words, there are two upper and lower places where a path through which the carriage 50 takes a pack out of a cartridge 10 of the cartridge storing device 9, and holds and conveys out the pack, and a path through which the carriage 50 stores the conveyed-out pack in the medicine distribution tray 30 are a common path. From a different point of view, an expression is also possible that when the carriage 50 moves between the cartridge storing device 9 and the medicine distribution tray 30 that are at a higher tier and a lower tier between which there is a movement space of the carriage 50, the carriage 50 does not move in the vertical direction (Z direction).

The configuration decreases one of spaces where the carriage 50 horizontally moves, and provides the medicine-taking support apparatus 300 that is more compact in the vertical direction, or a height direction of the medicine-taking support apparatus 300.

Figure 31:
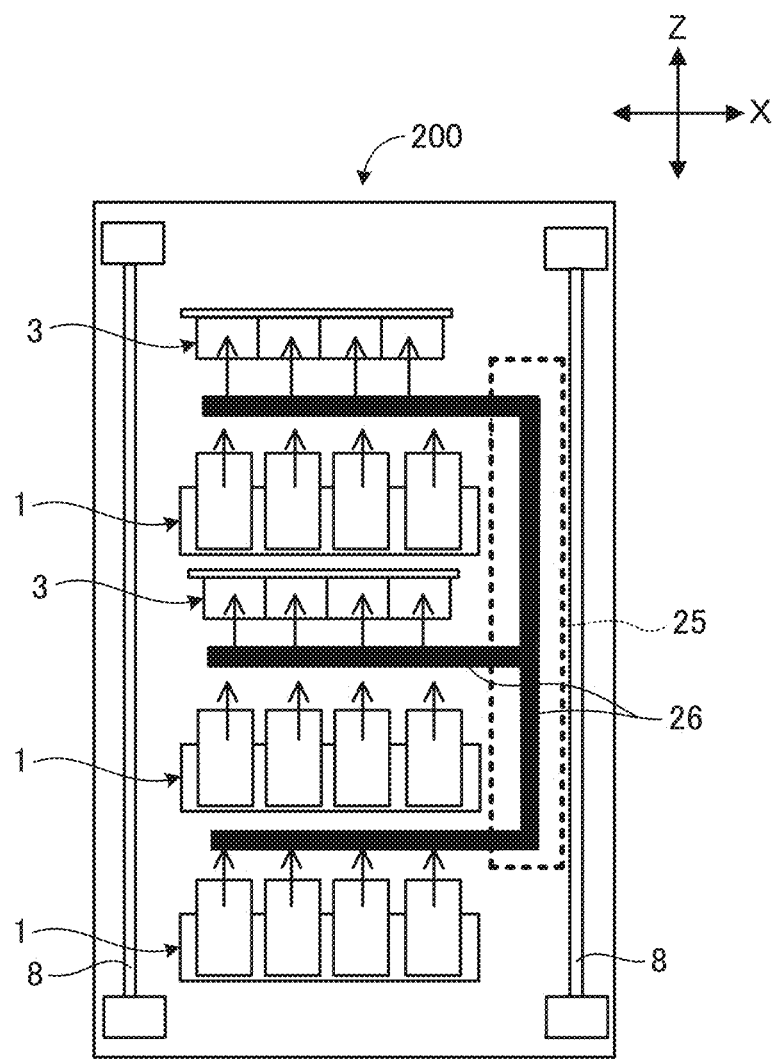
FIG. 31 is a front view illustrating an item storage apparatus according to an embodiment different from the first embodiment illustrated in FIG. 1.

Although the item storage apparatus 200 and the medicine-taking support apparatuses 300 occupying a small space that are characteristic of the present disclosure have been described so far, an item storage apparatus 200 according to an embodiment different from the first embodiment illustrated in FIG. 1 will be described with reference to FIG. 31. FIG. 31 is a front view illustrating the item storage apparatus 200 according to an embodiment different from the first embodiment illustrated in FIG. 1.

In contrast to the description with reference to FIGS. 8A to 8E, and 9A to 9E, in the item storage apparatus 200 illustrated in FIG. 31, items are picked from an upper portion of a first storage 1, and items are stored in a second storage 3 through a lower portion of the second storage 3. Even in this case, it is obvious that the item storage apparatus 200 has a similar effect as the effect of the medicine-taking support apparatus 300 illustrated in FIG. 30.

In contrast to an example illustrated in FIG. 30, in the item storage apparatus 200 illustrated in FIG. 31, the arrangement of the first storage 1 corresponding to the cartridge storing device 9, and the second storage 3 corresponding to the medicine distribution tray 30 is reversed. Further, the items are moved up and placed, as indicated by small arrows depicted near the first storage 1 and the second storage 3. Therefore, in two places, the second storage 3 at a higher tier, a movement space including a movement path 26 under the second storage 3 at a higher tier, a movement space including the movement path 26 over the first storage 1 at the next tier, and the first storage 1 at the next tier sequentially and continuously align. Consequently, the movement path 26 of a carriage 50 has only three branches.

In other words, there are two upper and lower places where a path through which the carriage 50 takes an item out of the first storage 1, and holds and conveys out the item, and a path through which the carriage 50 stores the conveyed-out item in the second storage 3 are a common path. From a different point of view, an expression is also possible that when the carriage 50 moves between the first storage 1 and the second storage 3 that are at a higher tier and a lower tier between which there is a movement space of the carriage 50, the carriage 50 does not move in the vertical direction (Z direction).

The configuration decreases one of spaces where the carriage 50 horizontally moves, and provides the item storage apparatus 200 that is more compact in the vertical direction, or a height direction of the item storage apparatus 200.

Figure 32A:
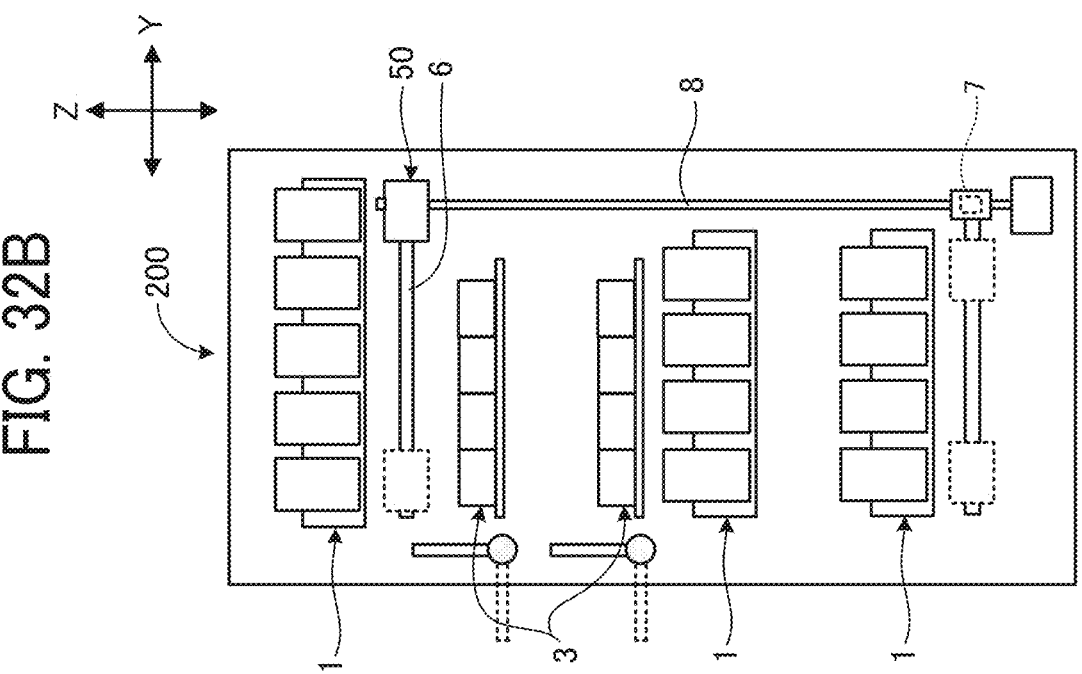
FIG. 32A is a front view illustrating an item storage apparatus according to another embodiment different from the first embodiment illustrated in FIG. 1.
Figure 32B:
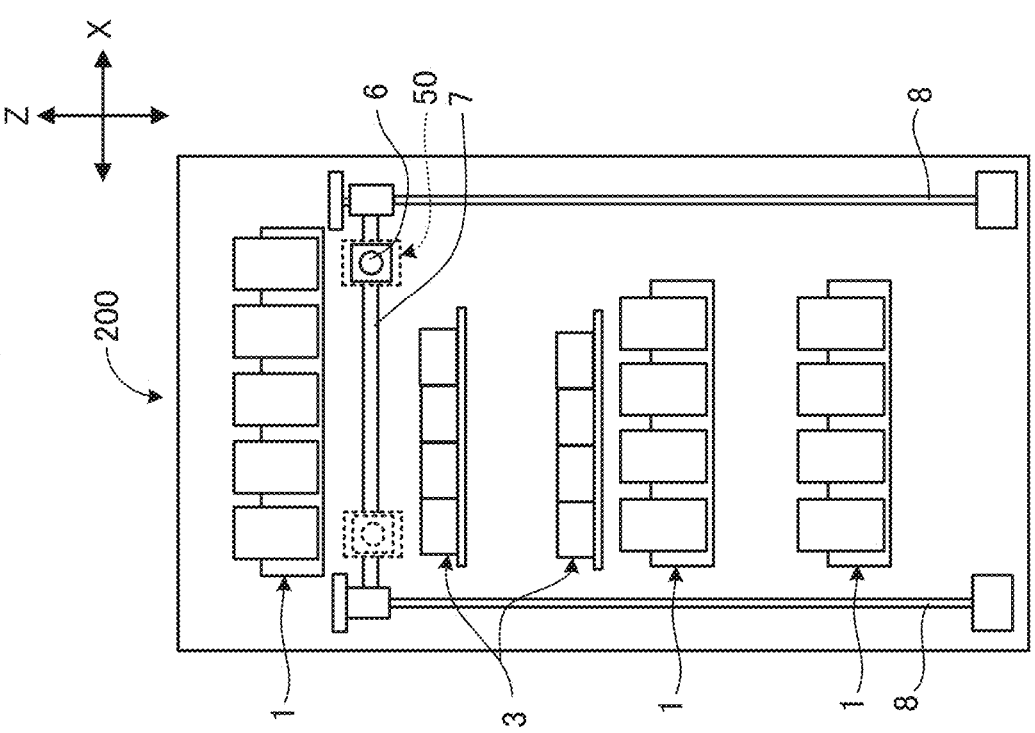
FIG. 32B is a right side view of FIG. 32A.

An item storage apparatus 200 according to another embodiment will be described with reference to FIGS. 32A and 32B. FIG. 32A is a front view illustrating the item storage apparatus 200 according to another embodiment different from the first embodiment illustrated in FIG. 1. FIG. 32B is a right side view of FIG. 32A.

In the example, a space where vertical-movement mechanisms 8 occupy is under the height of a second highest tier. Consequently, the item storage apparatus 200 illustrated in FIGS. 32A and 32B increases a volume of the first storage 1 at a highest tier for items. In FIGS. 32A and 32B, in contrast to a volume that accommodates total sixteen cartridges included by the first storage 1 at a lower tier in four rows and four columns per tier, total twenty-five cartridges included by the first storage 1 at a highest tier in five rows and five columns per tier are accommodated.

In other words, in the item storage apparatus 200 illustrated in FIGS. 32A and 32B, the vertical-movement mechanisms 8 are disposed below the first storage 1 at a highest tier, and a storage volume of the first storage 1 at a highest tier for items is larger than a storage volume of the first storage 1 at another tier for items.

The configuration increases items in the first storage 1 at a highest tier, and provides the item storage apparatus 200 that accommodates more cartridges.

Note that the case is not limiting, and items may be taken out of and into the first storage 1 at a highest tier through an upper portion of the item storage apparatus 200, or the item storage apparatus 200 may include a lid structure that opens and closes at a ceiling portion of the item storage apparatus 200.

As described above, the above-described embodiments including the examples and the like of the item storage apparatus and the medicine-taking support apparatus have a basic effect of providing an item storage apparatus and a medicine-taking support apparatus that occupy a small space, and allow work dealing with items and one-dose-package medicine packs to be automatic, simple, and reliable. Consequently, the item storage apparatus and the medicine-taking support apparatus according to the first embodiment, the second embodiment, and the like of the present disclosure are disposed instead of a conventional medicine preparation shelf, and solve disadvantages due to dependence on human hands.

It can be said that the following aspects and effects have been substantially described in the above-described embodiments and the like including the examples and the like of the item storage apparatus and the medicine-taking support apparatus described above. Constituents in brackets indicate that the constituents are constituents of a medicine-taking support apparatus corresponding to constituents of an item storage apparatus.

That is to say, according to a first aspect, an item storage apparatus, such as the item storage apparatus 200 (medicine-taking support apparatus 300), includes: a first storage, such as the first storage 1 (cartridge storing device 9), to store a pile of a plurality of items (a plurality of items, such as one-dose-package medicine packs 2); a carrier, such as the carriage 50, to take one of the items out of the first storage and hold and convey out the item; a first support, such as the first arm 6, supporting the carrier such that the carrier is movable back and forth in a first horizontal direction (the forward or backward direction (Y direction); a second support, such as the second arm 7, supporting the first support such that the first support is movable back and forth in a second horizontal direction, such as the left or right direction (X direction), perpendicular to the first horizontal direction; an vertical mover, such as the vertical-movement mechanisms 8, supporting the second support such that the second support is movable back and forth in a vertical direction, such as the vertical direction (Z direction), that perpendicular to the first horizontal direction and the second horizontal direction; and a second storage, such as the second storage 3 (medicine distribution trays 30), to store the item conveyed out by the carrier, in which the item storage apparatus has a multi-tier structure in which at least one of the first storage and the second storage includes a plurality of tiers, and a space where the carrier moves is disposed between the tiers, and the first support has a cantilever structure in which one end of the first support is secured to a second support side, and another end of the first support is not supported, in other words, is a free end.

The configuration according to the first aspect provides an item storage apparatus and a medicine-taking support apparatus that occupy a small space, and allow work dealing with items and one-dose-package medicine packs to be automatic, simple, and reliable. Consequently, an item storage apparatus and a medicine-taking support apparatus according to the present disclosure have a basic effect of being installed instead of a conventional medicine preparation shelf, and solving disadvantages due to dependence on human hands.

According to a second aspect, the item storage apparatus of the first aspect includes a path, such as the movement path 26, through which the carrier takes one of the items out of the first storage, and holds and conveys out the item, and a path through which the carrier stores the conveyed-out item in the second storage are a common path.

The configuration according to the second aspect decreases one of spaces where the carrier horizontally moves, and decreases the height of the item storage apparatus.

According to a third aspect, in the item storage apparatus of the second aspect, when the carrier moves between the first storage and the second storage, the carrier does not move in the vertical direction.

The configuration according to the third aspect simplifies the path and thus improves the productivity.

According to a fourth aspect, in the item storage apparatus of the first aspect, the vertical moving mechanism is disposed below a highest tier of the first storage, and a storage volume of the highest tier of the first storage for the items is larger than a storage volume of another tier of the first storage for the items.

The configuration according to the fourth aspect increases the items in the highest tier of the first storage.

According to a fifth aspect, the item storage apparatus of any one of the first to fourth aspects further includes storage movement means, such as the entrance ports 41 to 45, to allow the first storage or the second storage to be taken out and in through a front side of the multi-tier structure.

The configuration according to the fifth aspect allows the items to be easily taken in and out (compared with, for example, a scheme where an arm is withdrawn to store the items through the ceiling).

According to a sixth aspect, the item storage apparatus of any one of the first to fifth aspects further includes a holding device, such as the holding device 61, rotatable to change orientation of one of the items after the carrier conveys the item out of the first storage. The holding device is to be rotated before the carrier moves back and forth in the vertical direction while holding the taken-out item.

The configuration according to the sixth aspect allows the holding device of the carrier that is horizontal to be vertical, and thus decreases a space for vertical movement. Therefore, the configuration according to the sixth aspect contributes to downsizing of the item storage apparatus.

According to a seventh aspect, the item storage apparatus of any one of the first to sixth aspects further includes guide rails, such as the front-end guide rails 131, disposed such that when the first support moves on the second support stopped, one of the guide rails contacts the other end of the first support to guide the first support horizontally while keeping a height position of the first support in the vertical direction.

The configuration according to the seventh aspect keeps the first support of a cantilever structure horizontal. Therefore, a distance between the first support and the first storage or the second storage is constant even if the carrier moves, and the items are stably takes in and out. Further, a bending load acting on the first support is eliminated to obtain smooth operation, maintenance of accuracy, and high durability of the carrier.

According to an eighth aspect, in the item storage apparatus of the seventh aspect, a movement speed of the first support is decreased at at least one of a time when the other end, such as the base end 6a of the first arm 6, contacts one of the guide rails or a time when the other end separates from one of the guide rails.

The configuration according to the eighth aspect decreases a load on the first support of a cantilever structure to increase durability of the first support, and prevent the other end from jumping up. Consequently, accuracy of a stop position of the first support is increased.

According to a ninth aspect, in the item storage apparatus of the eighth aspect, the movement acceleration of the first support at at least one of the time when the other end contacts one of the guide rails or the time when the other end separates from one of the guide rails is changed, based on whether or not the carrier holds the item.

The configuration according to the ninth aspect eases a speed increase and a speed reduction when the item (including, for example, a one-dose-package medicine pack) is held to decrease an inertia acting on the item. Consequently, the item is less likely to fall down, and the carrier stably transfers the item.

According to a tenth aspect, the item storage apparatus of the eighth or ninth aspect further includes: a first detector, such as the X-direction HP sensor 99, to detect a fact that the other end is at a predetermined position; a driving device, such as the X-direction driving motor 95, to move the first support; and a controller, such as the controller 150 including the CPU, to calculate a driving amount of the driving device necessary to move the first support at a distance corresponding to a movement distance of the other end at which the other end moves from a position where the first detector is disposed to a position where the other end contacts one of the guide rails and a movement distance of the other end moves from the position where the first detector is disposed to a position where the other end separates from the guide rail. The controller is to determine a timing of start of increasing or decreasing a movement speed of the first support, based on a detection signal of the other end detected by the first detector, and the driving amount determined by the controller.

The configuration according to the tenth aspect uses the first detector and the driving amounts of the driving device to determine a timing at which a speed reduction is started before the other end contacts the guide rail, and before the other end separates from the guide rail. Further, a second detector does not need to be disposed at each of the tiers, like an eleventh aspect described below. Therefore, the number of installed detectors is decreased to decrease the cost.

According to an eleventh aspect, the item storage apparatus of the eighth or ninth aspect further includes: a second detector, such as the sensor 134 in front of the front-end guide rail 131, to detect the other end at a specific position where the other end does not contact the guide rails; a driving device, such as the X-direction driving motor 95, to move the first support; and a controller, such as the controller 150 including the CPU, to control driving of the driving device. The controller is to determine a timing of increasing or decreasing a movement speed of the first support at the specific position, using a detection signal, as a trigger, of the other end detected by the second detector.

The configuration according to the eleventh aspect uses the second detector to determine a timing at which a speed reduction is started before the other end of the first support contacts the guide rail. Further, the first detector, such as the X-direction HP sensor 99, does not need to be disposed at each of the tiers, like the tenth aspect described above. Therefore, a wiring (wire harness) configuration around the first support is simplified to decrease the cost.

According to a twelfth aspect, the item storage apparatus of any one of the seventh to eleventh aspects further includes a guide roller disposed at the other end of the first support.

The guide roller is to contact the guide rails.

The configuration according to the twelfth aspect provides smooth horizontal movement, noise reduction, and high durability of the first support of a cantilever structure.

According to a thirteenth aspect, in the item storage apparatus of any one of the seventh to twelfth aspects, one of the guide rails corresponding to a lowest-limit position of vertical movement of the first support and the second support has such an extended length that the first support constantly contacts the guide rail.

The configuration according to the thirteenth aspect does not cause bending of the first support of a cantilever structure at the lowest-limit position, irrespective of the position of the carrier.

According to a fourteenth aspect, in the item storage apparatus of any one of the seventh to thirteenth aspects, the first support is moved in the horizontal direction or the vertical direction after the carrier is moved to a base end of the first support.

The configuration according to the fourteenth aspect minimizes a bending load and the moment of inertia of the carrier on the first support at a time of movement. Therefore, smooth operation and maintenance of accuracy are expected.

According to a fifteenth aspect, a medicine-taking support apparatus includes the item storage apparatus according to any one of the first to fourteenth aspects. One-dose-package medicine packs are used as the items.

The configuration according to the fifteenth aspect allows the medicine-taking support apparatus to have the same effect as the effect of any one of the first to fourteenth aspects.

The above-described embodiments are illustrative and do not limit the present disclosure. Thus, numerous additional variations are possible in light of the above teachings. For example, elements and/or features of different illustrative embodiments may be combined with each other and/or substituted for each other within the scope of the present disclosure. For example, technical matters described in the embodiments, the examples, the variation examples or the like described above may be appropriately combined.

The effects described in the embodiments of this disclosure are listed as most preferable effects derived from this disclosure, and therefore are not intended to limit to the embodiments of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An item storage apparatus comprising:
a first storage configured to store a pile of a plurality of items;
a carrier configured to take an item out of the first storage and hold and convey the item;
a first support configured to support the carrier such that the carrier is movable back and forth in a first horizontal direction;
a second support configured to support the first support such that the first support is movable back and forth in a second horizontal direction perpendicular to the first horizontal direction;
a vertical moving mechanism configured to support the second support such that the second support is movable back and forth in a vertical direction perpendicular to the first horizontal direction and the second horizontal direction; and
a second storage configured to store the item conveyed by the carrier, wherein
at least one of the first storage or the second storage includes a multi-tier structure in which a space for movement of the carrier is interposed between tiers,
the first support includes a cantilever structure in which a first end of the first support is secured to the second support a second end of the first support is a free end,
a path through which the carrier is configured to take the item out of the first storage and hold and convey the item is same as a path through which the carrier is configured to store the item conveyed, into the second storage, and
the carrier is configured to not move in the vertical direction between the first storage and the second storage.

2. An item storage apparatus comprising:
a first storage configured to store a pile of a plurality of items;
a carrier configured to take an item out of the first storage and hold and convey the item;
a first support configured to support the carrier such that the carrier is movable back and forth in a first horizontal direction;
a second support configured to support the first support such that the first support is movable back and forth in a second horizontal direction perpendicular to the first horizontal direction;
a vertical moving mechanism configured to support the second support such that the second support is movable back and forth in a vertical direction perpendicular to the first horizontal direction and the second horizontal direction; and
a second storage configured to store the item conveyed by the carrier, wherein
at least one of the first storage or the second storage includes a multi-tier structure in which a space for movement of the carrier is interposed between tiers,
the first support includes a cantilever structure in which a first end of the first support is secured to the second support and a second end of the first support is a free end, the vertical moving mechanism is located below a highest tier of the first storage, and a storage volume of the highest tier of the first storage has a larger than a storage volume of another tier of the first storage.

3. The item storage apparatus according to claim 1, further comprising:

an entrance port through which the first storage or the second storage is to be taken out and in through a front side of the multi-tier structure.

4. The item storage apparatus according to claim 1, further comprising:

a holding device configured to rotate, the rotating including changing an orientation of the item after the carrier conveys the item out of the first storage, wherein the holding device is further configured to be rotated before the carrier moves back and forth in the vertical direction while holding the item taken out of the first storage.

5. An item storage apparatus comprising:

a first storage configured to store a pile of a plurality of items;

a carrier configured to take an item out of the first storage and hold and convey the item;

a first support configured to support the carrier such that the carrier is movable back and forth in a first horizontal direction;

a second support configured to support the first support such that the first support is movable back and forth in a second horizontal direction perpendicular to the first horizontal direction:

a vertical moving mechanism configured to support the second support such that the second support is movable back and forth in a vertical direction perpendicular to the first horizontal direction and the second horizontal direction;

a second storage configured to store the item conveyed by the carrier, wherein at least one of the first storage the second storage includes a multi-tier structure in which a space for movement of the carrier is interposed between tiers, and the first support includes a cantilever structure in which a first end of the first support is secured to the second support and a second end of the first support is a free end; and a guide rail configured to contact the second end of the first support to horizontally guide the first support while keeping a position of the first support in the vertical direction in response to the first support moving on the second support stopping.

6. The item storage apparatus according to claim 5, further comprising:

a controller configured to decrease a movement speed of the first support in at least one of a time when the second end contacts the guide rail or a time when the second end separates from the guide rail.

7. The item storage apparatus according to claim 6, wherein the controller is further configured to:

change a movement acceleration of the first support in at least one of a time when the second end contacts the guide rail or a time when the second end separates from the guide rail, based on whether or not the carrier holds the item.

8. The item storage apparatus according to claim 6, further comprising:

a first detector configured to detect a fact that the second end is at a predetermined position; and a driving device configured to move the first support, wherein the controller is configured to, calculate a driving amount of the driving device necessary to move the first support at a distance corresponding to a movement distance of the second end in which the second end moves from a position where the first detector is located to a position where the second end contacts the guide rail and a movement distance of the second end from the position where the first detector is located to a position where the second end separates from the guide rail, and determine a timing of start of increasing or decreasing a movement speed of the first support based on a detection signal of the second end detected by the first detector and the driving amount calculated by the controller.

9. The item storage apparatus according to claim 6, further comprising:

a second detector configured to detect the second end at a specific position where the second end does not contact the guide rail; and a driving device configured to move the first support, wherein the controller is further configured to control driving of the driving device, and determine a timing of increasing or decreasing a movement speed of the first support at the specific position in response to a detection signal of the second end detected by the second detector.

10. The item storage apparatus according to claim 5, further comprising:

a guide roller on the second end of the first support, wherein the guide roller is configured to contact the guide rail.

11. The item storage apparatus according to claim 5, wherein the guide rail is at a position corresponding to a lowest-limit position of vertical movement of the first support; and the second support has such an extended length that the first support constantly contacts the guide rail.

12. The item storage apparatus according to claim 5, wherein the first support is configured to move in the first horizontal direction or the vertical direction after the carrier moves to a base end of the first support.

13. A medicine-taking support apparatus comprising:

the item storage apparatus according to claim 1; and the items are one-dose-package medicine packs.

14. The item storage apparatus according to claim 5, wherein a path through which the carrier is configured to take the item out of the first storage and hold and convey the item is same as a path through which the carrier is configured to store the item conveyed, into the second storage.

15. The item storage apparatus according to claim 5, wherein the carrier is configured to:

not move in the vertical direction between the first storage and the second storage.

16. The item storage apparatus according to claim 5, wherein the vertical moving mechanism is located below a highest tier of the first storage, and a storage volume of the highest tier of the first storage has a larger than a storage volume of another tier of the first storage.

17. The item storage apparatus according to claim 5, further comprising:
an entrance port through which the first storage or the second storage is to be taken out and in through a front side of the multi-tier structure.

18. The item storage apparatus according to claim 5, further comprising:
a holding device configured to rotate, the rotating including changing an orientation of the item after the carrier conveys the item out of the first storage,
wherein the holding device is further configured to be rotated before the carrier moves back and forth in the vertical direction while holding the item taken out of the first storage.

19. The item storage apparatus according to claim 18, wherein the holding device includes:
a holding tray configured to hold the item; and
a movement motor configured to,
rotate the holding device, and
move the holding device up and down.

20. A medicine-taking support apparatus comprising:
the item storage apparatus according to claim 5; and
the items are one-dose-package medicine packs.

\* \* \* \* \*